United States Patent [19]
Watanabe et al.

[11] Patent Number: 5,210,547
[45] Date of Patent: May 11, 1993

[54] IMAGE PRINTING METHOD AND SYSTEM

[75] Inventors: Katsumi Watanabe; Takashi Yoshida; Isao Shimizu; Yasuhiro Matsuda, all of Ibaraki; Akira Shimizu, Katsuta; Masashi Yoshida, Nakaminato, all of Japan

[73] Assignee: Hitachi, Ltd., Tokyo, Japan

[21] Appl. No.: 578,460

[22] Filed: Sep. 7, 1990

[30] Foreign Application Priority Data

Sep. 8, 1989 [JP] Japan .................................. 1-231608

[51] Int. Cl.[5] ............................ B41J 2/32; B41J 11/36
[52] U.S. Cl. .............................. 346/76 PH; 346/136; 346/134; 402/120; 402/611; 402/612
[58] Field of Search ............... 346/134, 136, 76 PH; 400/120, 578, 611, 612, 617, 618, 621; 358/449, 452

[56] References Cited

U.S. PATENT DOCUMENTS

| | | | |
|---|---|---|---|
| 4,977,463 | 12/1990 | Fukuda | 358/449 |
| 4,985,930 | 1/1991 | Takeda et al. | 358/652 |
| 4,987,497 | 1/1991 | Yoshimura | 358/452 |
| 5,001,498 | 3/1991 | Shimizu et al. | 346/76 PH |

FOREIGN PATENT DOCUMENTS 0011686 1/1987 Japan .
0011687 1/1987 Japan .

Primary Examiner—Benjamin R. Fuller
Assistant Examiner—Huan Tran
Attorney, Agent, or Firm—Antonelli, Terry, Stout & Kraus

[57] ABSTRACT

An image printing method and system. Information of printing paper size, image size to be printed and printing position is inputted by user. On the basis of the information, a control circuit determines the number of data to be printed in the primary scanning direction as well as the number of data for blanks at both sides and additionally determines the number of lines for printing in the secondary scanning direction as well as line numbers for processing and succeeding blanks. In the primary scanning, the data to be printed is supplied to a thermal head together with the data for the blanks. In the secondary scanning, a printing sheet is transported idly for the blank portions. The thermal head is electrically energized in the printing portion for printing the image at a predetermined position on the printing paper.

3 Claims, 37 Drawing Sheets

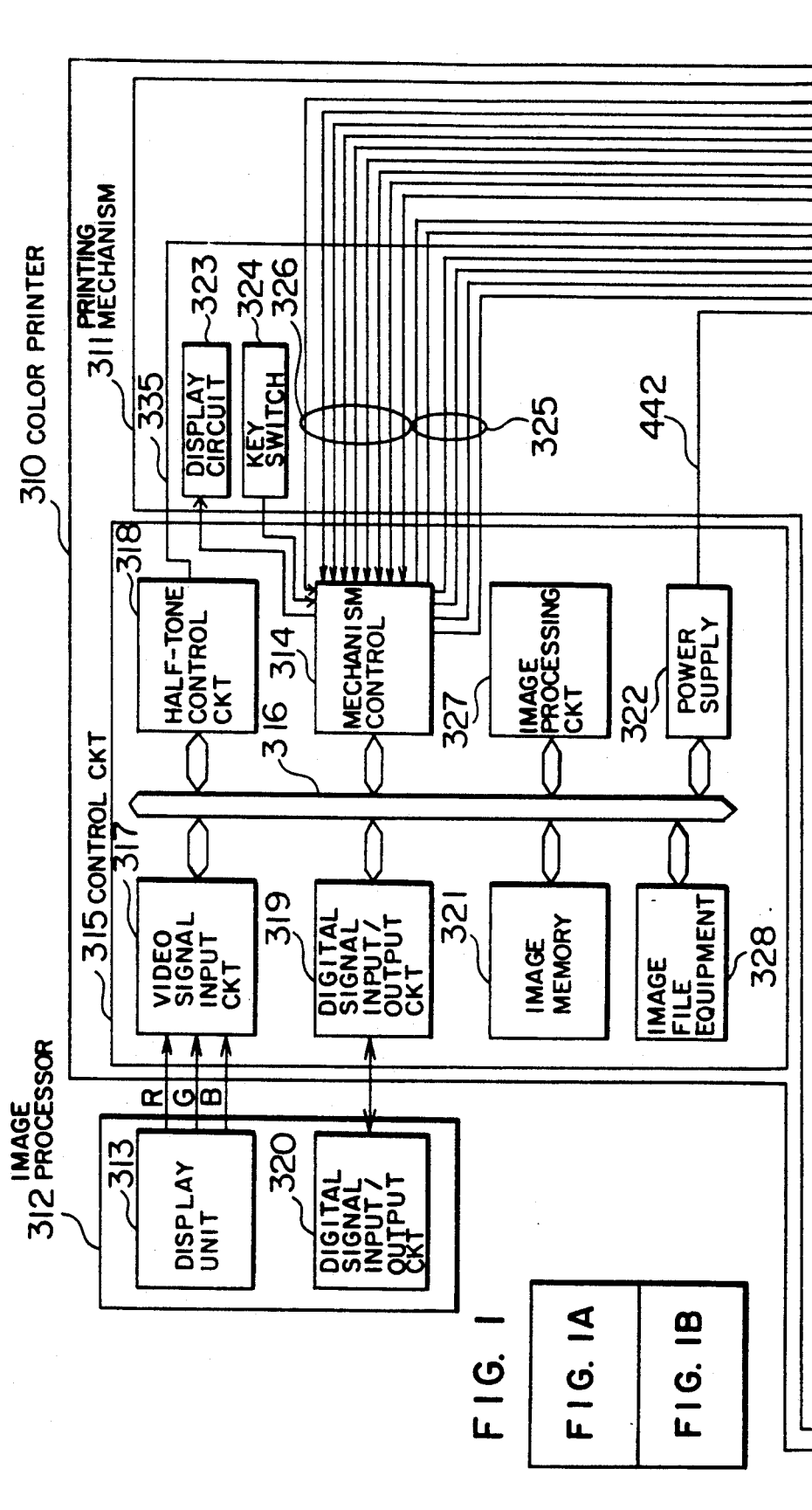

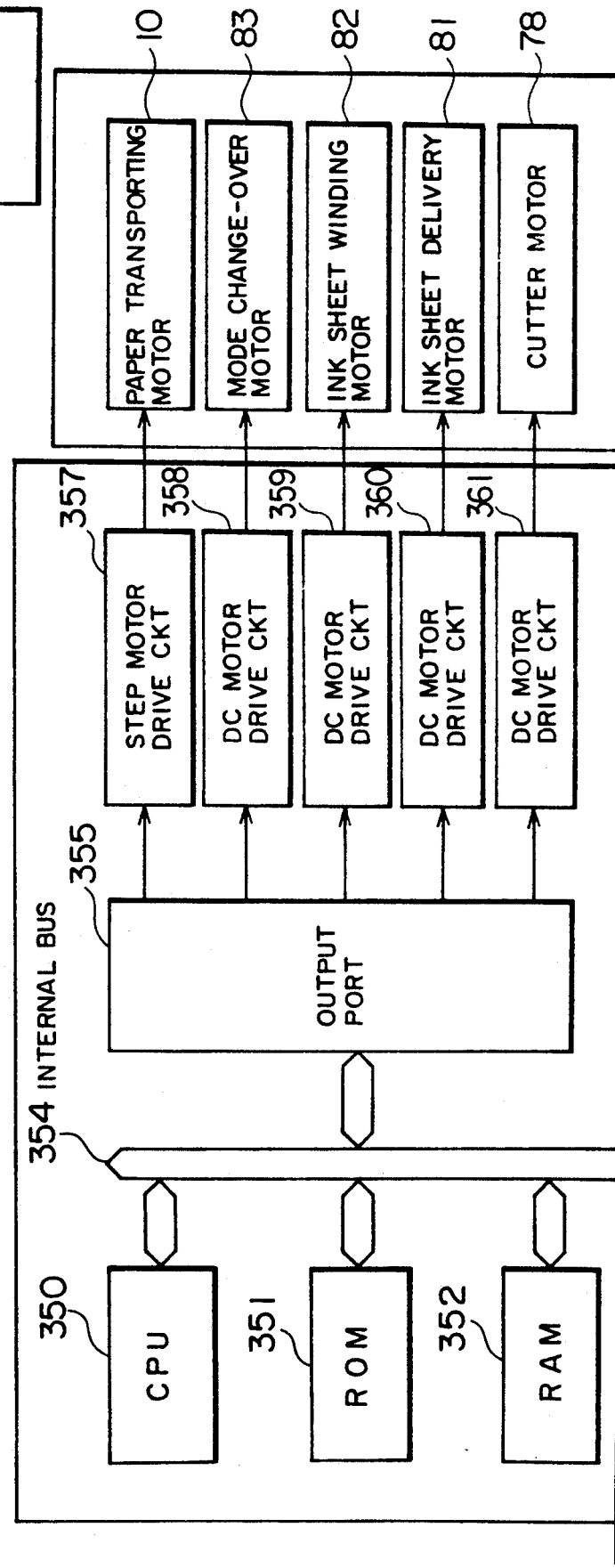

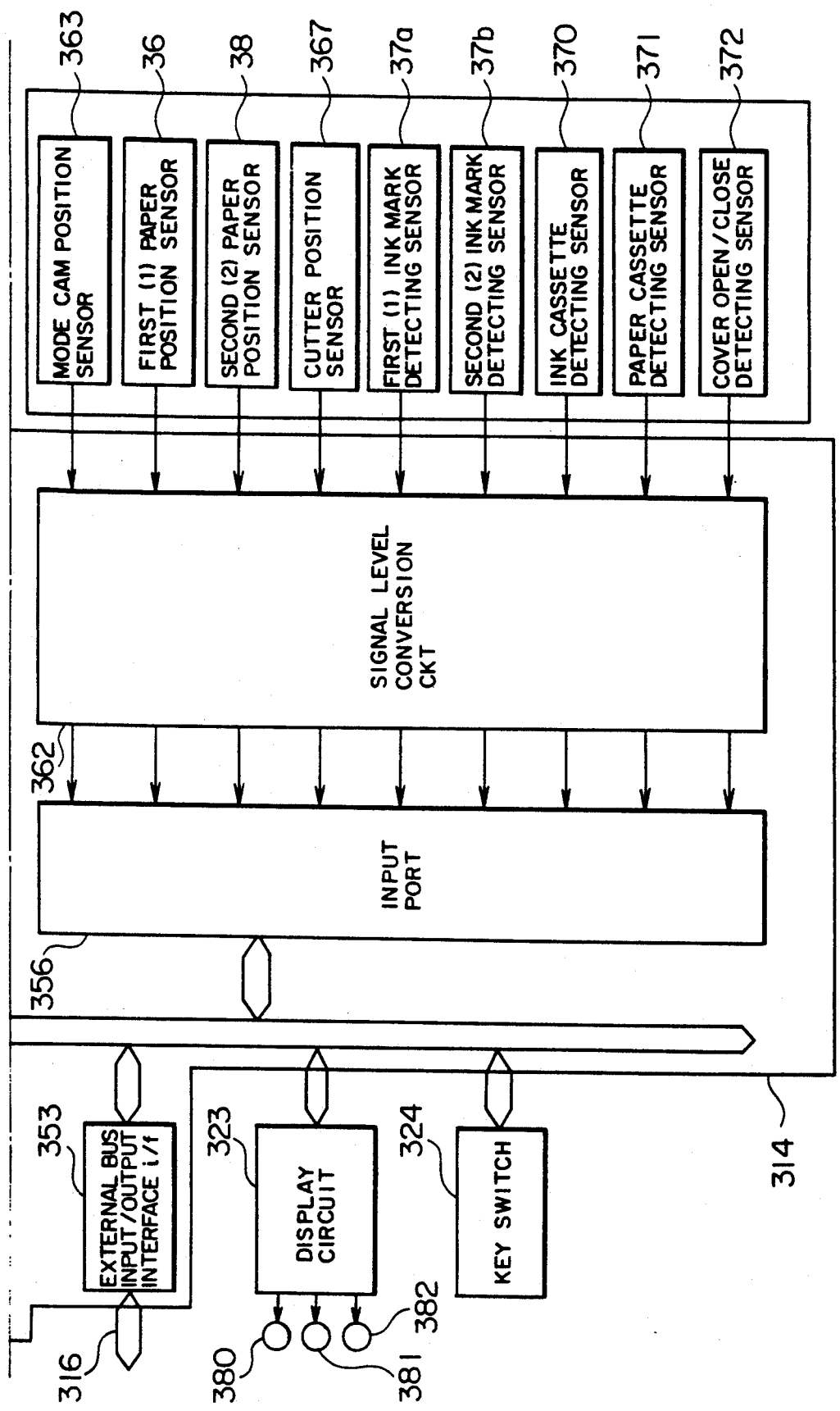

F I G. 10
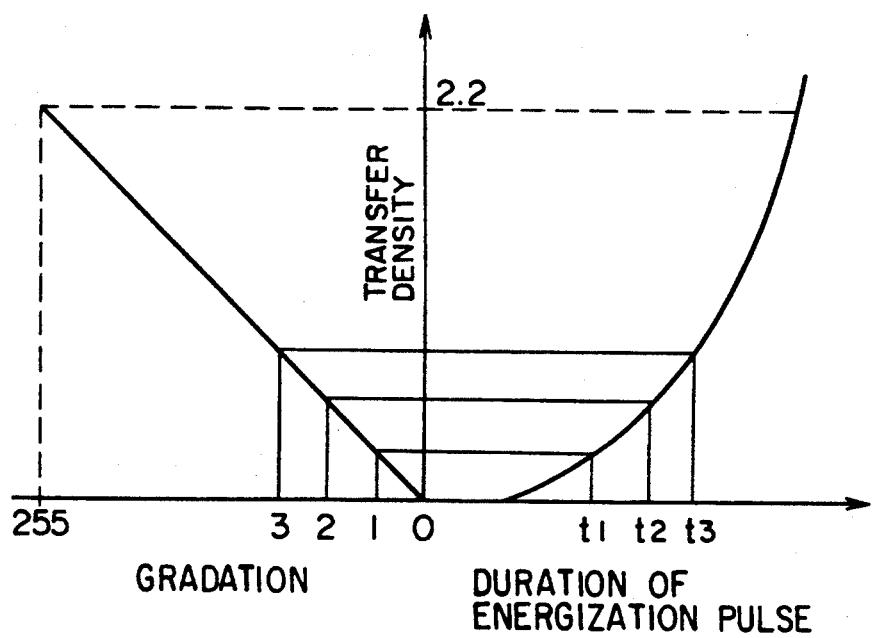

FIG. 13
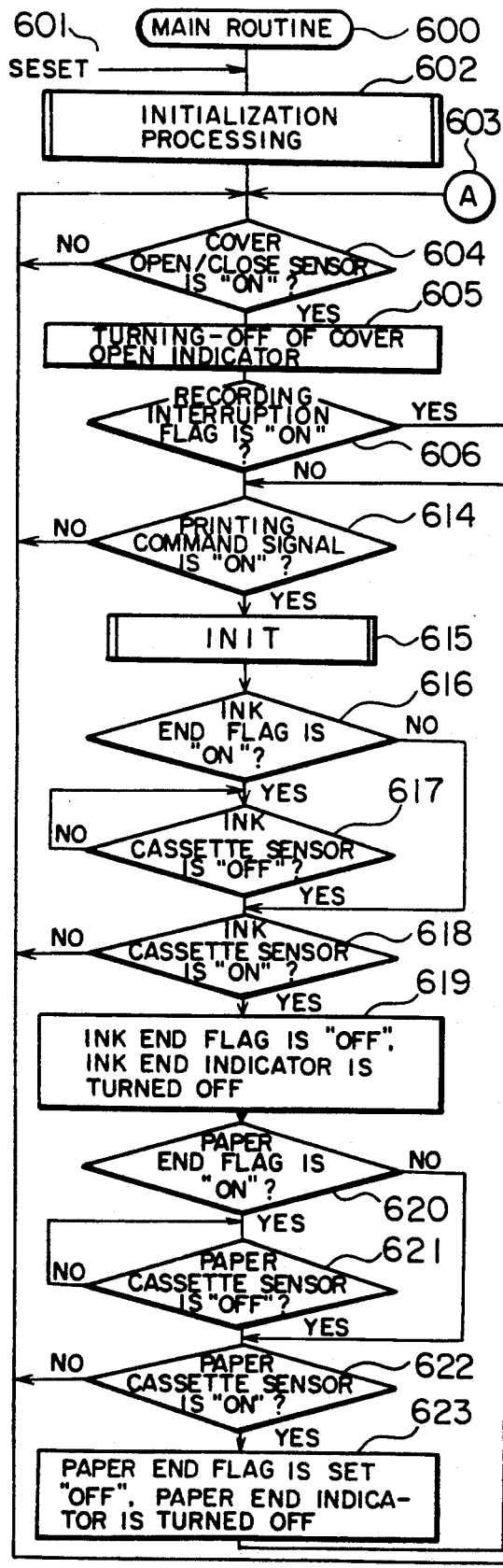
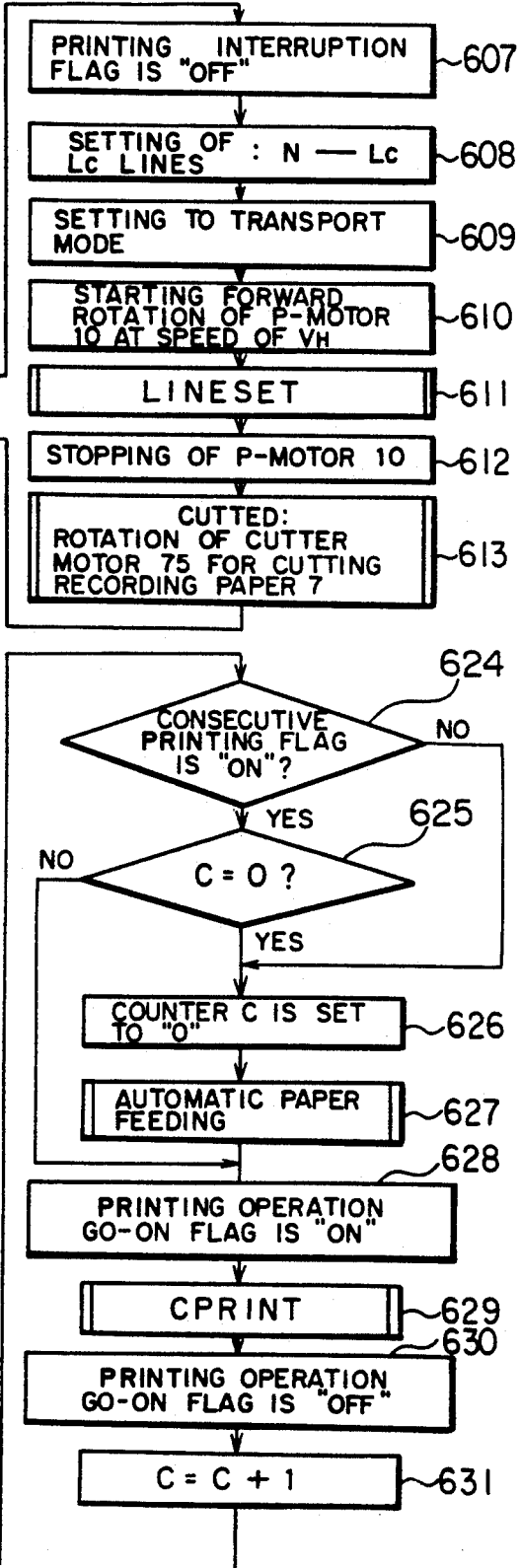

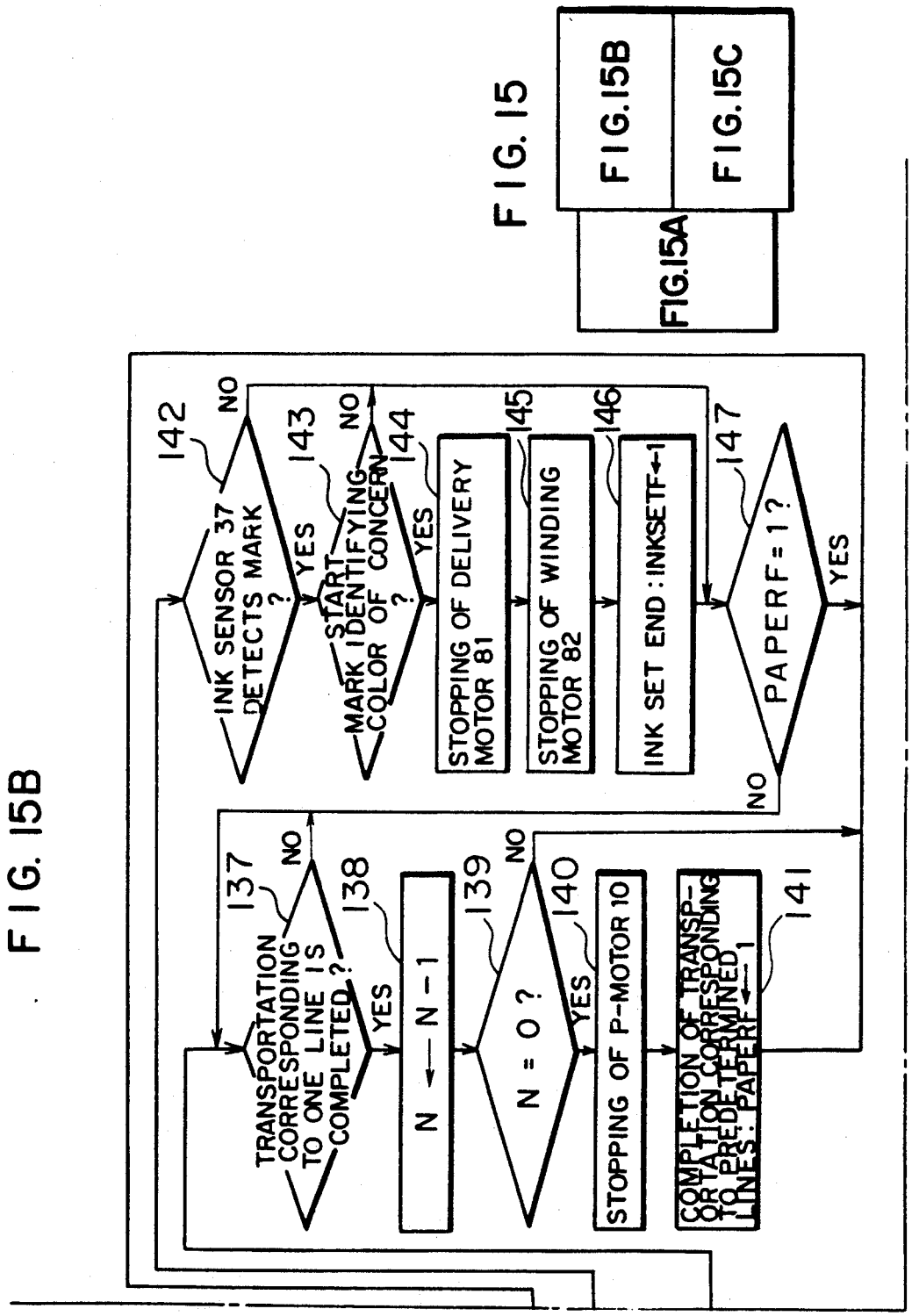

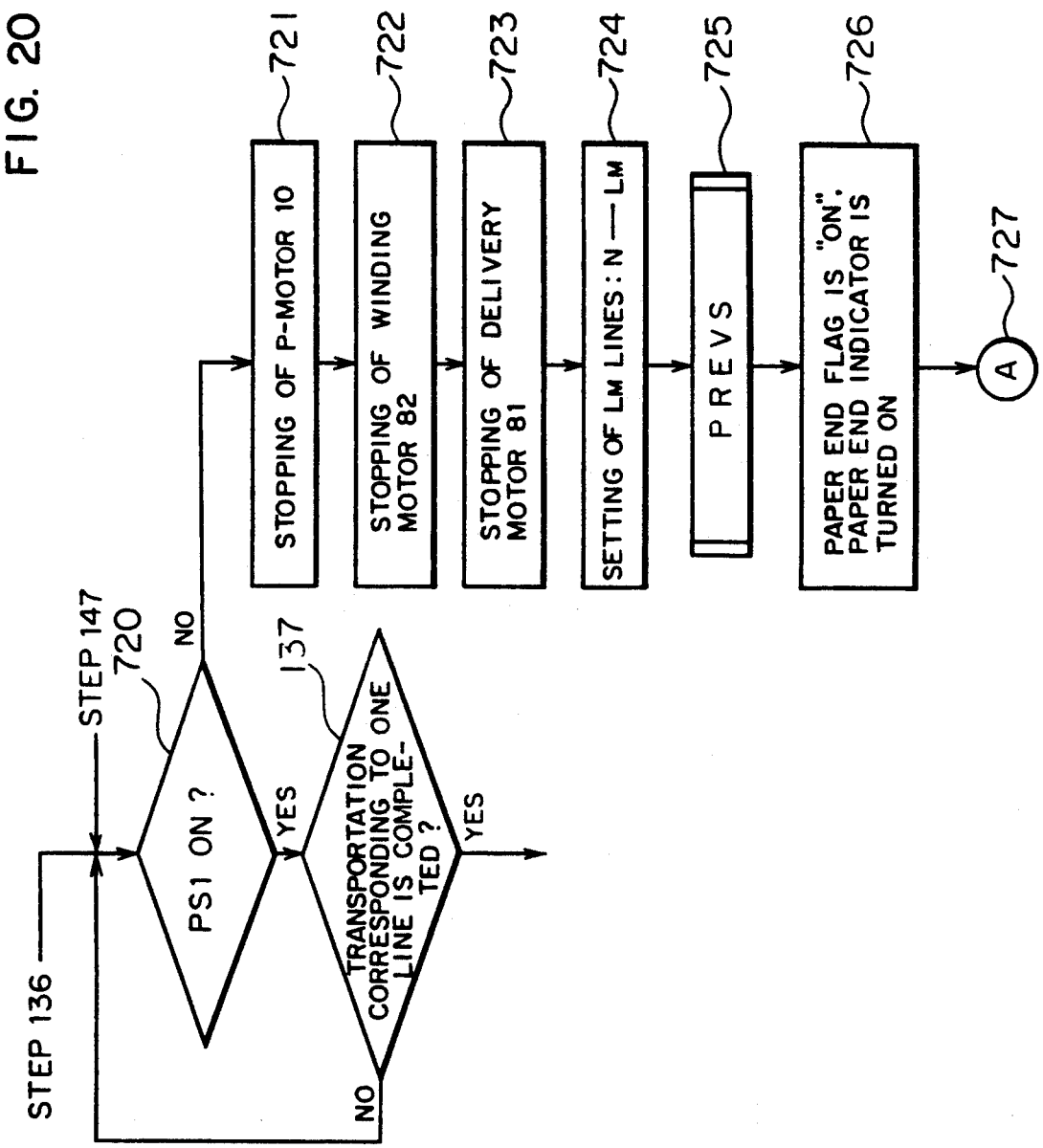

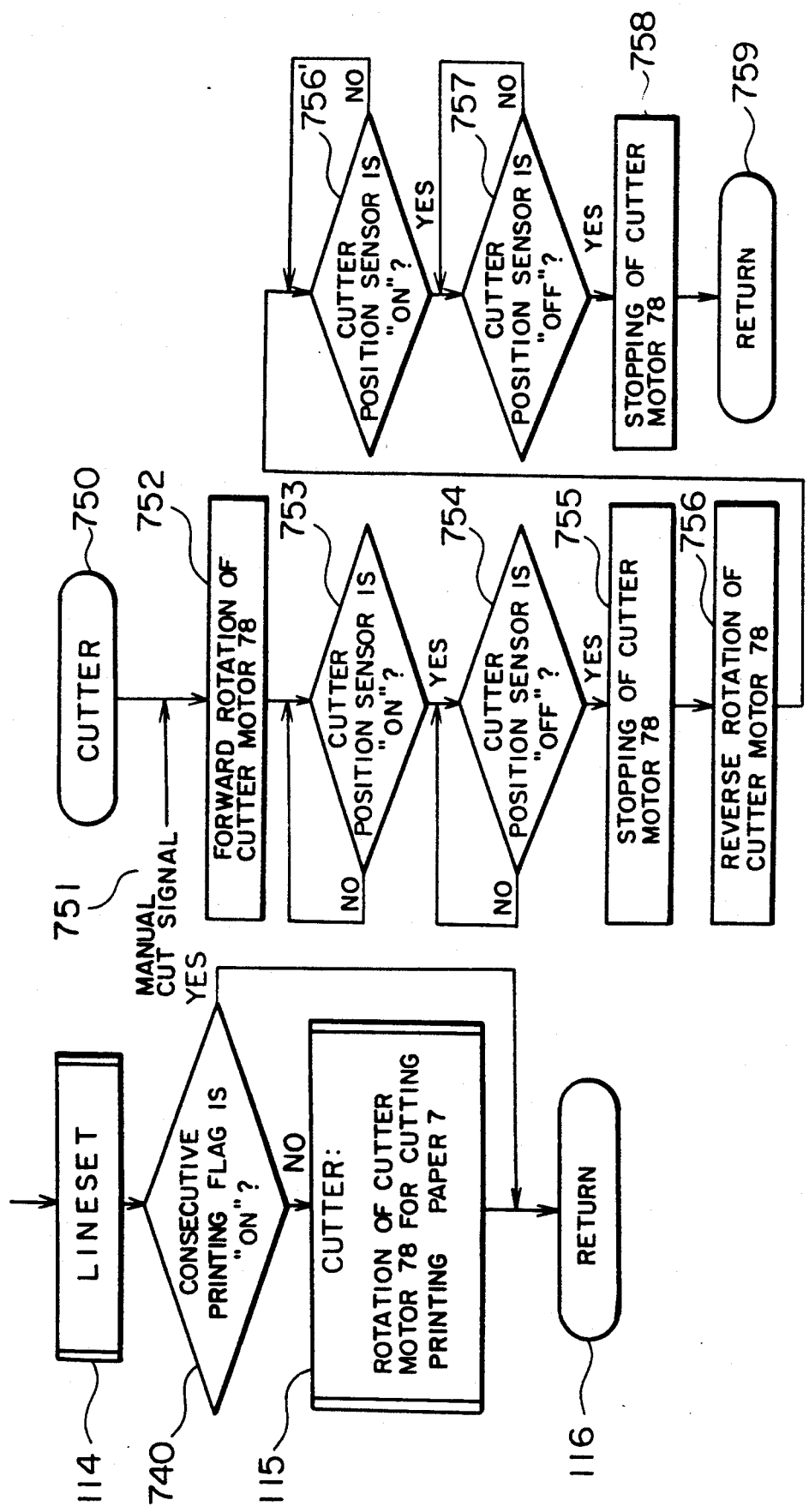

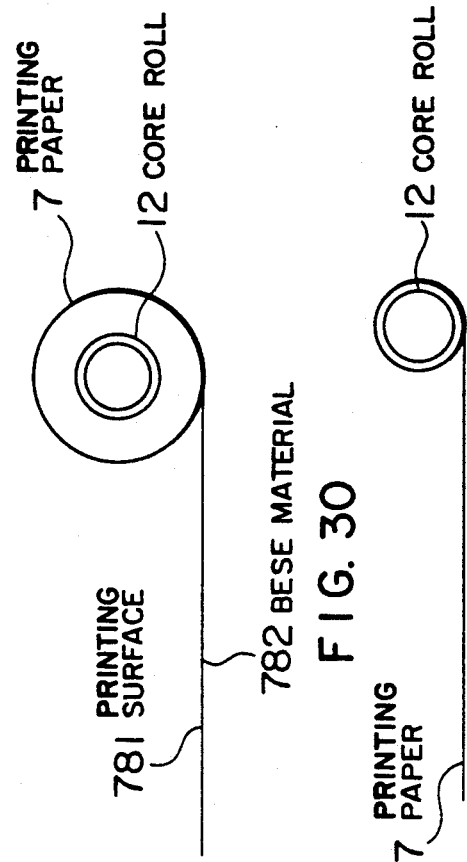
FIG. 28
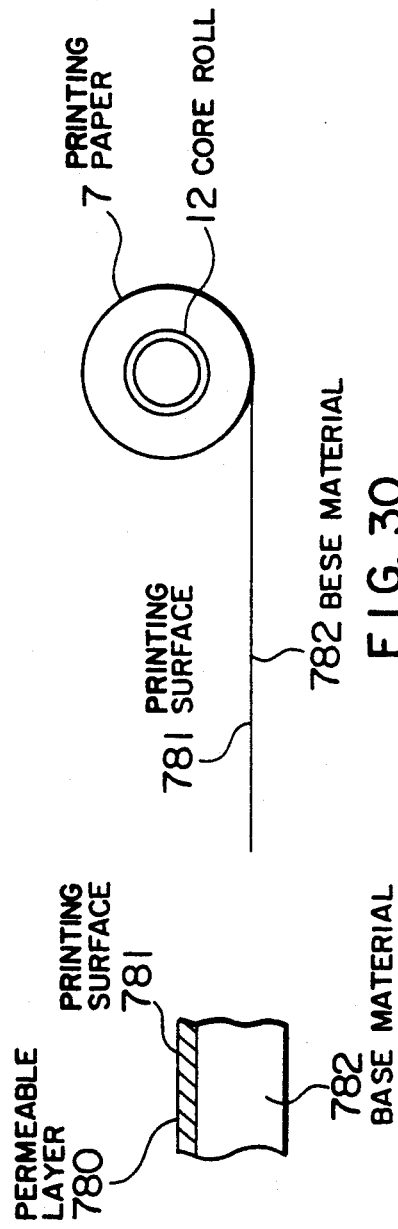
FIG. 29
FIG. 30
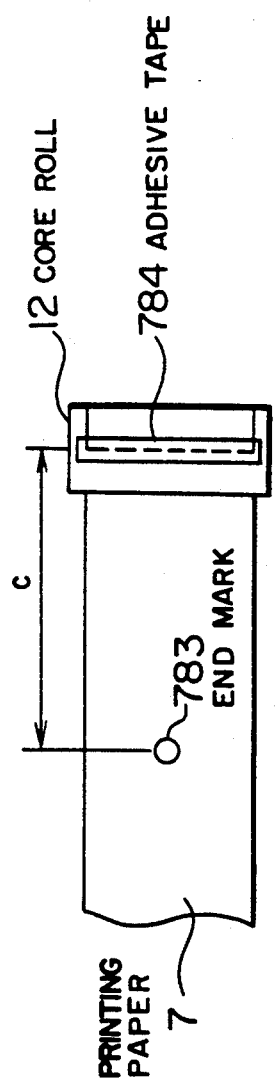
FIG. 31

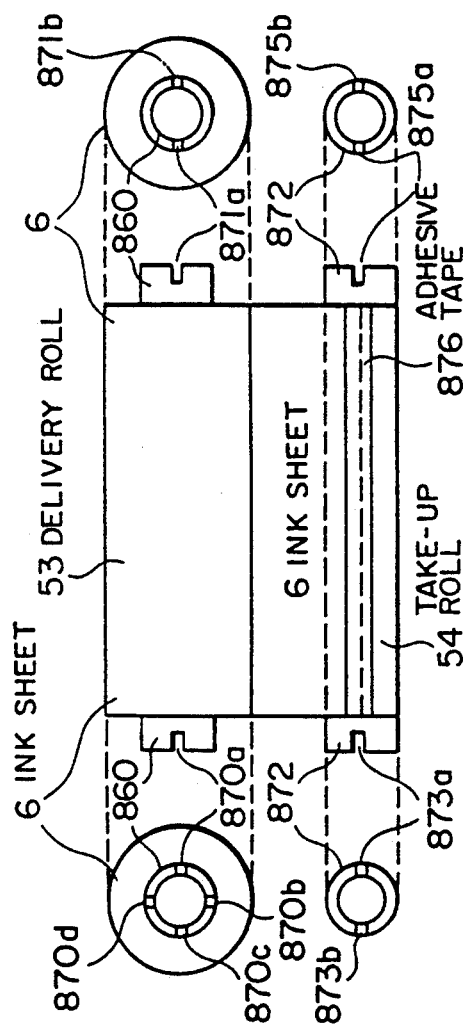

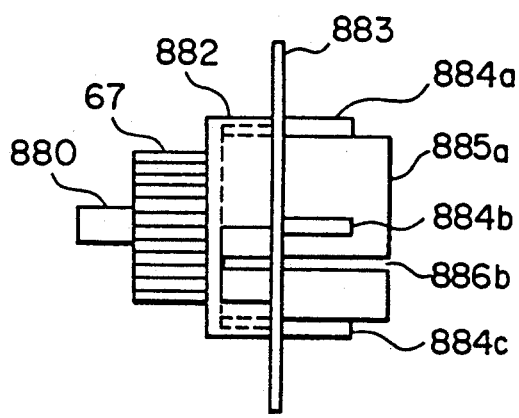
FIG. 43
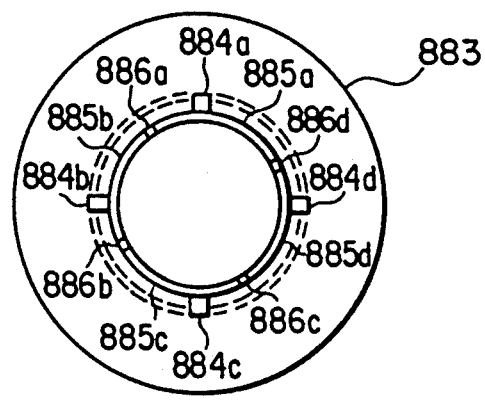
FIG. 44
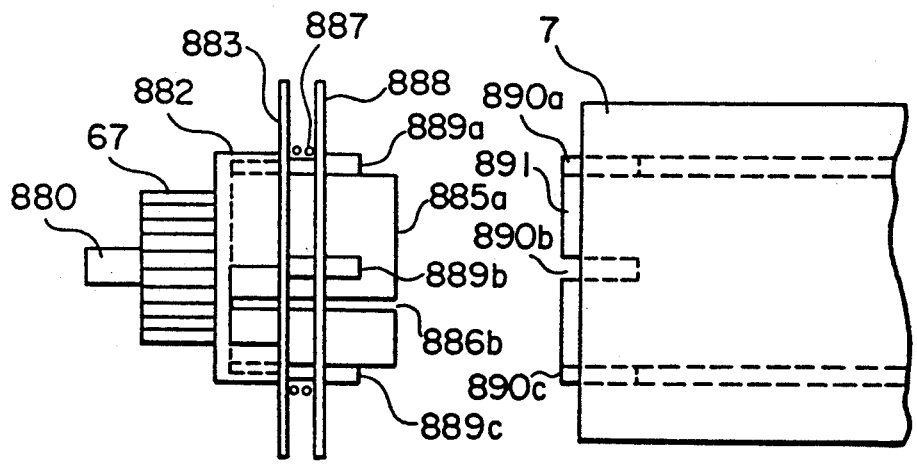
FIG. 45
FIG. 46

IMAGE PRINTING METHOD AND SYSTEM

BACKGROUND OF THE INVENTION

The present invention relates to image printing or printing method and system.

In the image printing systems known heretofore, images or pictures are continuously recorded or printed without interposing any blank or margin between the adjacent images, as is disclosed in JP-A-62-11687 (Japanese Patent Application No. 11687/1987) and JP-A-62-11686.

In conjunction with the hitherto known systems, it is further noted that neither attention nor consideration is paid concerning the printing of an image at a predetermined position or location by supplying to the image printing system such types of information as the size of printing paper or sheet employed, size of the image or picture to be printed and the position or location at which the image is to be printed. Consequently, in order to insert blanks between images recorded or printed in series, it is necessary for the user or operator to input the data related to the blanks in addition to the image data, which involves troublesome procedure to a disadvantage.

SUMMARY OF THE INVENTION

It is therefore an object of the present invention to provide an image recording or printing system which is capable of recording or printing images at predetermined positions or locations in response to such information as the size of a printing paper or sheet, size of image to be recorded or printed and the printing position which are inputted to the printing system by the user.

Another object of the present invention is to provide an image printing system which can exhibit a high printing speed upon printing of images created or generated through edition.

For achieving the objects mentioned above, the present invention proposes in its broadest sense an image printing position control according to which data for the print and data for the blank in the primary scanning direction are arithmetically determined on the basis of information about the size of a printing sheet, size of image to be printed and the printing position or location at which the image is to be printed as inputted to a printing system, and additionally the number of lines by which the printing sheet is to be transported for printing the image data and the blank data in the secondary scanning direction are arithmetically determined, wherein the transfer of the print data and the blank data to a thermal head is controlled correspondingly to thereby control the numbers of lines to be assigned to the the blank and the print, respectively, in the secondary scanning direction.

In a preferred mode for carrying out the invention, transportation is performed at a higher speed at the blank area than at the print area so that the time taken for the printing as a whole can be reduced.

According to another aspect of the present invention, there is proposed an ink sheet end detecting method for a recorder or printer in which an ink sheet strip having ink areas applied with a plurality of different color ink sequentially in a repeated pattern is used, wherein color designating marks are applied to leading or start portions of the ink areas correspondingly to the colors of the ink areas, respectively, and wherein the color designating mark is omitted or masked for the last ink area located closest to the trailing end of the ink strip so that an associated sensor disposed in a path along which the ink strip is transported is incapable of detecting the color designating mark for the last ink area, and decision is made that the ink sheet strip has been exhausted unless the color designating mark is detected by the sensor even when the ink strip has been transported by a predetermined length in the recording or printing operation.

These together with other objects, features and advantages which will be subsequently apparent, reside in the details of construction and operation as more fully hereinafter described and claims, reference being had to the accompanying drawings forming a part hereof.

BRIEF DESCRIPTION OF THE DRAWINGS

FIG. 5 is a schematic block diagram showing a structure of a printing control circuit incorporated in the system shown in FIG. 1;

FIG. 10 is a view for illustrating graphically relation between energization pulse and transferred density;

FIG. 13 is a flow chart showing a main routine of the printing control;

FIG. 20 is a flow chart for illustrating execution of a printing paper end detecting procedure;

FIG. 21 is a flow chart for illustrating a cut routine evading procedure in a consecutive printing operation;

FIG. 22 is a flow chart for illustrating a reciprocative operation of a cutter;

FIGS. 22 to 25 are views for illustrating relations of parameters among individual images in a consecutive printing;

FIGS. 28 to 31 are views showing structures of the printing paper sheet;

FIGS. 40, 41A–41D and 42A to 42C are views showing structures of an ink cassette and an ink sheet roll;

FIGS. 43 to 49 are views showing structures of a printing sheet cassette and a printing sheet roll;

DESCRIPTION OF THE PREFERRED EMBODIMENTS

Now, a first preferred or exemplary embodiment of the present invention will be described by reference to FIGS. 1 to 9.

Figure 1B:
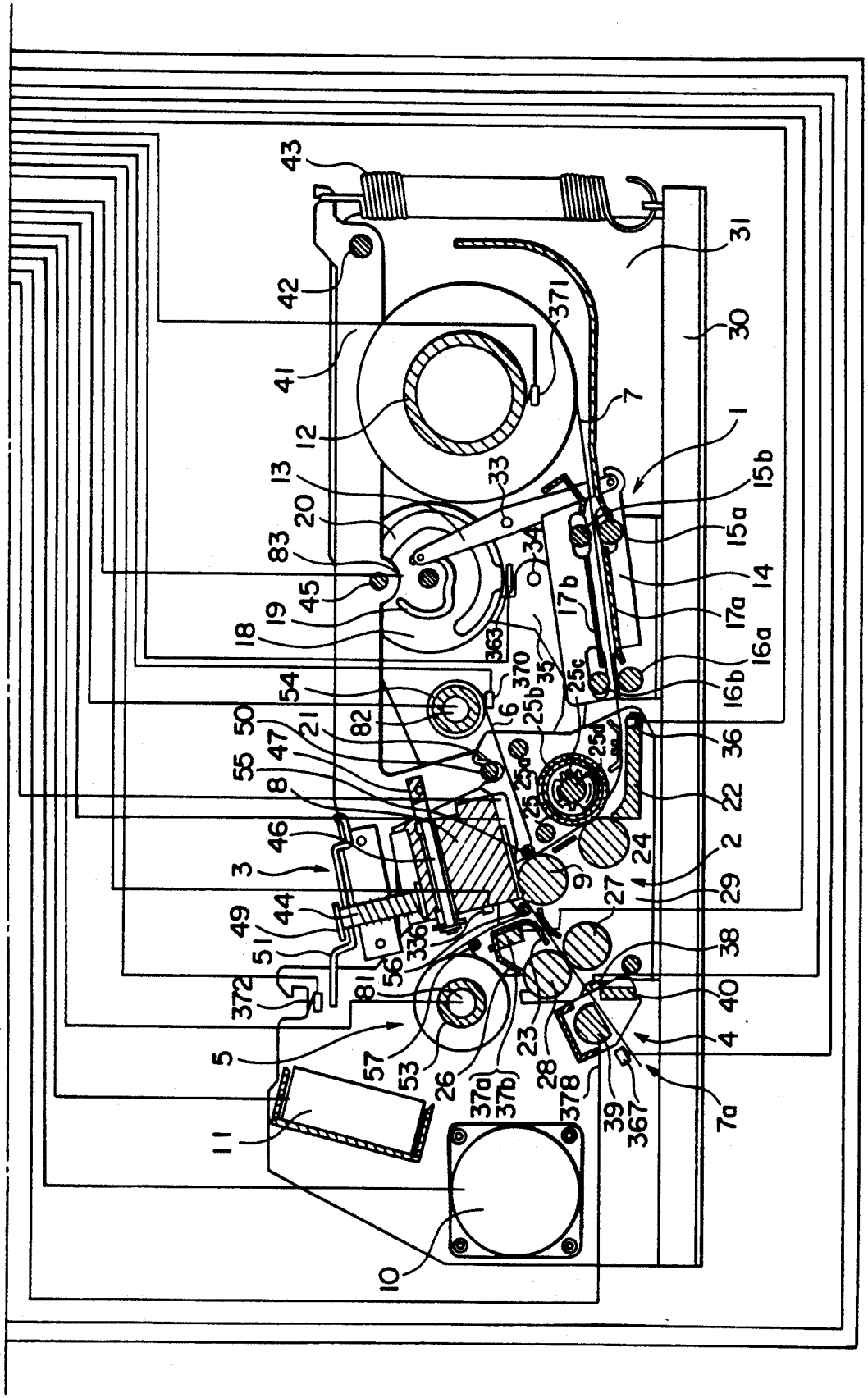
FIG. 1 is a view showing a general structure of a thermal transfer type printing system according to an exemplary embodiment of the present invention.

In the first place, reference is made to FIG. 1 showing a general arrangement of a thermal transfer type color image printing system (color printer system) 310 in which sublimable dye ink is employed for the printing, and showing a printer control apparatus in a block diagram together with a printer mechanism.

In a control circuit 315 shown in FIG. 1, a digital signal input/output circuit 319 is constituted by a digital input interface such as typified by Centronics Interface, SCSI (Small Computer System Interface) or the like, to which an image signal (a digital signal containing gradation information and referred to also as gradation data hereinafter) is supplied from a digital signal input/output circuit 320 of an image processor 312 which may be constituted by a computer or the like. A video signal input circuit 317 serves as an analogue video input interface for converting R-, G- and B-analogue video signals available from a display device 313 such as a color CRT display or the like of the image processor 312 into digital input signals. The image or video signals are fetched by these input circuits 317 and 319 to be outputted to a data bus 316. Parenthetically, with the phrase "gradation data", it is intended to mean the data indicating density levels representing degrees or levels of density of colors in which the image signals are to be printed.

An image memory 321 is designed to serve for storing at least one frame of pixel signals of three primaries R (red), G (green) and B (Blue). The image signals fetched through the input interface circuits 317, 319 are temporarily stored once in the image memory 321 to be subsequently outputted to the data bus 316 upon recording or printing. Incidentally, the image memory 321 is adapted to store therein the image of an arbitrary size.

Supplied to a half-tone control circuit 318 as the input thereto is either the image signal supplied directly through the digital signal input/output circuit 319 or the image signal from the image memory 321 as the gradation data for generating thermal head control signals 335 such as electrical energization data, energization current pulses and others for electrically heating the resistance elements of the thermal head 8 correspondingly to thereby perform the recording or printing at predetermined printing densities. Additionally, signals undergone color correction and/or contraction or magnification in an image processing circuit 327 may also be inputted to the half-tone control circuit 318. There is provided an image file system 328 which is constituted by such image storage as a magnetic disc, magnetic tape, CDROM, CDRAM and/or the like system and serves for storing existing software and the inputted image data to be utilized in the edition, combination (synthesization) and/or other processing of the images performed by the image processing circuit 327. Since the sublimable dye ink used for the recording or printing can be continuously controlled in respect to the transfer density in dependence on the amount of energy as applied, the duration for heating the resistance element is controlled on a gradation base. For n gradation levels, n energization current pulses having different pulse widths $t_1$, $t_2$ to $t_n$, respectively, are used for the control to this end.

Figure 9:
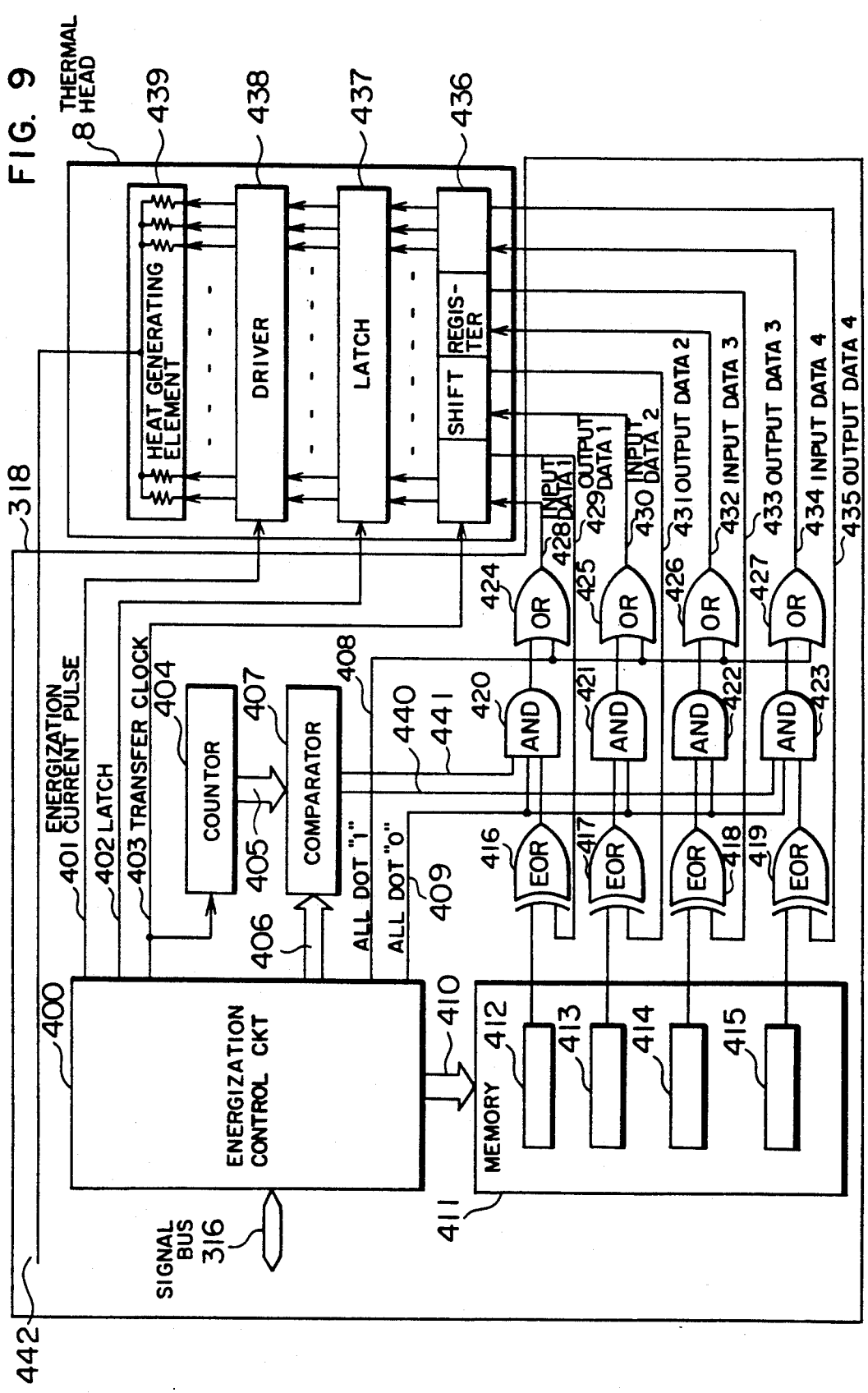
FIG. 9 is a block diagram showing a configuration of a half-tone control circuit employed in the system shown in FIG. 1.

The thermal head 8 is constituted by a multiplicity of heat generating resistance elements arrayed linearly. A general circuit configuration of the thermal head 8 is schematically shown in FIG. 9. Upon printing operation by heat transfer, the amounts of heat generated by the individual resistance elements of the thermal head 8 are correspondingly controlled, respectively, to thereby heat the ink applied over an ink sheet 6 from the side of a base film thereof to thereby cause the ink to permeate into or adhere to a printing paper 7. The amounts of heat generated by the thermal head 8 can be controlled by controlling correspondingly the duration or pulse widths of the control signal 335 and a level of head voltage supplied from a power supply source 322. The temperature of a base plate (substrate) of the thermal head 8 is measured by a head temperature sensor 336.

A mechanism control circuit 314 is designed to control a variety of drive motors 10, 11, 81, 82, 83 and 378 incorporated in a printing mechanism 311, a display circuit 323, the power supply source 322 in accordance with external command signals inputted through the digital signal input/output circuit 319 or a printing start command and the printing conditions such as the size of the image (picture) and others inputted through a key switch array 324. Further, the mechanism control circuit 314 is supplied as inputs thereto with various sensor signals 326 generated by sensor 36 and 38 for detecting a position of the printing paper 7 in the longitudinal direction in the printing mechanism 311, a sensor 363 for detecting the rotational or angular position of a cam 18, ink sensors 37a and 37b for detecting marks indicating ink colors on the ink sheet 6, a sensor 370 for detecting whether or not an ink cassette 52 has been placed in position within the printing mechanism, a sensor 371 for detecting whether or not the printing paper 7 has been loaded in the printing mechanism, sensors (not shown) for detecting rotations of a take-up roll 54 and a delivery roll 53 and others, whereby the control circuit 314 outputs motor drive signals 325 in accordance with the operation procedure for controlling the activation and deactivation of the step motor 10, the DC motors 11, 81, 82, 83 and 378 and others.

Additionally, the mechanism control circuit 314 outputs to the data bus 316 a page print command signal, a one-line print command signal and a color designation signal for controlling the video signal input circuit 317, the digital signal input/output circuit 319, the image memory 321 and the half-tone control circuit 318.

Figure 2:
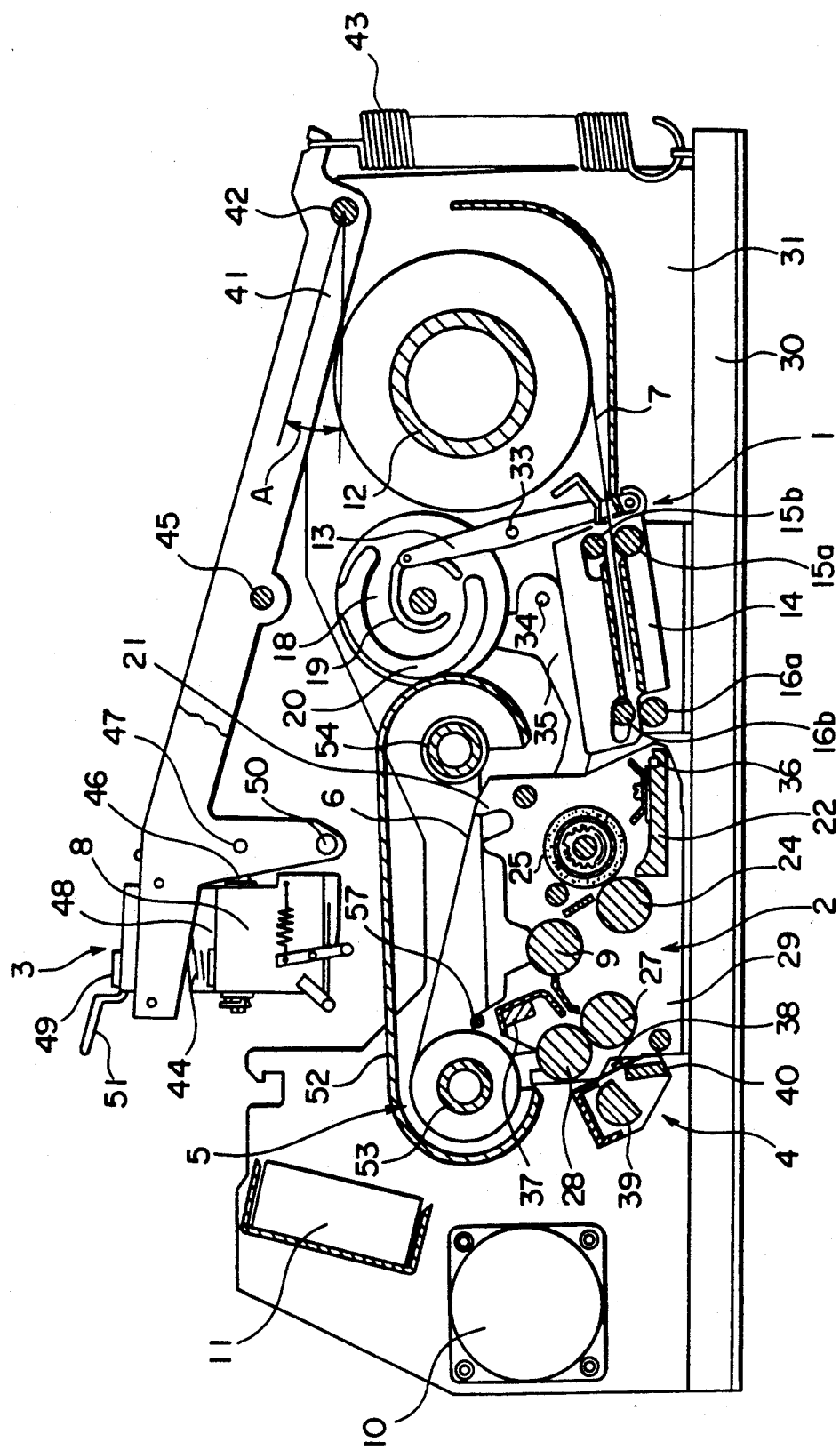
FIGS. 2 to 4 are views showing printing and driving mechanisms incorporated in the printing system shown in FIG. 1.
Figure 3:
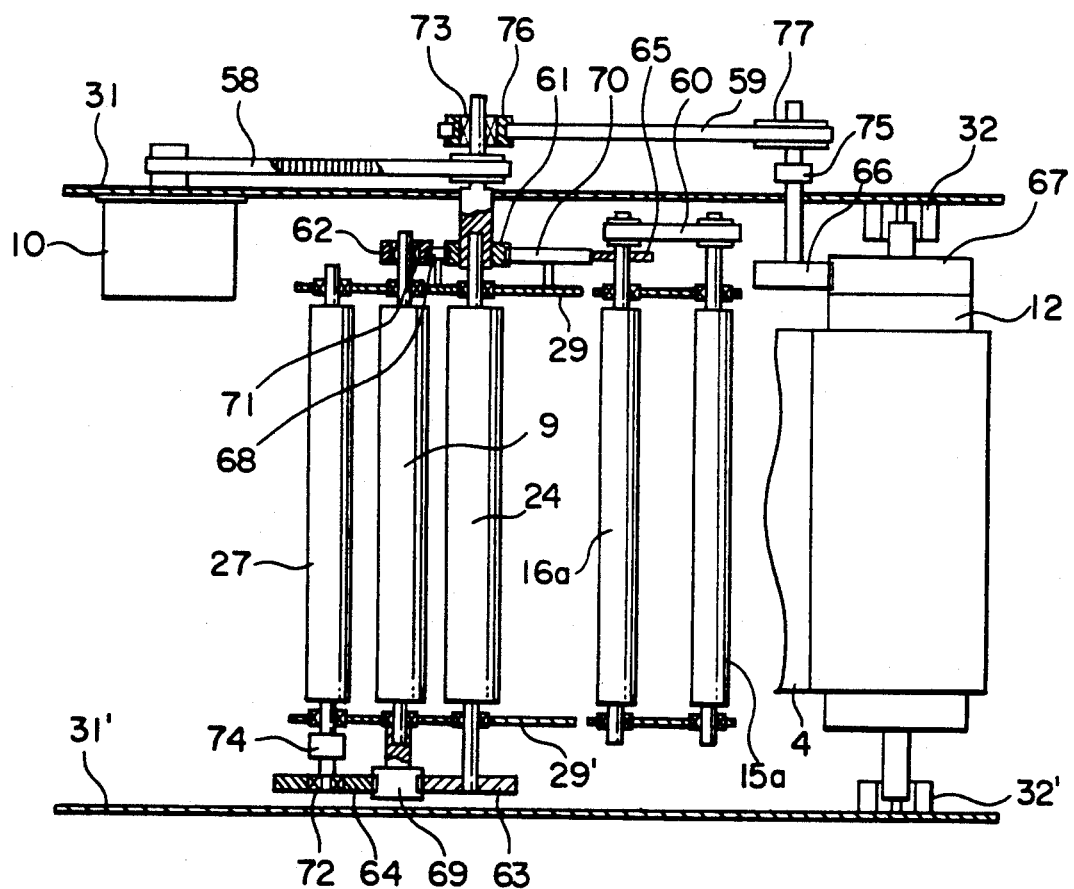
Figure 4:
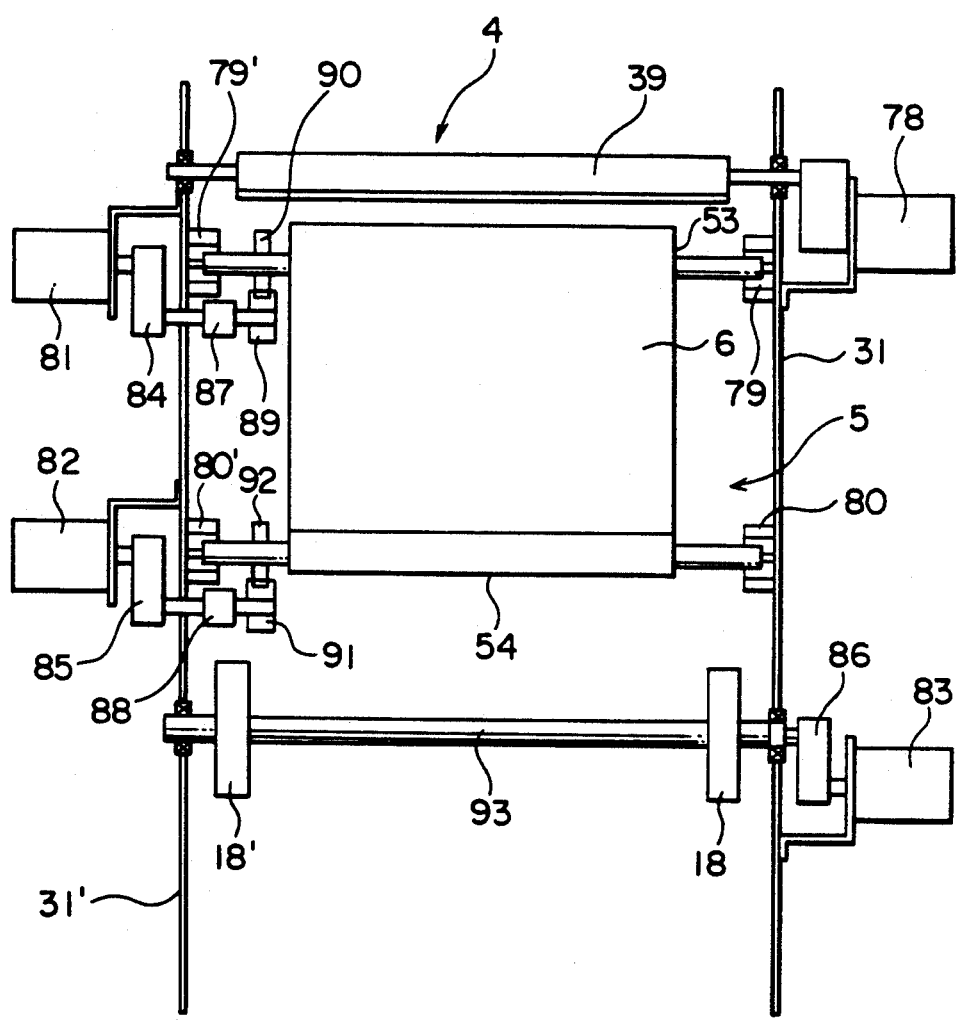
Figure 6:
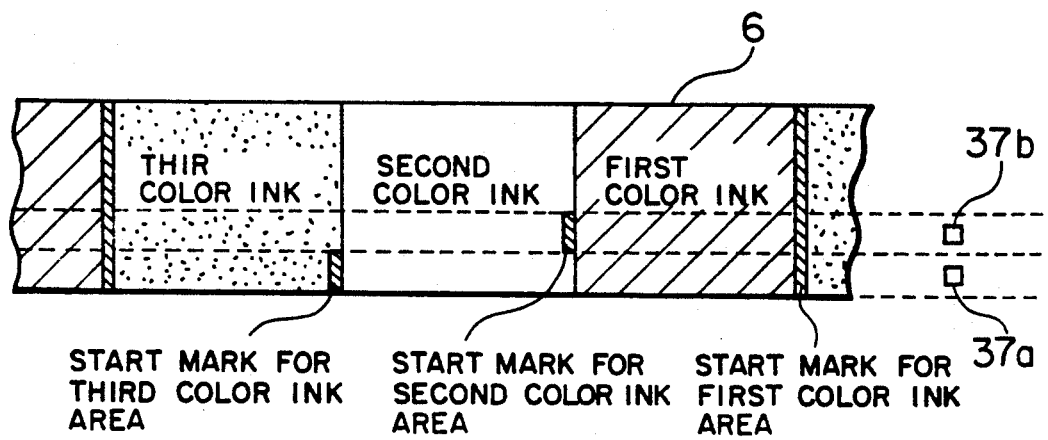
FIG. 6 is a schematic view for illustrating relations between an ink sheet and ink color identification marks.

Next, description will be made in detail of the mechanical printing part or printing mechanism by reference to FIGS. 1 to 4, in which FIG. 1 is a side view of the printing mechanism, FIG. 2 shows the same in the state in which a head block 3 is raised, and FIGS. 3 and 4 are plan views showing partially a driving mechanism constituting a part of the printing mechanism.

The printing mechanism 311 includes a pair of side plates 31 and 31' fixedly secured to a bottom plate 30 at both sides in a vertically upstanding posture. A paper feed block and a transportation block generally denoted by numerals 1 and 2, respectively, are fixedly mounted on the bottom plate 30. Additionally, a head block 3, a cutter block 4, the paper transporting step (pulse) motor 10 and a cooling fan 11 are mounted on the side plates 31 and 31', as can be seen in the Figures. An ink block 5 implemented in the form of a cassette is adapted to be removably supported by bearings 79, 79' and 80, 80' secured to the side plates 31 and 31', respectively, (FIG. 4). Further, a printing paper roll 12 for delivering the printing paper 7 is also supported by respective bearings 32 and 32' secured to the side plates 31 and 31', respectively, similarly to the ink block 5 (see FIG. 3).

The printing paper 7 delivered from the printing paper roll 12 is fed through the paper feed block 1, transportation block 2 and the cutter block 4 to be finally discharged from the printing mechanism. The paper feed block 1 comprises two set of paired rollers (i.e. a first pair of upstream paper feed rollers 15a, 15b and a second pair of downstream paper feed rollers 16a, 16b) and a pair of paper guides 17a, 17b. The upstream paper feed roller 15b and the downstream paper feed roller 16b are adapted to move upwardly or downwardly as a paper feed frame 14 is moved to the left or right, as viewed in FIGS. 1 and 2. More specifically, as a sheet feed lever 13 is rotated about a pin 33, being guided by a groove 19 formed in the cam 18, the paper feed frame 14 is swung to the left and right.

The transportation block 2 comprises paper guides 22 and 23, a pair of transportation rollers, i.e. a transporting roller 24 and a pressing roller 25, a platen roller 9 and a pair of discharge rollers, i.e. a discharging roller 27 and a pressing roller 28, and others, wherein the individual rollers and the guides are mounted rotatably or fixedly by screws or the like on roller chassis 29 and 29'. The transporting roller 24 is implemented in the form of a rigid cylinder made of a stainless steel or the like and provided with a surface having a pulverized ceramic material bonded thereto at random in order to increase the coefficient of friction with the printing paper 7. It should however be mentioned that the hardness of the pulverized material is so selected as to be less than that of a protection film of the thermal head 8, so that latter can be protected against injury due to the pulverized material loosened off from the transporting roller 24. The pressing roller 25 is constituted by a rigid hollow cylinder 25a having a surface coated with an elastic material layer 25b such as a rubber layer, wherein a roll bearing 25c is inserted into the hollow cylinder and supported by a shaft 25d which in turn is rotatably mounted on the roller chassis 29, 29'. The shaft 25d is provided with pressing levers 35 at both ends thereof. The pressing lever 35 is rotatable about a pin 34, being guided along a groove (not shown) formed in the cam 18 so that the pressing roller 25 can be brought into contact with the transporting roller 24 or released from the latter. The platen roller 9 and the discharge roller 27 are each implemented as a cylindrical roller which is constituted by a stainless steel core covered with an elastic material such as rubber or the like. The pressing roller 28 is formed of a plastic material such as Duracon or the like. A leaf spring 26 mounted on the paper guide 23 constantly presses the pressing roller 28 onto the discharge roller 27. Mounted on the paper guide 22 is a photoelectric sensor 36 which serves as a paper position detecting sensor for detecting the presence or absence of the printing paper 7 in the transportation block. Further, ink sheet sensors 37a and 37b are mounted on the paper guide 23 for detecting the position of the ink sheet, as will be described later on.

The cutter block 4 comprises a rotatable knife or blade 39, a stationary blade 40 and a photoelectric sensor 38 serving as a paper position detecting sensor for detecting the presence or absence of the printing paper 7 in the cutter block, and is fixedly secured to the side plates 31, 31'. The printing paper 7 inserted between the rotatable blade 39 and the stationary blade 40 is cut as the blade 39 is rotated.

In the head block 3, the thermal head 8 is mounted on a head arm 41 at a left end thereof, as viewed in FIGS. 1 and 2, while the head arm 41 is rotatably mounted at the right end thereof on a shaft 42 which defines a center axis about which the head block 3 is rotated when it is raised. Additionally, the shaft 42 is rotatably mounted on the plates 31, 31'. Besides, there is provided at the right end of the head arm 41 a coil spring 43 for holding the head block 3 in the lifted or elevated state. The head block 3 can be raised to the state illustrated in FIG. 2 and is also capable of being rotated up to a position where the head arm 41 assumes a vertical disposition (i.e. the position where the angle A shown in FIG. 2 is about 90 degrees). The thermal head 8 is rotatably supported on a rotatable shaft 46 at a center, as viewed in the direction widthwise of the head 8 (perpendicularly to the plane of the drawing). Further, the rotatable shaft 46 is fixedly secured to a head mounting shaft 47 extending in parallel to the widthwise direction of the thermal head 8, wherein the head mounting shaft 47 in turn is mounted rotatably on the head arm 41. Cooling fins 48 are mounted on a top portion of the thermal head 8 so as to move together with the thermal head 8. The air blown from the cooling fan 11 flows through passages defined between the cooling fins 48 to cool the thermal head 8. Mounted rotatably on a bottom portion of the thermal head 8 are an upstream strip-off roller 55 and a downstream strip-off roller 56. The head pressing force for pressing the thermal head 8 against the platen roller 9 is assured by a coil spring 44 which is mounted around and guided along a shaft 49 between the top surface of the thermal head 8 and a head ceiling plate 51 secured to the head arm 41. A pin 45 mounted at an intermediate portion of the head arm 41 is caused to move in the vertical direction (upwardly or downwardly), being guided by a groove 20 formed in the cam 18, as the latter is rotated. The motion of this pin 45 in turn causes the head arm 41 and the head ceiling plate 51 to move in the vertical direction (upwardly or downwardly), to thereby allow the spring 44 to expand or contract, as a result of which the head pressing force is applied or released correspondingly.

It is at and along the vertex portion of the platen roller 9 that the thermal head 8 is pressed against the platen roller 9 with the ink sheet 6 and the printing paper 7 being interposed between the head 8 and the roller 9. In that case, deformation of the cylindrical platen roller 9 at the vertex portion brought about by the thermal head 8 pressed thereto can be approximated by an elastic contact model representing the contact between a cylinder and a plane. In order to realize a high quality of the recorded or printed image, it is required to position the heat generating part of the thermal head 8 around the center of the length of contact between the cylinder and the plane (i.e. around the center of the nip, as viewed widthwise). In this conjunction, it is to be noted that in the case of the illustrated printing apparatus according to the invention, a head positioning shaft 50 mounted on the the head arm 41 is snugly inserted or fitted in a U-like groove 21 formed in the upper end portion of the roller chassis 29. Thus, there can be realized a structure for ensuring an invariable press-contact position between the platen 9 and the thermal head 8.

As can be seen in FIG. 2, the ink block 5 is composed of a ink-sheet delivery roll 53 and a take-up roll 54 accommodated within the ink cassette 52 and an ink sheet 6 moving from the delivery roll 53 to the take-up roll 54. The ink sheet 6 extending under a tension between the delivery roll 53 and the take-up roll 54 undergoes the pressing action of the thermal head 8, as can be seen from FIG. 1, in which the ink cassette 52 is however omitted from illustration for simplification thereof. The ink sheet 6 fed out from the delivery roll 53 runs over a guide shaft 57 mounted rotatably on the roller chassis 29, 29' and is pressed against the platen roller 9 with the printing paper interposed therebetween by means of the upstream strip-off roller 55 and the downstream strip-off roller 56 disposed at the sides upstream and downstream, respectively, of the platen roller 9 and the thermal head 8, the ink sheet being then wound in the form of the take-up roll 54.

Now, description will be turned to a drive mechanism incorporated in the printing apparatus.

FIG. 3 is a top plan view showing schematically a portion of a drive power transmission mechanism including various rollers and other elements. In this figure, there are omitted from illustration those rollers and other elements which are not driven through the power transmission means such as belts, gears and the like.

The output power of the paper transporting motor 10 mounted on the side plate 31 is transmitted through power transmission means to the paper transporting roller 24, the platen roller 9, the discharge roller 27, the upstream paper feed roller 15a, the downstream paper feed roller 16a and the printing paper roll 12. The paper transporting motor 10 may be constituted, for example, by a step motor. The paper transporting motor 10 drives rotationally the paper transporting roller 24 by way of a belt 58. A gear wheel 61 fixedly secured to the transporting roller 24 meshes via an idler gear 68 with a gear 62 fixedly coupled to the platen roller 9 by way of a one-way clutch 71 having a function capable of transmitting the power only in one of the rotational directions, whereby the torque of the paper transporting motor 10 is transmitted to the platen roller 9. Another gear 63 connected fixedly to the transporting roller 24 meshes with a gear 64 via an idler gear 69. This gear 64 is operatively coupled to the discharge roller 27 by way of a one-way clutch 72 and a torque limiter 74 constituted by a frictional transmission mechanism. The paper transporting motor 10 drives rotationally the discharge roller 27 with a torque of such magnitude which is smaller than a torque value preset at the torque limiter 74. Further, the gear 61 meshes with a gear 65 mounted on the downstream paper feed roller 16a via an idler roller 70. The downstream paper feed roller 16a and the upstream paper feed roller 15a are operatively connected to each other by a belt 60, whereby the torque of the paper transporting motor 10 is transmitted to the downstream paper feed roller 16a and the upstream paper feed roller 15a. Mounted on the upper end of the transporting roller 24 via a one-way clutch 73 is a pulley 76 which is operatively connected to a gear 67 secured to the printing paper roll 12 by way of a belt 59, pulley 77, torque limiter 75 and a gear 66 to thereby transmit a torque to the printing paper roll 12. Thus, the printing paper roll 12 is rotationally driven by the paper transporting motor 10 under the torque of a value smaller than that set at the torque limiter 75. It should however be noted that the printing paper roll 12 is rotated only in the counterclockwise direction by the paper transporting motor 10 through the action of the one-way clutch 73.

FIG. 4 is a view showing schematically a drive mechanism for the cutter block 4, the ink block 5 and the cam 18.

The rotatable blade 39 of the cutter block 4 is rotationally driven by the motor 78 through a reduction gear train.

The ink block 5 is shown with the ink cassette 52 being omitted from illustration. When the ink sheet delivery roll 53 is placed in the printing mechanism, being supported on ink roll bearings 79, 79' mounted on the side plates 31, 31', the gear 90 secured to the delivery roll 53 meshes with a gear 89 mounted by way of a torque limiter 87, which is operatively connected to a delivery motor 81 through a reduction gear train 84. The power of the delivery motor 81 is transmitted to the ink sheet delivery roll 53 through a torque limiter 87 which limits the power transited to the roll 53 at a value smaller than that set at the limiter 87. The drive mechanism for the ink sheet take-up roll 54 is of the same structure as that for the ink sheet delivery roll 53 described above. The driving power of the winding motor 82 is transmitted to the take-up roll 54 by way of a torque limiter 88 and gears 91 and 92 at a value of torque smaller than that set previously at the torque limiter 88.

The cams 18 and 18' mounted at both sides of the cam shaft 93 are rotationally driven by a mode motor 83 by way of a reduction gear train 86. Each of the mode motor 83, the delivery motor 81 and the winding motor 82 may be constituted by a DC (direct current) motor.

Now, description will be turned to an exemplary embodiment of the printing mechanism control circuit 314 by reference to FIG. 5.

The mechanism control circuit 314 shown in FIG. 5 comprises a microcomputer which includes a CPU (Central Processing Unit) 350, a ROM (Read Only Memory) 351, a RAM (Random Access Memory) 352, an output port 355, an input port 356 and an internal bus 354 interconnecting the constituent parts mentioned above, a step motor drive circuit 357 for driving the drive motor 10, DC motor drive circuits 358, 359, 360, 361, a signal level conversion circuit 362 to which various sensor detection signals are inputted, a display circuit 323, a key switch 324, and an external bus input/output interface 353.

The printing mechanism control circuit 314 shown in FIG. 5 starts the printing operation in response to a print command signal inputted from the image processor 312 which is transferred to the digital signal input/output circuit 319 of the control circuit 315 from the digital signal input/output circuit 320 to be subsequently outputted to the data bus 316 or alternatively in response to a print command signal inputted through the key switch 324.

Operation of the printing mechanism control circuit 314 is controlled in accordance with a program stored previously in the ROM 351 and indicating operation procedure or sequence. The CPU 350 decodes the program to perform data processing and arithmetic operations as required and controls data input/output through the output port and the input port. The RAM 352 is used for storing the results of the arithmetic operations, the data inputted and the data to be outputted.

The output signal from the output port 355 is inputted to the step motor drive circuit 357 for controlling the paper transporting step motor 10. Additionally, the output signal from the output port 355 is supplied to the DC motor drive circuits 358, 359, 360, 361 for controlling a DC-motor mode change-over motor 83, an ink sheet take-up motor 82, an ink sheet delivery motor 81 and a cutter motor 78.

On the other hand, the input port 356 fetches therein by way of the signal level conversion circuit 362 for converting the various sensor signals to logic level the detection output signals of a mode position sensor 363, a light-reflection type first (1) paper position sensor 36, a light-reflection type second (2) paper position sensor 38, a contact-switch type cutter position sensor 367, a light-reflection type first (1) ink mark detecting sensor 37a, and a light-reflection type second (2) ink mark detecting sensor 37b, wherein the sensor output signals fetched through the input port 356 are supplied to the microcomputer. The display circuit 323 serves to activate an ink end display 380, a paper end display 381 and a cover open display 382.

Now, description will be made of color recording or printing operation performed by the thermal transfer type color printer according to the instant embodiment of the present invention.

For convenience of description, the side at which the paper feed block 1 is located (right-hand side as viewed in FIG. 1) relative to the platen roller 9 is referred to as the upstream side, while the side at which the cutter block side 4 (left-hand side as viewed in FIG. 1) is located relative to the platen roller 9 is referred to as the downstream side.

In FIG. 2, the printing paper sheet 7 is shown in the state loaded in the printing apparatus in the form of a roll with the ink sheet 6 being shown in the state spanned between the delivery roll 53 and the take-up roll 54. It should first be mentioned that the upward/downward movement of the upstream paper feed roller 15b and the downstream paper feed roller 16b, generation of the pressure at which the pressing roller 25 is pressed against the transporting roller 24 and the generation of the pressure at which the thermal head 8 is pressed against the platen roller 9 are controlled correspondingly in dependence on the rotational or angular positions of the cam 18. In this conjunction, the states of the various rollers set up in dependence on the angular positions of the cam 18 shown in FIG. 2 are referred to as "modes" for convenience of the description. More specifically, with the term "mode 2", the state is represented in which the upstream paper feed rollers 15a and 15b are detached from each other, the downstream paper feed rollers 16a and 16b are brought in contact with each other, the paired transporting rollers 24 and 25 are detached from each other, and the thermal head 8 is moved away from the platen roller 9.

At first, description will be made of an automatic paper feed operation.

This operation is carried out when the absence of the printing paper 7 is detected by the first (1) paper position sensor 36 or when a new printing paper roll 12 is to be used.

The printing paper roll 12 is so disposed that the leading end 7a thereof is positioned between the upstream paper feed rollers 15a, 15b and the downstream paper feed rollers 16a, 16b (shown in FIG. 2). The head block 3 moves downward, whereby the pin 45 is then inserted into the groove 20 of the cam 18. Upon starting of the printing, the cam 18 is caused to start rotation, as a result of which only the upstream paper feed roller 15b is moved downwardly, whereby the printing paper sheet is gripped (nipped) and held between the upstream paper feed rollers 15a and 15b. This state is referred to as the "mode 1" or "paper feed mode". Subsequently, the paper transporting motor 10 is started, whereby the recording paper sheet 7 is moved in the downstream direction under the action of the upstream paper feed roller 15a. Consequently, the leading end portion 7a of the recording paper sheet 7 enters the region of the downstream paper feed rollers 16a and 16b to be nipped therebetween. The recording paper sheet 7 is then transported through cooperation of the upstream paper feed roller 15a and the downstream paper feed roller 16a to reach the transporting block 2. At a time point when the first (1) paper position sensor 36 detects the presence of the printing paper 7, the paper transporting motor 10 is stopped. Next, the paper transporting motor 10 which is constituted by a step motor is rotated for an angular distance corresponding to a predetermined pulse number $N_1$. As the paper transporting motor 10 is rotated, the printing paper 7 continuously enters the region defined between the paired transporting rollers 24 and 25. The paper transporting motor 10 is stopped at the position where the leading end 7a of the printing paper 7 has just leaded the paired transporting rollers 24 and 25. When, the cam 18 is rotated to cause the pressing roller 25 to press against the transporting roller 24, whereby the printing paper sheet 7 is gripped between these rollers 24 and 25. Subsequently, the upstream paper feed roller 15b and the downstream paper feed roller 16b are moved upwardly. The state now prevailing is referred to as "mode 3" or "transport mode". The paper transporting motor 10 is again driven for an angular distance corresponding to a predetermined pulse number $N_2$, which results in that the leading end 7a of the printing paper is moved in the downstream direction by a corresponding length and stops at a position where the leading end portion 7a has just passed over the vertex portion of the platen roller 9. The cam 18 continues to rotate, whereby the transport mode is changed to the mode in which the thermal head 8 is lightly pressed against the platen roller 9. Through rotation of the paper transporting motor 10, the printing paper sheet 7 is fed under the action of the transporting roller 24 and the platen roller 9 until the leading end 7a of the printing paper stops at the position where the leading end portion 7a is nipped between the paired discharge rollers 27 and 28. Subsequently, as the cam 18 is rotated, the transport mode is resumed, whereby the printing paper sheet 7 is further transported in the downstream direction through cooperation of the transporting roller 24 and the discharge roller 27. The paper transportation is stopped at a time point when the second (2) paper position sensor 38 detects the leading end 7a of the printing paper sheet 7. Then, the automatic paper feeding operation comes to an end. It should however be mentioned that when the first (1) paper position sensor 36 detects the presence of the printing paper 7, the transport mode is set up, wherein the output of the second (2) paper position sensor 38 is discriminatively identified. When the second (2) paper position sensor 38 detects the absence of the printing paper 7, the latter is then transported in the downstream direction by means of the transporting roller 24 and stopped when the second (2) paper position sensor 38 detects the presence of the printing paper 7. On the other hand, when the second (2) paper position sensor 38 detects the presence of the printing paper 7, the latter is transported in the upstream direction until the leading end 7a thereof has passed by the second (2) paper position sensor 38. In succession, the paper sheet is transported in the downstream direction and stopped when the leading end 7a of the printing paper is detected by the second (2) paper position sensor 38.

Description will now be made of the printing operation. The state in which the thermal head 8 is pressed against the platen roller 9, starting from the transport mode, is referred to as "record mode".

In the description which follows, the distance or length or, to say collectively, the quantity of transportation is expressed in terms of a number of lines per unit length by taking into account the density of the heat generating resistance elements of the thermal head 8, such as N lines/mm in the case of a thermal head of N dots/mm.

At this juncture, it should be first mentioned that generation or production of a color image or picture by the color printing or printing system according to the instant embodiment of the present invention is carried out by performing alternately the return operation of transporting the printing paper in the downstream direction (reverse direction) and the printing operation during which the printing paper is transferred in the upstream direction (forward direction).

When a printing operation start signal is inputted to the mechanism control circuit, the recording or printing apparatus is set to the transport mode, whereon the printing paper sheet 7 is transported in the downstream direction until the leading end 7a thereof is detected by the photoelectric sensor 38. Parenthetically when the printing paper 7 has been detected by the photoelectric sensor 38 already at the initiation of the transport mode, the printing paper 7 is transported once in the upstream direction until the leading end 7a of the printing paper has passed by the photoelectric sensor 38, whereupon the transportation of the printing paper changed over to the downstream direction. At this juncture, it should be mentioned that in the transport mode, the printing paper is moved at a high speed $V_H$ ($V_H > V_C$) and that transportation of the printing paper 7 is stopped only after the printing paper 7 has been transported additionally for a distance or length corresponding to a number ($L_1$) of lines in succession to the arrival of the printing paper 7 at the photoelectric sensor 38. In parallel with transportation of the printing paper 7, the positioning of the ink sheet 6 is also performed. As can be seen from FIG. 6, the ink sheet 6 is applied sequentially with first color ink (yellow ink), second color ink (magenta ink) and third color ink (cyan ink) at discrete surface areas, respectively. There is affixed to a leading portion of each color area or region a mark for discriminatively identifying the color of ink in that region. For positioning the ink sheet 6, the ink sheet 6 is mound up by the take-up roll 54, during which the mark mentioned above is detected by the ink mark sensors 37a and 37b (hereinafter also referred to collectively as the ink sensor). When mark as detected indicates the color of concern, transportation of the ink sheet 6 is stopped, whereon the ink sheet positioning procedure comes to an end.

Now, the state of the printing apparatus is set to the record mode and the thermal head 8 is pressed onto the platen roller 9. In this printing state, the leading edge of the color region to be used is located at the position of the ink sensors 37a, 37b. Accordingly, the ink sheet 6 and the printing paper 7 are transported in the upstream direction for a distance corresponding to $L_2$ lines without energizing electrically the thermal head 8, as a result of which the leading edge of the color region of concern can reach a position located upstream of the heat generating part of the thermal head 8. At this time point, the printing paper 7 is subjected to a transporting force exerted by the transporting roller 24. Further, the transporting speed at this time is set at a higher speed $V_C$ than that in the state in which the thermal head is energized electrically (i.e. $V_C > V_L$). The paired discharge rollers 27 and 28 and the platen roller 9 are now able to rotate freely because of the presence of the one-way clutches 71 and 72, respectively, and rotate frictionally in following the transportation of the printing paper sheet 7. The ink sheet 6 in turn is transported in the upstream direction at the same speed as the printing paper 7 to be wound into the take-up roll 54.

For the reason described above, the number $L_2$ of lines mentioned above may be equal to or greater than the line number which corresponds to the length of the ink sheet measured between the ink sensor 37 and the heat generating part of the thermal head 8. Further, it is also possible to make $L_2$ equal to zero in the case where the ink sensor 37 is mounted upstream of the platen roller 9.

After transportation for the distance or quantity corresponding to $L_2$ lines, the transporting speed is set at $V_L$ (where $V_C > V_L$), and the thermal head 8 is electrically energized on a line-by-line basis in accordance with the image data to be printed out, while the printing paper sheet 7 and the ink sheet 6 are transported in the upstream direction, to thereby alloy the first color ink (e.g. yellow ink) to be transferred onto the printing paper 7. The quantity of print thus made is assumed to correspond to $L_3$ lines. In the meantime, the ink sheet 6 is transported, being wound up by the take-up roll 54. The printing paper 7 carrying the record printed thereon by the thermal head and the ink sheet 6 are transported in the overlapping or stacked state up to the position of the upstream strip-off roller 55, at which the printing paper 7 and the ink sheet 6 are stripped off or separated from each other.

Once the image has been printed, the thermal head 8 is left in the state not energized electrically while the printing paper sheet 7 and the ink sheet 6 are transported for a distance or length corresponding to $L_F$ lines in the upstream direction and thereafter stopped. Parenthetically, it should be mentioned that the leading end portion 7a of the printing paper sheet 7 may pass beyond the paired discharge roller 27 and 28.

Now, in the state of the record mode, the step motor 10 is rotated in the reverse direction to thereby move the printing paper 7 and the ink sheet 6 in the downstream direction by $L_4$ lines. The transportation at this time is performed at a higher speed $V_C$ ($V_c > V_I$) than the transporting speed in the state in which the thermal head is energized electrically. Due to this operation, the printing paper 7 and the ink sheet 6 are stripped off or separated from each other. In case the leading end 7a of the printing paper has been transported beyond the discharge rollers 27 and 28 in the upstream direction in the transport mode, the printing paper is moved downstream in the record mode to the position where the leading end portion 7a of the printing paper is gripped or nipped between the paired discharge rollers 27 and 28.

Subsequently, the state of the printing apparatus is set to the transport mode, whereon the printing paper sheet 7 is transported downstream for a distance corresponding to $L_5$ lines and then stopped. This transportation is effected at a high speed $V_H$. In this manner, the recording or printing process with the first color ink comes to an end. Simultaneously with this transportation of the printing paper sheet 7, positioning of the ink sheet 6 is performed. In succession, printings with the second color ink (e.g. magenta) and the third color (e.g. cyan) can be performed, respectively, in the sequence similar to the printing started from the printing with the first color ink (yellow ink).

After the printing with the third color ink, the transporting speed is set to $V_C$ in the record mode, whereon the printing paper 7 and the ink sheet 6 are transported downstream for a distance corresponding to $L_4$ lines. Thereafter, the printing apparatus is set to the transport mode of the transporting speed $V_H$, whereon the printing paper 7 is transported downstream by $L_6$ lines and is stopped. Subsequently, the cutter motor 78 is driven to cut off the printing paper strip 7.

In this manner, a full-color image or picture in yellow, magenta and cyan can be generated.

Now, referring to FIGS. 7 to 15, description will be directed to a control method in which in response to designation of size of image size and a printing position of the image on a printing paper, the quantity (distances or lengths) of transportation of the printing paper for controlling the printing position in the printing paper transporting direction as well as the quantity of data transfer to the thermal head for controlling the printing position in the direction widthwise of the printing paper is arithmetically determined for the desired control.

In the first place, description will be made of a method for arithmetically determining the quantity of transportation of the printing paper (i.e. distance or length by which the printing pair sheet is to be moved) in the transporting direction.

Figure 7:
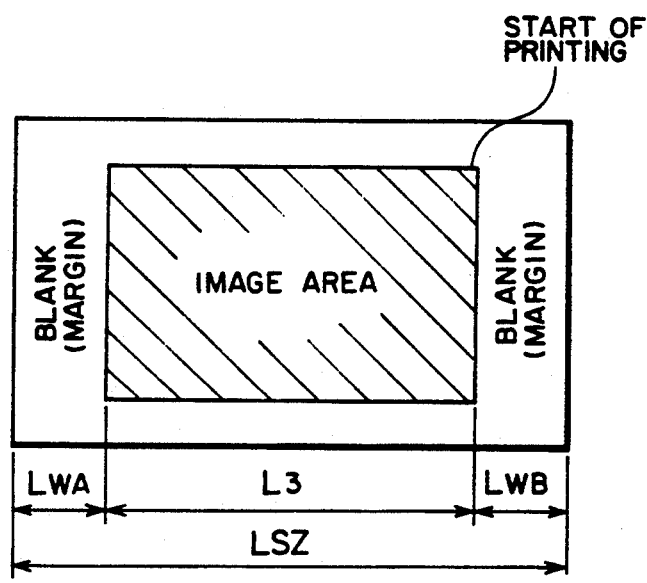
FIG. 7 is a schematic view for illustrating relations among a size of printing paper sheet, the size of image to be printed and position or location at which the image is to be printed.

FIG. 7 is a view for illustrating relations between the printing paper transporting direction, a printing paper area, an image printing area and blank areas of a printing paper.

When the transportation length $L_{SZ}$ of the printing paper, the length $L_3$ of the printing image area in the transporting direction and the printing position or location are supplied as the input values, expressions (1), (2) and (3) mentioned below apply valid.

In this conjunction, it is noted that the printing position or area can be designated in terms of the length $L_{WB}$ of the blank area located at the printing start side and the length $L_{WA}$ of the blank area located at the printing end side.

$$L_{SZ} = L_{WB} + L_3 + L_{WA} \quad (1)$$

$$L_{WB} = L_{SZ} - L_3 - L_{WA} \quad (2)$$

$$L_{WA} = L_{SZ} - L_3 - L_{WB} \quad (3)$$

As can be seen from the above expressions, when either one of the blank length $L_{WB}$ or $L_{WA}$ is designated or inputted, the other can be arithmetically determined in accordance with the expressions (2) and (3). Further, assuming that the blank lengths $L_{WB}$ and $L_{WA}$ are equal to each other, then $$L_{WB} = L_{WA} = (L_{SZ} - L_3)/2 \quad (4)$$

In other words, the printing position can be determined on the basis of the print size or length $L_{SZ}$ and the image size or length $L_3$ to be printed.

When the value of $(L_{SZ} - L_3)$ is given by an odd number, either $L_{WB}$ or $L_{WA}$ can be set longer than the other by one line.

Figure 8:
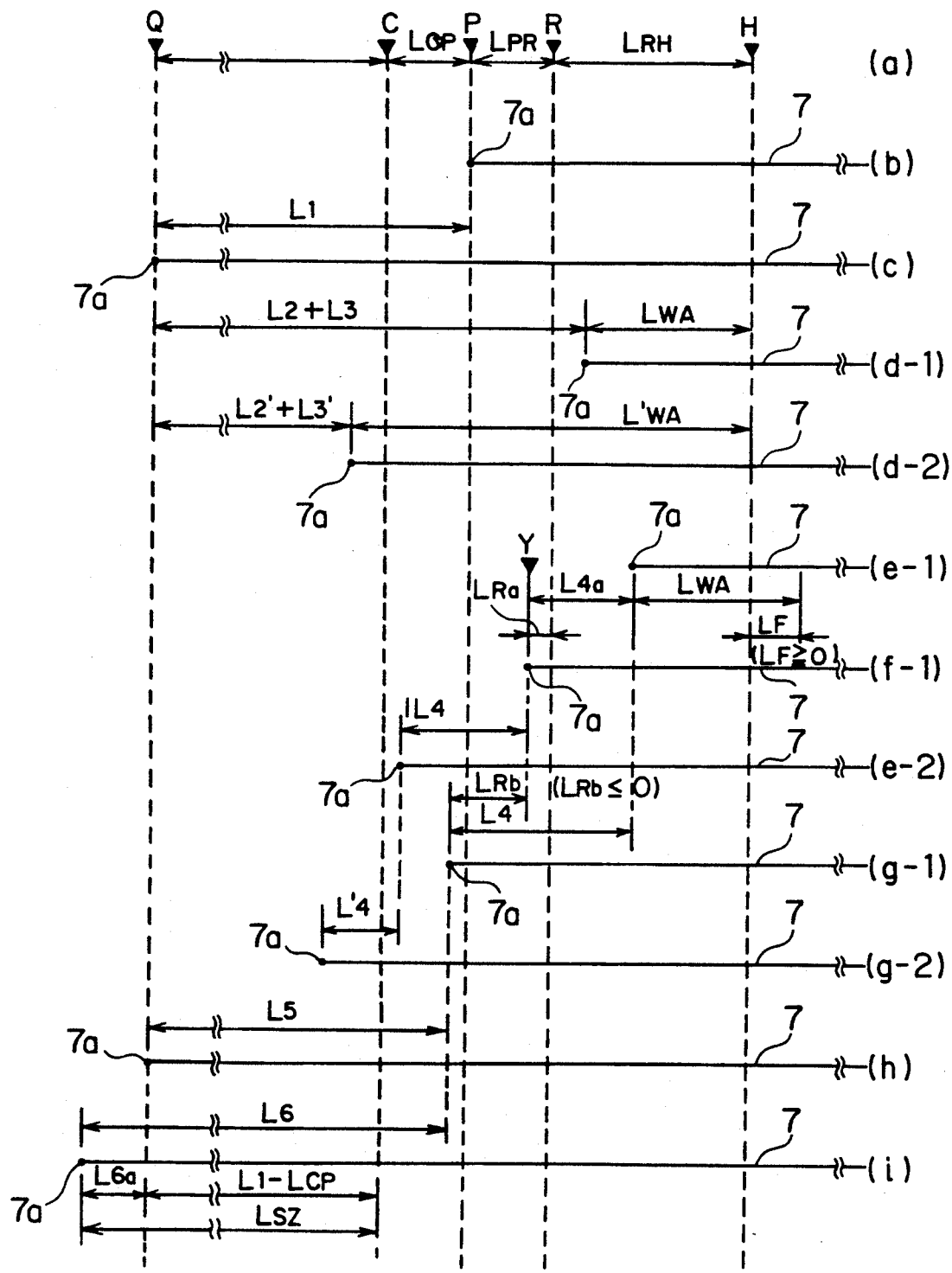
FIG. 8 is a schematic diagram for illustrating sequential positions of a printing paper sheet transported under a printing control schema according to an embodiment of the present invention.

Now, referring to FIG. 8, description will be turned to a method of determining the quantity of transportation of the printing paper sheet in the transporting direction in the color recording or printing apparatus according to the instant embodiment of the invention.

Referring to FIG. 8 at (a), there are illustrated positions or locations (points) in the color printer recording mechanism which the printing paper sheet passes by and the quantities of transportation between these positions.

In FIG. 8(a), a point H indicates the position at which the heat generating part of the thermal head 8 is pressed against the platen roller 9.

A point R indicates the position at which the printing paper sheet is gripped or nipped between the paired discharge rollers 27 and 28.

A point P indicates a position at which the second (2) paper position sensor 38 detects the leading end 7a of the printing paper when the printing paper 7 is transported downstream.

A point C indicates a position at which the printing paper is cut through cooperation of the rotatable blade 39 and the stationary blade 40.

A distance $L_{RH}$ indicates a quantity of transportation from the point H to the point R.

A distance $L_{PR}$ indicates a quantity of transportation from the point R to the point P.

A distance $L_{CP}$ indicates a quantity of transportation from the point P to the point C.

In view of the fact that the ink sensor 37 is located at the position downstream of the thermal head 8 in the case of the color printer according to the illustrated embodiment of the invention, the quantity or distance $L_2$ is required for transportation of a predetermined ink area to the position located beneath the thermal head 8. In other words, $L_2$ indicates a distance for transportation of the ink sheet from the position of the ink sensor to the point H.

At this juncture, it should be mentioned that $L_{RH}$, $L_{PR}$, $L_{CP}$ and $L_2$ are the values determined specifically to the printing mechanism and thus are previously stored as the constants.

At first, the quantity $L_1$ of transportation (distance for transportation) for the first return operation is determined on the assumption that the leading end $7a$ of the printing paper is positioned at the point P shown in FIG. 8 at (b).

This quantity $L_1$ is arithmetically so determined that the length of the printing paper between the leading end $7a$ and the point H becomes equal to (ink sheet transportation $L_2$)+(printing paper size $L_3$)+(blank $L_{WA}$) in accordance with the following expression (5):

$$L_1=L_2+L_3+L_{WA}-(L_{PR}+L_{RH}) \qquad (5)$$

Referring to FIG. 8 at (c), there is illustrated the state of the printing paper transported by $L_1$ in the downstream direction from the state shown in FIG. 8 at (b) in the transport mode.

Next, recording or printing operation with Y ink (yellow ink) is performed. To this end, the printing paper is transported by $(L_2+L_3)$ in the upstream direction in the record mode. The position thus attained by the printing paper is indicated by (d-1) or (d-2), wherein (d-1) indicates the position of the printing paper for a record size $L_3$ of relatively greater length, while (d-2) indicates the position of the printing paper for a record size of a relatively short length.

In order to separate or strip off the ink sheet from the printing paper, the latter is moved in the upstream direction by $L_F$. This transportation quantity $L_F$ is referred to as the separation-dedicated frontward transportation quantity. It should be noted that this quantity $L_F$ varies in dependence on the particular printing mechanisms and it may be equal to 0 (zero).

Referring to FIG. 8 at (e-1) and (e-2), there is shown the state after the transportation by $L_F$.

At this time point, the printing with Y ink (yellow ink) is completed. Accordingly, the transportation quantity for a second return operation is determined, which can be given by $(L_4+L_5)$, wherein $L_4$ represents the quantity or distance of transportation of the printing paper sheet to the point R where the printing paper sheet is nipped between the paired discharge rollers 27 and 28.

Since the leading end $7a$ of the printing paper is located at the position distanced from the point H by $(L_{WA}-L_F)$, as shown in FIG. 8 at (e-1), the quantity of transportation can be determined in accordance with:

$$L_{RH}-(L_{WA}-L_F) \qquad (6)$$

When the quantity of transportation is increased by $L_{Ra}$ in order to allow the printing paper to be positively nipped at the point R, the transportation quantity to the point R can be determined in accordance with:

$$L_{4a}=L_{RH}-(L_{WA}-L_F)+L_{Ra} \qquad (7)$$

Further, With regard to the transportation quantity $L_4$, it is necessary to make distinction in the expression (7) as follows:

When $L_{4a}>0$, $L_4=L_{4a}$, and

When $L_{4a}\leq 0$, $L_4=0$ \qquad (8)

in dependence on whether the leading end of the printing paper is located downstream or upstream of the point R, as shown in FIG. 8 at (e-1) or (e-2).

When the backward strip-off or delamination of the printing paper and the ink sheet is to be performed in the course of the return operation in the print mode, it is necessary to take into account the backward delamination-oriented transportation quantity $L_{Rb}$ in the expression (8) as follows:

$$L_4=L_{4a}+L_{Rb} \qquad (9)$$

The quantity $L_{Rb}$ varies in dependence on the actual printing mechanisms and it may assume the value of zero.

In this manner, the quantity $L_4$ can be determined in accordance with the expressions (7), (8) and (9).

Referring to FIG. 8 at (g-1) and (g-2), there are illustrated the states in which the printing paper has been transported by $L_4$ in the downstream direction from the printing operation end states shown at (e-1) or (e-2), respectively.

Next, the transportation quantity or distance $L_5$ required for the leading end $7a$ of the printing paper sheet to reach the point Q in the transport mode is arithmetically determined.

Since the printing paper moves by $(L_2+L_3+L_F)$ in the upstream direction from the state shown in FIG. 8 at (c) in the Y-ink printing operation and moves by $(L_4+L_5)$ during the second return operation, the quantity $L_5$ can be given as follows:

$$L_5=L_2+L_3+L_F-L_4 \qquad (10)$$

Referring to FIG. 8 at (h), there is illustrated the state in which the leading end $7a$ of the printing paper is positioned at the point Q after the return operation by $L_5$ from the state shown at (g-1) in the same figure. At this time point, the second return operation is completed.

In the similar manner, the printing operations with M-ink (magenta ink) and C-ink (cyan ink) as well as the third and fourth return operations are repeated under the control effectuated by using the transportation quantities mentioned above, whereby a color image or picture is generated.

At this time point, a transportation quantity $(L_4+L_6)$ involved in the paper discharge operation which takes place in succession to the printing operation with C-ink is determined.

The printing paper is moved by $L_4$ in the downstream direction upon completion of the printing operation shown at (e-1) in FIG. 8, as in the case of the return operation described just above, and assumes the state shown at (g-1) in the same figure.

Now, a transportation quantity $L_6$ is determined which is required for the length between the leading end of the printing paper and the cutter cut-off position indicated by the point C to be equal to the printing paper size $L_{SZ}$.

Referring to FIG. 8 at (l), there is shown the state assumed by the printing paper after displacement by $(L_4+L_6)$.

When the length or distance between the leading end $7a$ and the point Q is represented by $L_{6a}$ the transportation quantity $L_6$ can be determined in accordance with $$L_6=L_5+L_{6a} \qquad (11)$$

Since the length or distance from the point C to the leading end 7a is $L_{SZ}$ with the distance between the point C and the point Q being $(L_1-L_{CP})$, $$L_{6a}=L_{SZ}-(L_1-L_{CP}) \qquad (12)$$

From the expressions (11) and (12), $$L_6=L_5+L_{SZ}-(L_1-L_{CP}) \qquad (13)$$

As will be appreciated from the above, in the case of the color recording or printing apparatus according to the illustrated embodiment of the present invention, information of the size of the printing paper as employed, the size of image to be printed and the position for the recording or printing are externally supplied as the input data or information to the printing mechanism control circuit for the color printer, wherein the arithmetic unit incorporated in the control circuit arithmetically determines the transportation quantities for the blank portions of a printing paper as well as the transportation quantity for the image portion in the printing operation as well as the transportation quantities involved in the return operation. By controlling the paper transporting motors of the printing mechanism in accordance with the transportation quantities in accordance with the printing paper being actually used, images of given sizes inputted externally as well as images of given sizes stored in the image memory can be printed on the printing paper at desired positions, whereafter the printing paper can be cut with desired sizes.

Further, since it is unnecessary to externally supply the image data added with white data for the blank areas, the time taken for data transfer can be reduced. Besides, because of no need for loading the white data for the blank areas in the image memory, the memory capacity can be saved, to another advantage.

Additionally, the transportation speed is increased at the blank regions or areas than that at the record region, whereby the time taken for the printing can be reduced, to a further advantageous effect. Moreover, the determination of the transportation quantity involved in the printing paper return operation to be minimum with the return operation speed being increased also contributes to reduction of the printing time.

The information of the size of the printing paper sheet, the image size and the recording or printing position may be transmitted in the form of electric signals or light signals to the input control circuit directly or by way of an interface circuit from an external apparatus.

In another modification, plural types of information such as mentioned above may be previously loaded in the control circuit so that the information can be selectively utilized in response to signals applied externally. To this end, a switch circuit or the like may be provided for selecting the information for utilization. Further, by establishing previously the expressions for arithmetically determining or calculating the printing paper transportation quantities such that both lateral blank regions (i.e. the start and end regions on the printing paper where no ink transfer is made) are substantially equal to each other constantly, and storing previously the expressions in the printing paper transportation quantity arithmetic unit, there can be obtained color prints in which an image or picture of a given size is always located at the center area of the printing paper of any given size (determined by the cutting) by supplying the printing paper size information and the image information to be printed.

Next, description will be turned to a control method on the assumption that the size of image to be printed and the printing position in the row-wise direction in which the heat generating elements of the thermal head are arrayed are given. Hereinafter, this control is referred to as the vertical recording control.

FIG. 9 shows a circuit configuration of the half-tone control circuit 318 and that of the thermal head 8 according to an embodiment of the present invention.

The thermal head 8 comprises a driver 438 for allowing electric currents to flow through the heat generating elements 439 in accordance with the data to be printed during energization current pulses 401 applied together with a head voltage 442, a latch 437 for storing temporarily the output signals from a shift register 436 in response to a latch signal 402 for outputting the data to the driver 438, and the shift register 436 to which input data 1, 2, 3 and 4 resulting from division of the data to be printed are inputted in synchronism with a transfer clock 403. The shift register 436 is correspondingly divided into four stages, wherein the final bits of the output data 1, 2, 3 and 4 outputted from the four stages, respectively, are inputted to the half-tone circuit 318.

The half-tone circuit 318 comprises an electric energization control circuit 400 for generating electric energization data 410 and the energization pulses 401 from the gradation data inputted from the signal bus to cause the thermal head to generate heat, the latch signal 402, the transfer clock 403, values 406 for comparison of upper and lower frame positions and others, for thereby controlling the thermal head, a dual-port memory 411 for storing the energization data, a comparator 407 for generating the upper and lower frame signals 441 and 440 for the purpose of controlling the effective width of heat generation in the thermal head 8, a counter 404 for generating the upper and lower frame positions by counting the transfer clock pulses, EOR (Exclusive-OR) circuits 416, 417, 418 and 419 for exclusively ORing the output signals of serial shift registers 412, 413, 414 and 415 incorporated in the dual-port memory 411 and the outputs 429, 431, 433 and 435 of the shift register 436, respectively, an AND circuit 420 for logically ANDing the output of the EOR circuit 416, the upper frame signal 441 and an all-dot "0" signal, AND circuits 421 and 422 for logically ANDing the all-dot "0" signal and the outputs from the EOR circuits 417 and 418, respectively, an AND circuit 423 for logically ANDing the output from the EOR circuit 419, the lower frame signal 440 and the all-dot "0" signal, and OR circuits 424, 425, 426 and 427 for logically ORing the outputs of the AND circuits 420, 421, 422 and 423 and an all-dot "1" signal, respectively. Parenthetically, it should be added that the dual-port memory 411 includes a RAM for storing data inputted and a serial shift-register part for outputting serially the data stored in the RAM.

Figure 11:
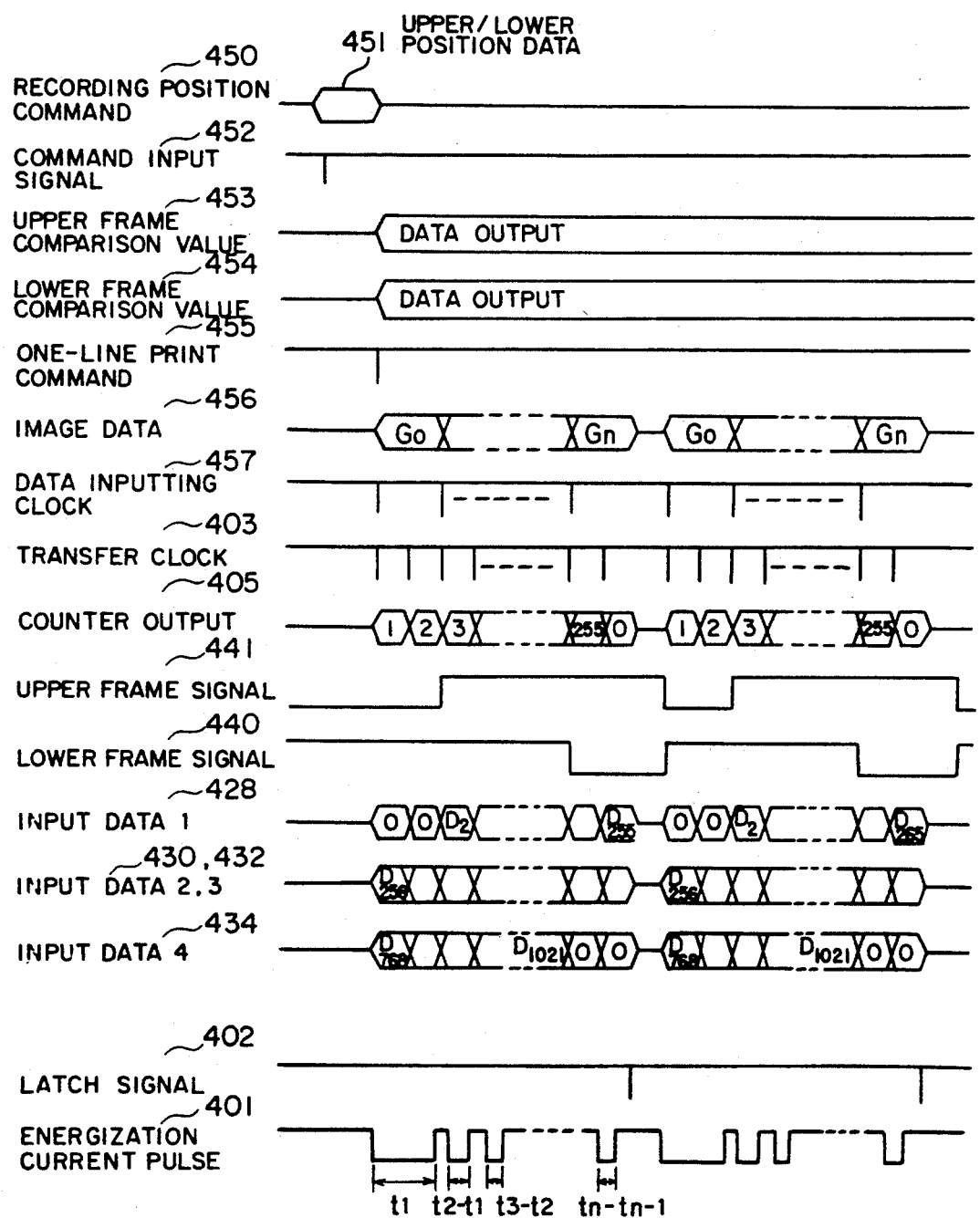
FIG. 11 is a timing chart for illustrating timing at which the printing position data are controlled by the half tone control circuit incorporated in the system shown in FIG. 1.
Figure 12A:
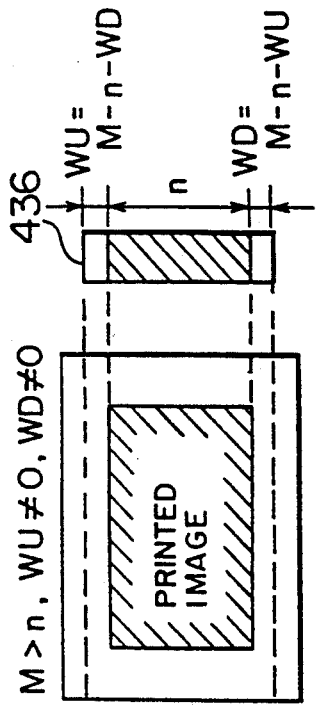
FIGS. 12A to 12D is a view for illustrating relationships between printing positions in the primary scanning direction.
Figure 12B:
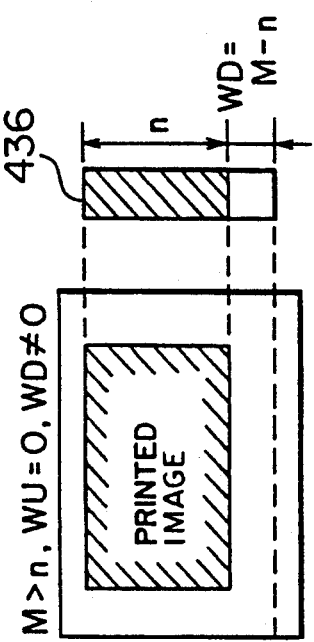
Figure 12C:
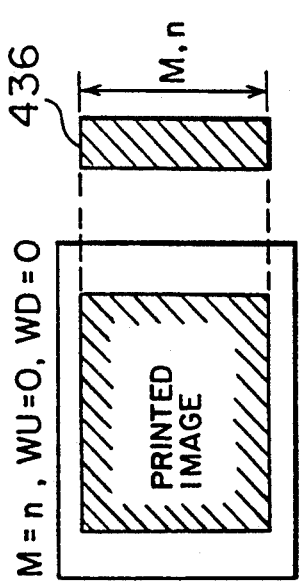
Figure 12D:
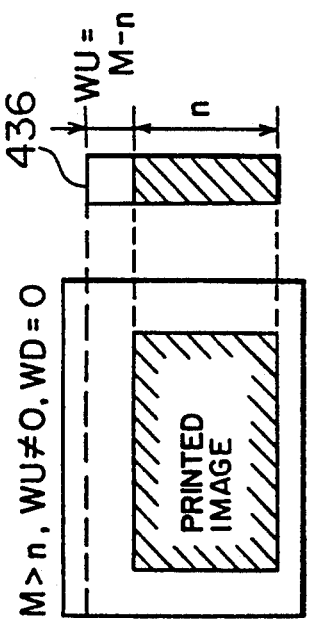

The vertical printing control performed by the half-tone circuit shown in FIG. 9 will be explained below by reference to a time chart shown in FIG. 11.

At first, in response to a printing position command 450 and a command input signal 452, top and bottom position data 451 are inputted to the energization control circuit 400. These signals are supplied from the printing mechanism control circuit 314. The energization control circuit 400 outputs an upper frame comparison value 453 and a lower frame comparison value 454 as the outputs from the comparator 407.

When a one-line print command signal 455 is inputted to the energization control circuit 400, the latter receives as the input thereto the image data 456 in synchronism with the data input clock 457 to convert the data 456 into the electrical energization data 410 which is then stored in the dual-port memory 411. Further, the energization control circuit 400 reads out the energization data stored precedingly by one line from the RAM of the dual-port memory 411 to supply the data to the serial shift registers 412, 413, 414 and 415, which data are then outputted to the EOR (Exclusive-OR) circuits 416, 417, 418 and 419 in synchronism with the transfer clock 403.

The energization data supplied from the serial shift registers are exclusively ORed with the output signals from the shift register of the thermal head 8. Since data of all "1" are placed in the shift register of the thermal head 8 as the initial data by the all-dot "1" signal 408, there is inputted to the thermal head 8 the data of "1", i.e. the signal for causing the resistance elements to generate heat, until the energization data become "1".

The counter 404 counts the transfer clock pulses 403 to supply a counter output signal 405 to the comparator 407 which compares the upper frame comparison value 453 with the counter output signal 405 to generate an upper frame signal 411. Further, the counter output signal 405 is compared with the lower frame comparison value 544, whereby a lower frame signal 440 is generated.

The upper and lower frame signals 441 and 440 are logically ANDed with the outputs of the EOR circuits by the associated AND circuits, respectively. The all-dot "0" signal is set to logic "1" level.

In the AND circuit 420, the output from the EOR circuit 416 is logically ANDed with the upper frame signal 441, whereby a signal 428 representing the input data 1 is outputted. The all-dot "1" signal is set to the logic "0" level.

Since the output of the AND circuit 420 is "0" so long as the upper frame signal 441 is "0", the data preceding to $D_2$ is "0", as indicated by the input data 1. With the data of "0", no heat is generated at the corresponding locations in the thermal head 8.

The output signals from the EOR circuits 417 and 418 are transferred intact as the input data 2 (denoted by 430 in FIG. 9) and the input data 3 (designated by 432 in FIG. 9) to the thermal head without undergoing any limitation in the AND circuits 421 and 422 and the OR circuits 425 and 426.

The output signal from the EOR circuit 419 is logically ANDed with the lower frame signal 440 by the AND circuit 423 to output a signal 434 representing the input data 4.

Since the AND circuit 423 continues to output "0" so long as the lower frame signal 440 is "0", the data succeeding to $D_{1021}$ are "0" as indicated by the input data 4.

With the data of "0", the corresponding portions of the thermal head 8 generate no heat.

As will be understood from the above, the energization data undergo such limitation by the upper and lower frame signals as to generate the white portions where no data are transferred to the printing paper and the data portion for which the data of a length corresponding to the image size are transferred.

With regard to the storage location of the energization data 410 generated by the energization control circuit 400 in the dual-port memory 411, the addresses for the storage are sequentially shifted in the ascending order starting from the zoroth address.

At the end of the energization by the pulses 401, the latch signal 402 is generated for allowing the latch circuit 437 to latch the data from the shift register 436.

The energization data inputted to the latch circuit 437 one line before are transferred to be printed on the printing paper by the energization pulses 401 in parallel with the inputting of the image data 456. The durations of these energization pulses 401 are selectively determined in dependence on the gradation-versus-transfer density characteristic, as is illustrated in FIG. 10. The width of the energization pulse is given in terms of difference in the energization duration between the adjacent gradations.

FIGS. 12A-12D show the state of record areas or regions printed according to the method described above.

Referring to FIGS. 12A-12D, M represents the maximum number of data capable of being printed with one line of the thermal head 8, and N represents a vertical size of an image or picture to be printed, and n represents the number of data actually printed by one-line printing on the printing paper 7, wherein the state in which the data have been transferred to the shift register 436 is shown together with the result of the printing. More specifically, there is illustrated at (a) in FIG. 12A a case in which the white data is 0 (zero), i.e. M=n. When N>n, the portion beyond n is erased from the result of the printing. Where are illustrated at (b), (c) and (d) in FIGS. 12B, 12C and 12D the cases where the white data are added, in which the number of the white data for the top blank is represented by WU, while that for the bottom blank is represented by WD. In these cases, N may smaller than n as well. However, the portion beyond n is erased from the result of the printing as in the case of FIG. 12A. Since M is given by a constant determined by the thermal head 8, it is possible to record an image or picture on the printing paper 7 at an arbitrary position relative to the vertical on the printing paper by supplying the data n to the half-tone control circuit 318 as the information representing the vertical size of the image to be printed while supplying WU and WD as the record position or location information in the vertical direction to the circuit 318. Besides, the information mentioned above may be supplied to the mechanism control circuit 314 which then supplies the information and/or commands to the half-tone control circuit 318. In this conjunction, it should also be mentioned that the information of the vertical image size to be printed as well as the information of the printing position or location may be supplied in the same manner as other types of information (such as the information of the printing paper size, information of the image size to be printed in the transporting direction of the printing paper and the information of the printing position or location).

Figure 14A:
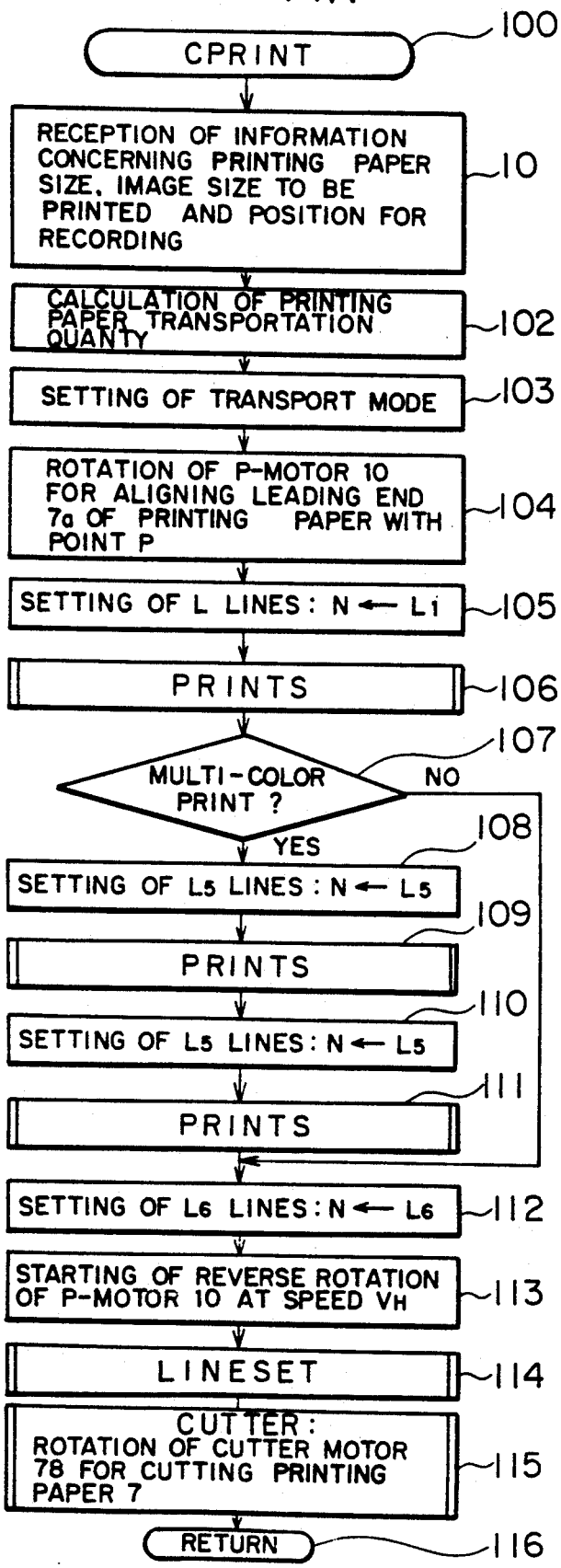
FIGS. 14 and 15 are flow charts showing subroutines involved in the printing operation.
Figure 14B:
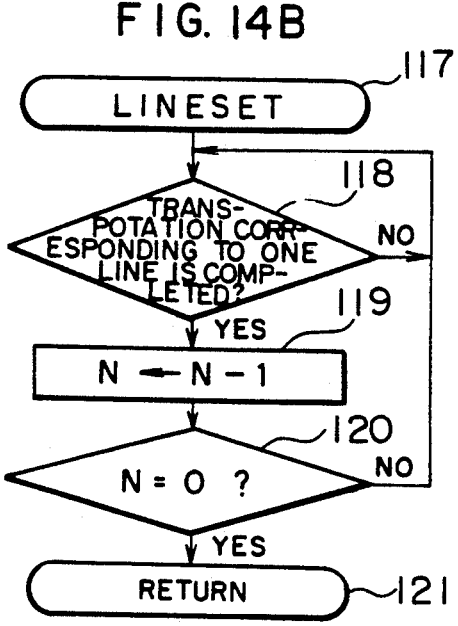
Figure 15A:
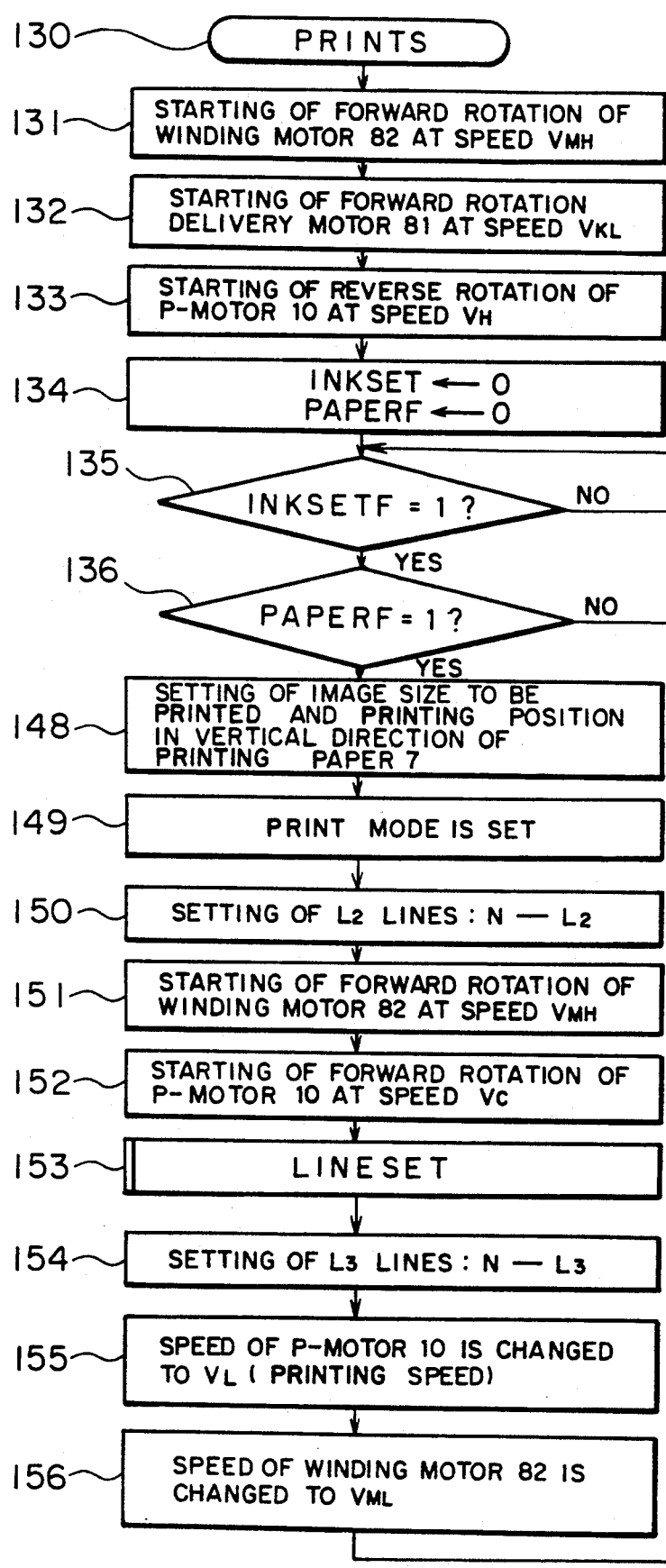
Figure 15C:
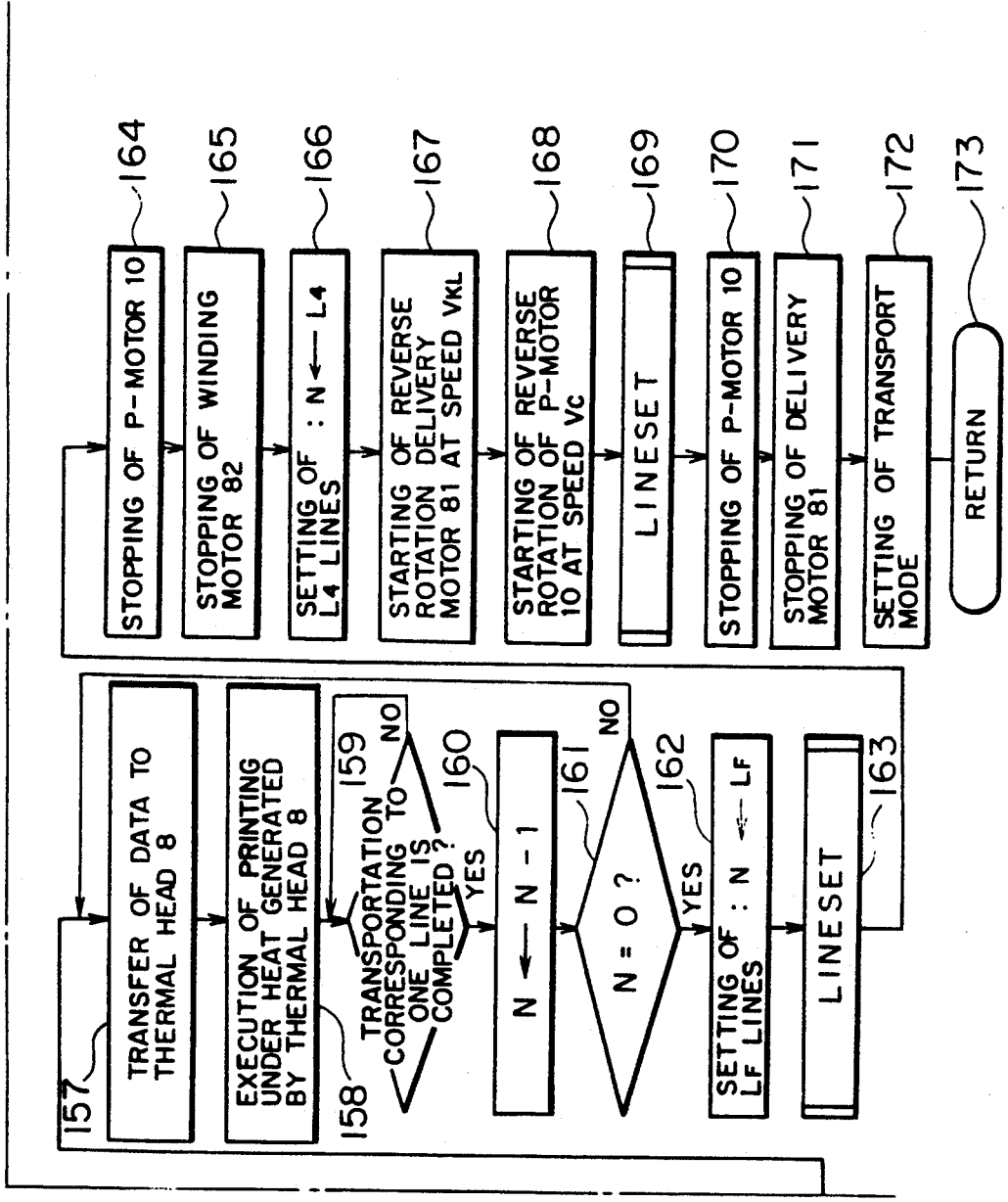

Next, referring to FIGS. 13 to 15, description 111 be made of a printing sequence program for carrying out the printing according to an exemplary embodiment of the present invention. In the description which follows, it is assumed that the rotational direction of the paper transporting motor 10 for transporting the printing paper 7 in the upstream direction corresponds to the forward rotational direction with the rotation of the motor 10 for the paper transportation in the downstream direction corresponding to the backward or reverse direction. In the flow charts referred to in the following description, the paper transporting motor 10 is described as the P-motor. The rotational direction of the winding motor 82 for taking up the ink sheet is referred to as the forward direction. The rotational direction of the delivery motor 81 upon delivering the ink sheet 6 is also referred to as the forward direction with the rotational direction of the same motor upon taking up the ink sheet being referred to as the reverse direction. The paper transporting motor 10 has three different speeds $V_H$, $V_C$ and $V_L$, wherein it is assumed that $V_H > V_C > V_L$. The winding motor 82 has two different rotational speeds represented by $V_{MH}$ and $V_{ML}$, respectively. Similarly, the delivery motor 81 also has two different rotation speeds which are represented by $V_{KH}$ and $V_{KL}$, respectively. Upon completion of setting of the ink sheet, a flag "1" is stored at a memory address labeled "INKSETF". Besides, after the printing paper 7 has been transported by lines $L_1$ or $L_5$, a flag "1" is stored at a memory address labeled "PAPERF".

When the printing start signal is inputted to the printing mechanism control circuit 314, a main routine which is shown in FIG. 13 and described later on is activated, whereon a printing sequence program is started at a step 100 shown in FIG. 14.

Referring to FIG. 14, information of the size of the printing paper, the size of the image to be recorded or printed and the printing position is inputted at a step 102, whereon a step 102 is executed.

At the step 102, the printing paper transportation quantities (i.e. the distances for which the printing paper is to be transported) $L_1$, $L_2$, $L_3$, $L_F$, $L_4$, $L_5$ and $L_6$ are calculated in accordance with the arithmetic expressions stored previously, whereon the processing proceeds to a step 103.

At the step 103, the return of the printing paper in the downstream direction and setting of the ink sheet relative to the thermal head are performed, whereon the printing operation with Y-ink (yellow ink) is started. At the step 103, the printing mechanism is set to the transport mode. More specifically, the thermal head is detached from the platen roller, and any slack in the ink sheet is removed, whereon the procedure proceeds to a step 104.

At the step 104, the paper transporting motor 10 is rotated to thereby align the leading end 7a of the printing paper with the point P, whereon the procedure proceeds to a step 105.

At the step 105, the transportation quantity $L_1$ is set at the line number counter, whereon the processing proceeds to a step 106 which is a subroutine "PRINTS" shown in FIG. 15.

Referring to FIG. 15, execution of the subroutine "PRINTS" is started at a step 130.

In this subroutine, steps 131 to 147 are executed for transporting the printing paper 7 by $L_1$ in parallel with setting of the ink sheet at the printing position.

More specifically, at the steps 131 and 132, rotation of the winding motor 82 is started in the forward direction at the speed $V_{MH}$ for setting the ink area of color concerned. The delivery motor 81 is started to rotate at the speed $V_{KL}$ in the forward direction. Subsequently, the procedure proceeds to a step 133.

At the step 133, the paper transporting motor 10 is started to rotate in the reverse direction at the speed $V_H$ for displacing the printing paper by the transportation quantity $L_1$. In the case of the illustrated embodiment under consideration, pulses are supplied for rotating the step motor 10 for a predetermined period. Then, the procedure proceeds to a step 134.

At the step 134, "0" is set at the addresses "INKSETF" and "PAPERF", respectively. Then, progress is made to a step 135.

At the step 135, it is checked with the aid of the flag "INKSETF" whether or not the ink color has been set. When the ink color has been set (YES), the procedure proceeds to a step 136. Otherwise (NO), the processing for a series of steps 142 to 147 is executed.

At the steps 142 and 143, it is checked whether or not the mark identifying the ink of concern is detected. If detected (YES), the processing proceeds to the step 144. If otherwise (NO), jump is made to the step 147.

When the ink identifying mark of concern is detected through the decision steps 142 and 143, the delivery motor 8i is stopped, the winding motor 82 is stopped and the ink set completion flag is set (i.e. the flag "INKSETF" is set to "1") at the steps 144, 145 and 146, respectively. Then, the procedure proceeds to a step 147.

At the step 147, it is checked whether or not the flag "PAPERF" is "1", indicating completion of the paper transportation. When the paper transportation has been completed, return is made to the step 135. On the other hand, unless the paper transportation is not completed yet, the printing paper transportation steps 137 to 141 are then executed.

More specifically, at the step 137, decision is made as to whether or not the printing paper has been fed by one line. If so (YES), the processing proceeds to the step 138. If otherwise (NO), the step 137 is again executed.

At a step 138, the content of the line counter is decremented by "1". At a step 139, decision is made as to whether or not the content of the line counter is zero. If so (YES), this means that the transportation has been completed. Accordingly, the procedure proceeds to a step 140. If the above decision step 139 results in other value than zero (NO), return is made to the step 135, since the transportation is on the way at that time.

At the step 140, the paper transporting P-motor 10 is stopped because transportation of the printing paper has been completed. Accordingly, the printing paper transportation completion flag, i.e. "PAPERF" is set to "1" at step 141, whereon return is made to the step 135.

At a step 136, decision is made as to whether or not the flag "PAPERF" is set to "1", indicating the completed transportation of the printing paper. When the flag "PAPERF" is "0" (NO), indicating that the paper transportation of concern is not completed yet, the printing paper transportation steps 137 to 141 are executed. On the other hand, when the flag "PAPERF" is "1" (YES), the procedure proceeds to a step 148.

Through the procedure described above, the return or backward transportation of the printing paper by $L_1$ for printing in the first color and the ink setting for the Y-color printing have been completed. Now, the image printing operation is started.

At a step 148, the size of the image to be recorded or printed and the printing position therefor in the vertical direction on the printing paper are set at the half-tone control circuit 318, whereon the operation proceeds to a step 149.

At the step 149, the printing mechanism is set to the print mode. More specifically, the thermal head is pressed against the platen roller. The procedure then proceeds to a step 150.

At the step 150, the printing paper transportation quantity $L_2$ (i.e. the distance for which the ink sheet is moved to the ink mark detecting sensor and the thermal head) is at the line number counter. Then, the processing proceeds to a step 151.

At the step 151, the ink sheet winding or take-up motor 82 is started to rotate in the forward direction at a speed $V_{MH}$. At the step 152, the paper transporting P-motor 10 is also started to rotate in the forward direction at the speed $V_C$. To this end, pulses are supplied to rotate the step motors for a predetermined period. Thereafter, the processing proceeds to a subroutine "LINESET" at a step 153.

The subroutine "LINESET" shown in FIG. 14 at (b) is thus executed, starting from a step 117. Through this subroutine, the printing paper is transported for a distance corresponding to the value set at the line number counter.

At a step 118, decision is made as to whether or not the printing paper has been moved by one line. If so (YES), the processing proceeds to a step 119. Otherwise (NO), the step 118 is regained.

At the step 119, the content of the line number counter is decremented by one, whereon execution proceeds to a step 120.

At the step 120, decision is made as to whether or not the content of the line number counter is zero. If zero (YES), this means that the transportation of concern has been completed. Accordingly, a step 121 is executed, whereby the step 154 shown in FIG. 15 is regained.

If the counter value is found to be other than zero at the step 120, this means that the transportation is still on the way. Accordingly, the step 118 is resumed.

Next, the thermal head is caused to generate heat for performing the printing.

Referring to FIG. 15, at a step 154, the printing line number $L_3$ is set at the line counter, whereon the processing proceeds to a step 155.

At the steps 155 and 156, the speed of the paper transporting motor 10 is set to $V_L$, and that of the ink sheet take-up motor 82 is set to $V_{ML}$, whereon a step 157 is reached.

Through steps 157 to 161, the thermal head is caused to generate heat for recording or printing the gradation data in an amount corresponding to $L_3$ lines.

More specifically, at the steps 157 and 158, the gradation data for one line is transferred to the thermal head 8 to make the corresponding heat generating elements generate heat, and ink is transferred from the ink sheet 6 to the printing paper 7.

At a step 159, decision is made as to whether or not the printing paper has been transported by one line. If so (YES), the processing proceeds to a step 60. Otherwise (NO), return is made to the step 159.

At the step 160, the content of the line number counter is decremented by one, and the procedure proceeds to a step 161.

At the step 161, decision is made as to whether or not the content of the line number counter is zero. If so, this means that the printing has been completed. Accordingly, execution of a step 162 follows. On the other hand, when the line number counter contained other value than zero, this means that the printing operation is still on the way. Accordingly, return is made to the step 157.

Next, a front strip-off operation for separating the printing paper and the ink sheet is performed.

At a step 162, a front strip-off quantity (the number of lines for which the printing paper and the ink sheet are to be separated) $L_F$ is set at the line number counter, being followed by execution of a subroutine "LINESET" at a step 163.

At the step 163, the printing paper is moved for a distance corresponding to $L_F$ lines, whereon the processing proceeds to a step 164.

At the steps 164 and 165, rotations of the paper transporting motor 10 and the ink sheet take-up motor 82 are stopped, respectively.

Subsequently, operation for moving backward the printing paper to the paired discharge rollers 27 and 28 is performed.

To this end, the transportation quantity $L_4$ is set at the line number counter at a step 166.

At steps 167 and 168, the ink sheet delivery motor 81 is started to rotate in the reverse direction at the speed $V_{KH}$, while the paper transporting motor 10 is started to rotate at the speed $V_C$ in the reverse direction. In the case of the illustrated embodiment, the step motor energizing pulses are supplied to this end.

At a step 169, the subroutine "LINESET" is executed, and the printing paper is moved by $L_4$ lines.

At steps 170 and 171, rotations of the printing paper transporting motor 10 and the ink sheet delivery motor 81 are stopped, respectively.

At a step 172, the printing mechanism is set to the transport mode. More specifically, the thermal head is moved away from the platen roller and any slack in the ink sheet is eliminated. The step 173 is executed, whereby return is made to the step 107 shown in FIG. 14.

Next, printing or printing operations with ink in magenta and cyan are performed. In this conjunction, decision is made at the step 107 as to whether or not multi-color printing (printing) is to be performed. If the answer of the decision step 107 is affirmative (YES), printing with ink of magenta is executed at steps 108 and 109, while printing with cyan ink is performed at steps 110 and 111. On the other hand, when the printing of concern is to be performed through monocolor printing (i.e when the decision step 107 results in "NO"), the processing proceeds to a step 112.

More specifically, at the steps 108 and 109, the printing paper transportation quantity $L_5$ is set at the line number counter, and the subroutine "PRINTS" for the printing in magenta is executed.

At the steps 110 and 111, the printing in cyan is carried out in the similar manner.

Now, the paper discharge operation can be executed.

At the step 112, the printing paper transportation quantity (displacement) $L_6$ required for discharging the printing paper is set at the line number counter.

At a step 113, the printing paper transporting motor 10 is caused to rotate at the speed $V_H$ in the reverse direction. In other words, pulses are supplied to the step motor for a predetermined period so that the motor is rotated at the constant speed.

At a step 114, the subroutine "LINESET" is executed to thereby move the printing paper by $L_6$ lines.

At a step 115, the cutter motor 78 is driven to cut the printing paper 7.

At a step 116, the printing sequence or procedure comes to an end, whereon the stand-by state for a succeeding printing operation is entered.

As will be appreciated from the above description, it is possible according to the present invention incarnated in the illustrated embodiment to print an image or picture of an arbitrary size at a desired position or location on a printing paper capable of being subsequently cut in a desired size with a single printing apparatus in which a roll of printing paper is employed, merely through inputting of the size information of an image to be printed and the positional information thereof in the transporting direction of the printing paper 7 as well as the size and positional information of the image in the vertical direction together with the size information of the printing paper.

When a mono-color ink sheet 6 is used without performing the printing in the second and third colors, there can be obtained a mono-color print. Further, in a modification, the printing sequence for obtaining the multi-color printed matter may be combined with a mono-color printing sequence such that they can be changed-over to each other by means of a switch or with the aid of an electrical or optical signal. In that case, not only the multi-color printed matters but also the mono-color print can be prepared by one and the same printing apparatus.

Now referring to FIG. 13, description will be made of the main routine in the operation flow of the printing mechanism control circuit for controlling the printing mechanism. In this figure, double-line frames indicate the subroutines.

Upon power-on, resetting takes place at 601, whereby the CPU 350 of the mechanism control circuit 314 is initialized with regard to hardware thereof, and then execution of a processing program for the main routine 600 is started.

At first, at a step 602, allocation of input ports, output ports, built-in timer interrupt and other initialization processings are performed, whereby initial values are made available at the output ports. The initial data required for the control are loaded in the RAM. Initial sensor data are fetched via the input ports to be stored in the RAM. Then, a step 604 is executed.

At the step 604, decision is made as to whether or not a cover of the printing mechanism is opened. When the cover is opened, the step 604 is executed again, while otherwise the routine proceeds to a step 605.

At the step 605, an indication lamp indicating the opened state of the cover is turned off.

At a step 606, decision is made as to whether or not a printing interruption flag has been set (ON). If so, this means that the printing interruption has occurred in the course of the preceding printing operation. Accordingly, a printing interruption processing shown at steps 607 to 613 is executed. When the flag of concern is not set (i.e. OFF), the processing proceeds to a step 614.

At the step 607, the printing interruption flag is reset (OFF).

At the step 609, the printing mechanism is set to the transport mode.

At the step 610, the transportation quantity $L_C$ (having a value greater than the size $L_{SZ}$ of the printing paper) is set at the line counter N.

At the step 609, the printing paper transporting motor 10 is driven in the forward direction to thereby transport the printing paper at the speed $V_H$ in the downstream direction.

At the step 611, the subroutine "LINESET" is executed to perform the transportation corresponding to $L_C$.

At the step 612, the printing paper transporting motor 10 is stopped.

At the step 613, the subroutine "CUTTER" is executed to cut the printing paper 7. In this manner, the printing paper already printed in the preceding printing cycle which has been interrupted can be discharged, whereby duplicate-printing can be evaded. The processing can then proceed to a step 614.

At the step 614, the print command signal is accepted. If this signal is "ON", indicating the start of printing, the routine proceeds to a step 615. When it is "OFF", the step 614 is resumed, and the print command is waited for.

At the step 615, a subroutine "INIT" is executed to set the printing paper 7 in the initial state.

At the step 616, decision is made as to whether or not the ink sheet has been consumed or exhausted. If the ink sheet sensor output is "OFF", indicating that the ink sheet can still be used, the routine proceeds to a step 618. On the other hand, when it is "ON", it is decided that the ink sheet has been exhausted, whereon the routine proceeds to a step 617.

At the step 617, it is checked whether or not the ink cassette sensor output is "OFF". When it is "OFF", indicating that the ink cassette is removed from the printing mechanism, the routine proceeds to a step 618. On the other hand, when it is "ON", the step 617 is again executed.

At the step 618, it is checked whether the ink cassette sensor output is "ON". When this sensor output is "ON", indicating that the ink cassette is placed in the printing mechanism, the ink cassette indicator lamp is turned off, whereon the processing proceeds to a step 619. On the contrary, when the cassette sensor output is "OFF", the ink cassette indicator lamp is turned on, whereon return is made to the step 604.

At the step 619, the ink end flag is set "OFF". further, the ink end indicator is turned off.

At the step 620, the paper end flag is checked for deciding whether or not the printing paper 7 has been exhausted. If it is "ON", indicating the exhaustion, the processing proceeds to a step 621. If it is "OFF", then a step 622 is executed.

At the step 621, the paper cassette sensor is checked. When the sensor output is "OFF", indicating the absence of the cassette in the printing mechanism, the processing proceeds to the step 622. If it is "ON", the step 621 is executed again.

At the step 622, decision is made as to whether or not the paper cassette sensor output is "ON". If it is "ON", indicating that the printing paper cassette is placed in the printing mechanism, the paper cassette indication lamp is turned off, whereon the processing proceeds to a step 623. If it is "OFF", the paper cassette indication lamp is turned on, and return is made to the step 604.

At the step 623, the paper end flag is set "OFF", and the paper end indication is turned off.

At the step 624, it is checked whether or not a consecutive printing flag is "ON". If it is "ON", indicating the consecutive printing, the processing proceeds to a step 625. When it is "OFF", jump is made to a step 626.

At the step 625, decision is made as to whether the content of a consecutive printing number counter C is zero or not. If it is zero, indicating the first printing, the processing proceeds to a step 626. If the counter value is other than zero, jump is made to a step 628.

At the step 626, zero is set at the consecutive printing number counter C.

At the step 627, an automatic paper feeding is performed, whereby the printing paper is set to the initial state for the print operation.

At the step 628, the printing operation go-on flag indicating that printing operation is being performed is set "ON".

At a step 629, a subroutine "CPRINT" is executed for preparing a color print in Y, M and/or C.

At a step 630, the printing operation go-on flag is set "OFF".

At a step 631, the content of the consecutive printing number counter C is incremented by 1 (one). Then, return is made to the step 604.

As will be appreciated from the above description, it is achieved according to the teaching of the present invention that when error such as opening of the cover of the printing mechanism in the course of the printing or the like is detected, as the result of which the printing is interrupted, the portion of the printing paper used in the interrupted printing operation is discharged upon starting of a succeeding printing operation, whereby the duplicate or overlap printing is positively prevented.

Further, when the ink film and/or the printing paper has been exhausted, the ink and/or printing paper end indication is generated with the printing operation being inhibited until the ink sheet and/or the printing paper is placed available in the printing mechanism.

Besides, when the consecutive printing flag is set indicating admission of the consecutive printing, the printing paper is consecutively printed with a succession of images or pictures without being cut upon every printing. This feature is advantageous in such application where a series of motions are to be printed in consecution.

Figure 16:
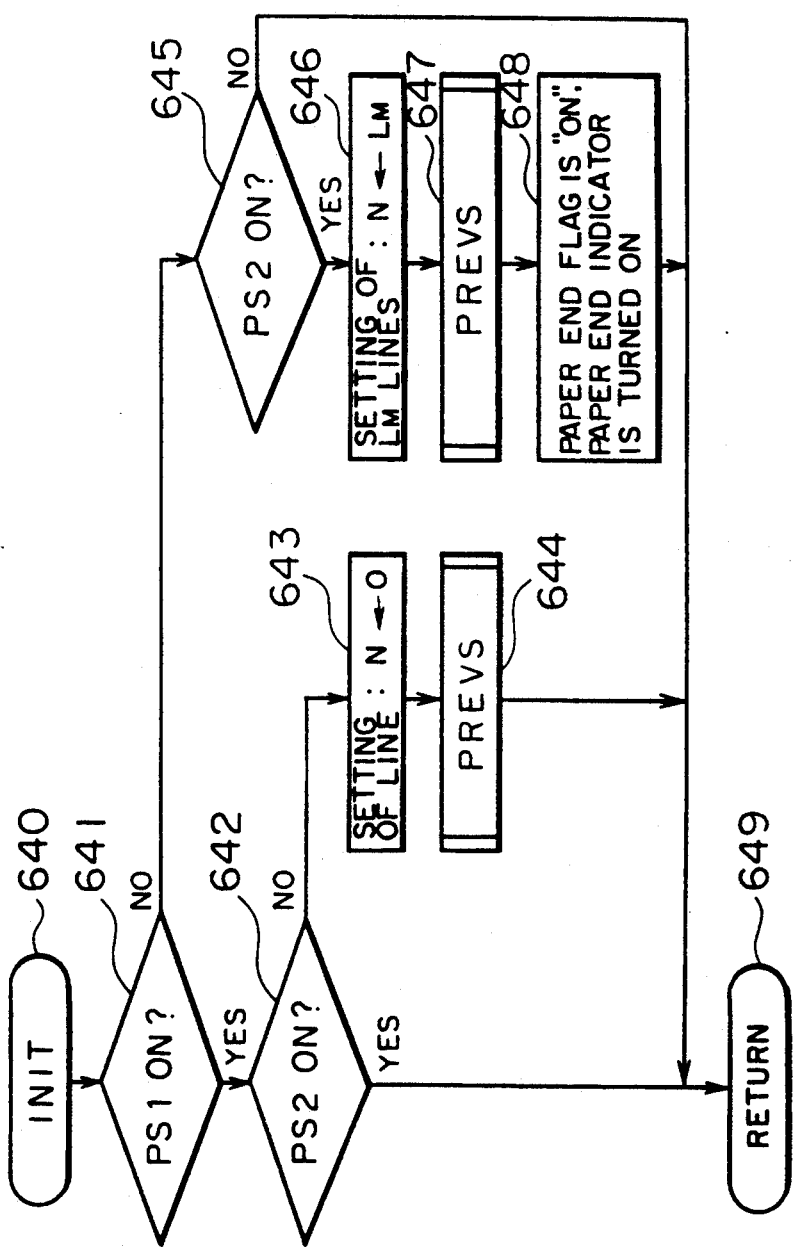
FIG. 16 is a flow chart for illustrating initial operation performed on a printing sheet.

FIG. 16 is a flow chart for illustrating operation flow of the subroutine "INIT", which is to serve for setting the printing paper in the predetermined state in accordance with the states of printing paper sensors PS1 (first paper position sensor 36) and PS2 (second paper position sensor 38).

So long as the outputs of the printing paper sensors PS1 and PS2 are "OFF", the stand-by state is continued. On the other hand, when the sensor PS1 output is "OFF" with the output of the paper sensor PS2 being "ON", it is decided that the paper has been exhausted (paper end), whereon the printing paper is wound up to thereby allow the printing paper to be taken out from the printing mechanism.

On the other hand, when the output of the paper sensor PS1 is "ON" with that of the sensor PS2 being "OFF", the printing paper is wound back to the position at which the paper sensor PS1 outputs "OFF".

When the paper sensor PS1 output is "ON" with sensor PS2 outputting "ON", the stand-by state is set.

Now, execution of the subroutine "INIT" is started at a step 640.

At a step 641, decision is made as to whether the output of the paper sensor PS1 is "ON". If so, the processing proceeds to a step 642, while otherwise (i.e. If "OFF") branch is made to a step 645.

At the step 645, it is decided if the paper sensor PS2 output is "ON". If "ON", the processing proceeds to a step 646, and otherwise to a step 649.

At the step 646, the transportation quantity $L_M$ (i.e. corresponding line number) is set at the line counter N.

Figure 19:
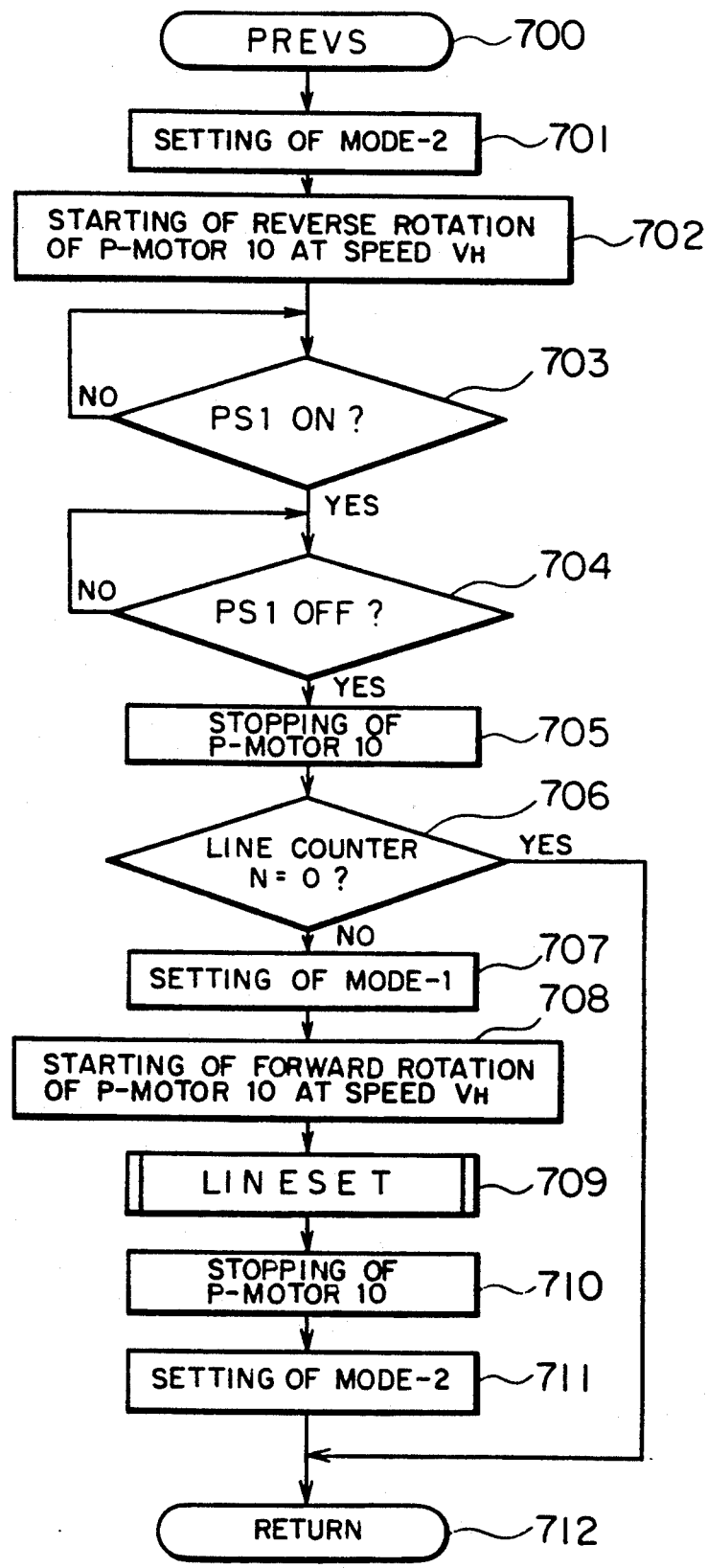
FIG. 19 is a flow chart for illustrating a printed paper take-up processing.

At a step 647, a subroutine "PREVS" is executed in a manner illustrated in FIG. 19. This subroutine is effective for transporting the printing paper by the transportation quantity $L_M$ in the upstream direction after the leading end of the printing paper has passed by the paper sensor PS1.

This subroutine "PREVS" will be described in detail by reference to FIG. 19.

At a step 700, execution of the subroutine "PREVS" is started.

At a step 701, the transporting mechanism is set to "mode-2".

At a step 702, the paper transporting motor 10 is driven in the forward direction at the speed $V_H$ to cause the printing paper to move in the upstream direction.

At a step 703, it is decided whether the paper sensor PS1 output is "ON". If "ON", the processing proceeds to a step 704. When "OFF", the step 703 is again executed.

At the step 704, decision is made as to whether the paper sensor PS1 output is "OFF". If so, the processing proceeds to a step 705. If "ON", the step 704 is again executed.

At the step 705, the paper transporting motor 10 is stopped.

At a step 706, it is checked whether the content of the line counter is "0". If it is "0", a step 712 is executed. Otherwise, a step 707 is executed.

At the step 707, the transporting mechanism is set to "mode-1".

At a step 708, the paper transporting motor 10 is rotated in the reverse direction at a speed $V_H$ to allow the printing paper to be transported in the upstream direction.

At a step 709, a subroutine "LINESET" is executed to allow the printing paper to move by the transportation quantity (distance) $L_M$.

At a step 710, the paper transporting motor 10 is stopped.

At a step 711, the transporting mechanism is set to "mode-2".

At a step 712, execution of the subroutine "PREVS" is completed, whereon the step 648 shown in FIG. 16 is regained. At the step 647, operation is so performed that the printing paper is completely wound up on the paper roll.

At the step 648, a paper end flag is set "ON", and the paper end indication lamp is turned on, whereon the processing proceeds to a step 649.

Now turning to the step 642, decision is made as to whether or not the paper sensor PS2 output is "ON". If so, jump is made to the step 649. If it is "OFF", the processing proceeds to a step 643.

At the step 643, the line counter N is placed with "0" (zero).

At a step 644, the subroutine "PREVS" is executed, whereby the leading end of the printing paper is set at a position where it has just passed by the paper sensor PS1. Then, jump is made to the step 649.

At the step 649, the subroutine "INIT" is completed, whereon the original or starting state is regained.

Next, description will be turned to a structure and operation for detecting the end of the ink sheet or film.

Figure 26:
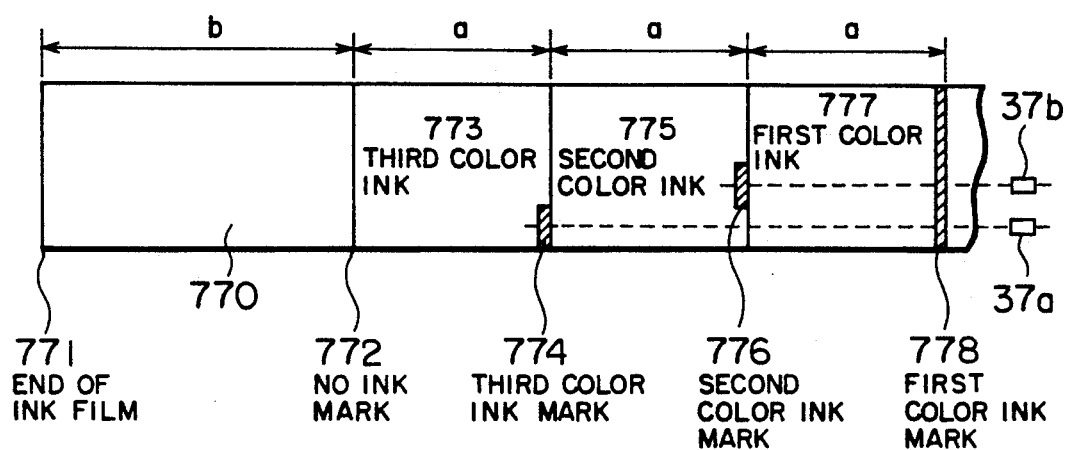
FIGS. 26 to 27 are views for illustrating structures of ink sheets provided with ink end detection marks.
Figure 27:
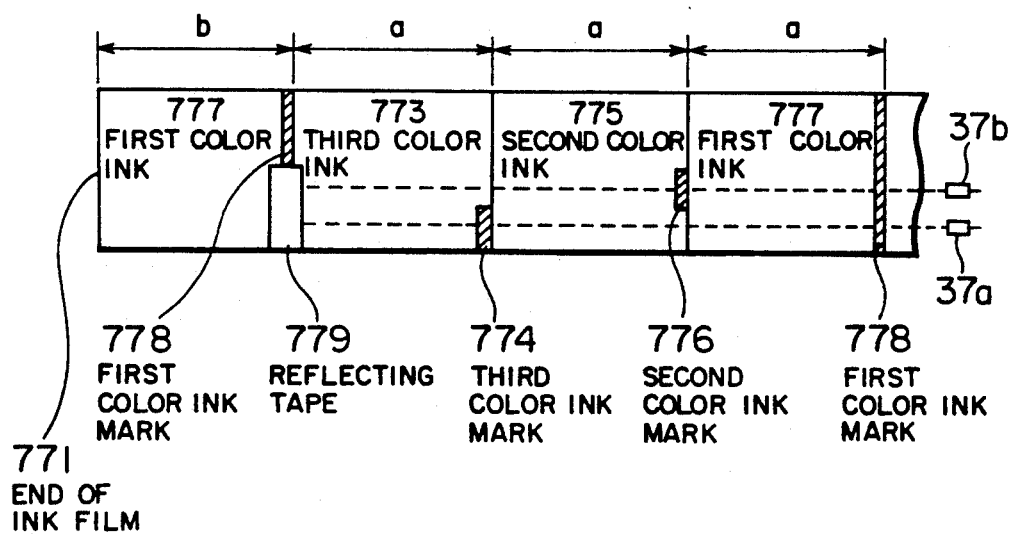

Referring to FIGS. 26 and 27, there are shown structures of an end portion of an ink film.

In the case of the ink film end structure shown in FIG. 26, an ink film portion 770 having a length b is provided in succession to a third color ink area or region 773. No ink mark 772 is attached to this end region 770.

At this juncture, it should be mentioned that the ink film end portion 770 may be either applied with ink or transparent.

By virtue of the ink film end structure described above, the light reflection type photoelectric sensors 37a and 37b can not detect changes of the ink marks as in the case of the first to third colors, because the light rays are reflected back by the reflecting plate mounted on the thermal head.

FIG. 27 shows another structure of the ink film end portion in which an ink mark 778 provided between a third color region 773 of the ink film on which three color inks are applied alternately and an ink film end region 777 which is covered by a reflection tape 779.

With the abovementioned structure, the reflection type photoelectric ink sensors 37a and 37b can not detect the change in the ink marks as in the case of the first, second and third color ink marks. It should be added that the end portion of the ink film is fixedly secured to a winding core with adhesion of such magnitude which allows the film end portion to be detached from the core under the action of torque exerted by the take up roll FIG. 17 is a view for illustrating in a flow chart an ink film end detecting operation.

This flow chart is inserted between the steps 134 and 135 in the printing operation flow chart shown in FIG. 15.

Figure 17:
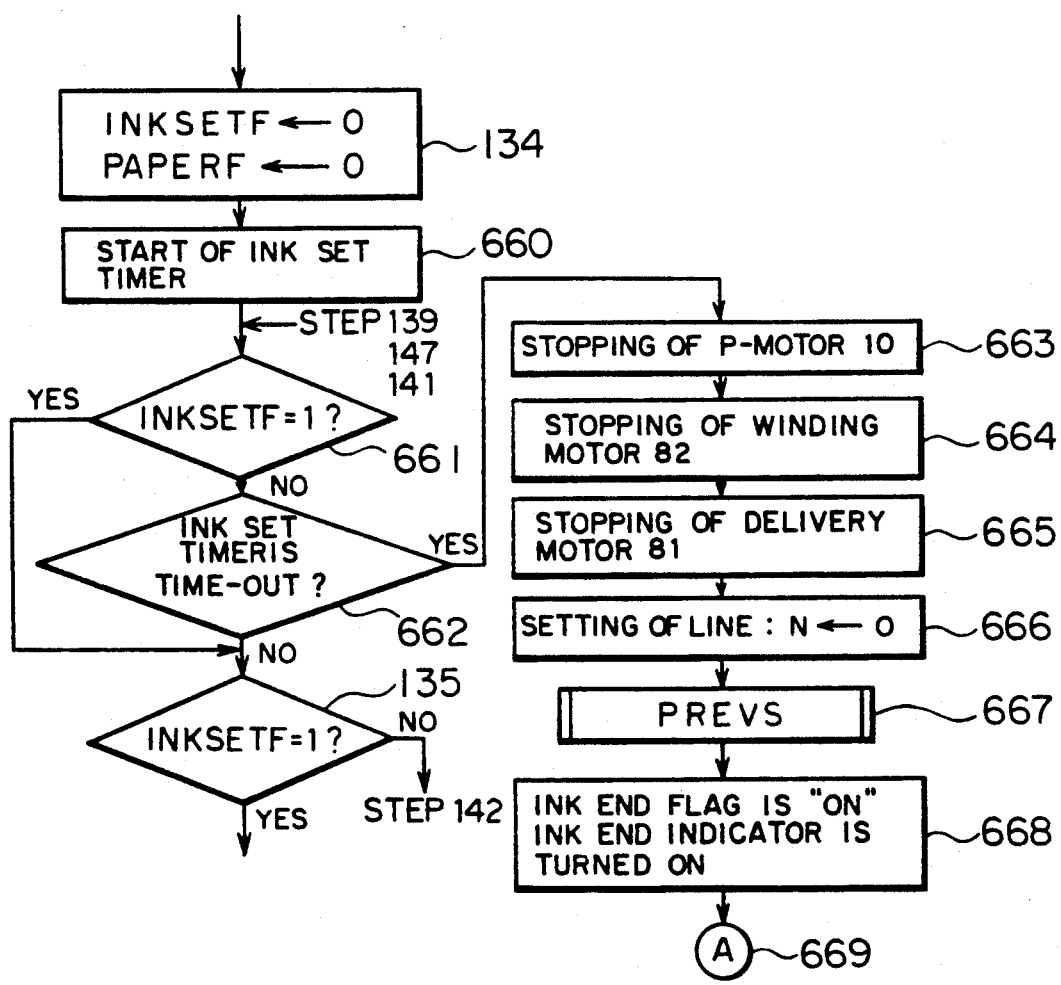
FIG. 17 is a flow chart for illustrating an ink end detecting procedure.

Now, description is directed to the flow chart of FIG. 17.

At a step 660, an ink set timer is activated. At a step 661, decision is made as to whether the flag "INK-SETF" is "1" or not. If the flag is "1", indicating the completed ink set operation, the processing proceeds to a step 135. On the other hand, if the flag is "0", a step 662 is then executed.

At the step 662, decision is made as to whether or not a predetermined time has lapsed since the start of the ink set time point. If so, the processing proceeds to a step 663, while otherwise to the step 135.

At the step 663, the paper transporting motor 10 is stopped.

At steps 664 and 665, the ink sheet winding motor 82 and the ink sheet delivery motor 81 are both stopped.

At a step 666, the subroutine "PREVS" is executed to take back the printing paper to the position at which the leading end thereof has just passed by the paper sensor PS1.

At a step 668, the ink end flag is set "ON", and the ink end indicator is turned on. Then, return is made to the step 604 shown in FIG. 13. It should be noted that a mark A designated at 669 in FIG. 17 and a mark A designated at 603 in FIG. 13 are interlinked.

With the simplified structure and operation described above, the ink sheet (film) end is determined unless the ink mark can be detected for a predetermined time, whereby the ink end indication lamp is turned on. Thus, even in the case where the remaining ink sheet portion is short, no problem arises because the ink film is completely taken up by the take-up roll.

On the other hand, when the printing operation is in progress, the printed paper is discharged through the procedure described hereinbefore in conjunction with the steps 607 to 613 in FIG. 13.

Now, a structure of the printing paper end detecting means as well as operation thereof will be considered.

FIGS. 28 to 31 show structures of the printing paper and the printing paper roll together with an end mark.

FIG. 28 shows a structure of the printing paper. The printing paper 7 is constituted by a base material (matrix) 782 (such as synthetic paper, polyester film or the like) over which an ink permeable layer 780 is applied to define a printing surface 781.

FIG. 29 shows a structure of a printing film roll. It can be seen that the roll is constituted by winding the printing paper strip 7 around a core 12 (a cylindrical member of vinyl chloride, plastic, paper or the like), wherein the printing surface 781 is positioned internally for the purpose of protecting the characteristics of the printing surface from changes which may otherwise be brought about through contact with operator's hand.

In this manner, touching the printing paper 7 by hand can not exert any appreciable influence to the printing characteristics.

Figure 32:
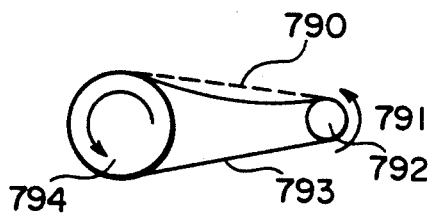
FIGS. 32 to 34 are views for illustrating relations between a printing sequence and occurrence of backlash.

FIGS. 30 and 32 show the position of the end mark on the printing paper.

The end or terminal portion of the printing paper strip 7 is secured to the core member 12 by an adhesive tape 784. The end mark 783 is implemented in the form of a hole opened in the printing paper.

The distance or length C between the end mark 783 and the end of the printing paper is selected to be greater than a distance $L_{6a}$, between the core member 12 and the first (1) paper position sensor 36 inclusive. In that case, even when the end mark is detected after the end of the printing, the printed paper can be discharged as the useful record. This method can equally be applied to OHP or the like in addition to the synthetic paper.

FIG. 20 shows in a flow chart a procedure for detecting the end of the printing paper.

The procedure illustrated in FIG. 20 is destined to be added in precedence to the step 137 shown in FIG. 15.

Now, description will be made by reference to FIG. 20.

At a step 720, it is decided whether the paper sensor PS1 output is "ON". If so, the processing proceeds to the step 137. When it is "OFF", it is decided that the printing paper has been exhausted, whereon the processing proceeds to a step 721.

At steps 721, 722 and 723, the paper transporting motor 10, the ink sheet winding motor 82 and the ink sheet delivery motor 81 are stopped, respectively.

At a step 724, the transportation quantity $L_M$ is set at the line counter N.

At a step 725, the subroutine "PREVS" is executed, to thereby take up completely the printing paper in the form of a printing paper roll.

At a step 726, the paper end flag is set "ON", and the paper end indication lamp is turned on. Thereafter, return is made to the step 604 shown in FIG. 13.

With the simple structure and operation described above, the end or exhaustion of the printing paper can be detected.

Now, referring to FIG. 18, description will be made of operation performed when the cover of the printing mechanism is opened in the course of printing operation.

Figure 18:
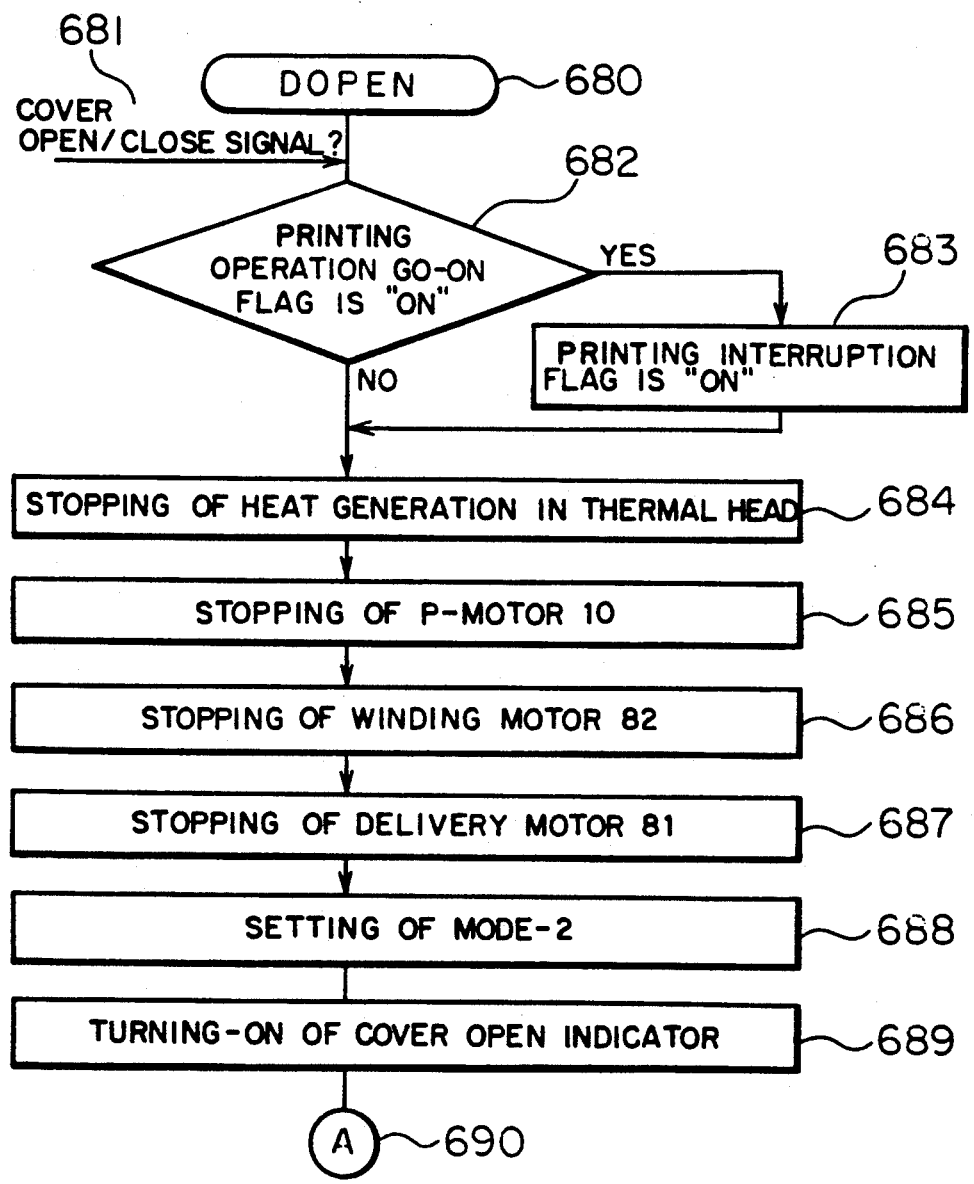
FIG. 18 is a flow chart for illustrating operation performed when a cover of the printing mechanism is opened.

When the cover of the printing mechanism is opened during the printing operation, the cover open/close sensor output becomes "OFF", in response to which an interrupt signal is generated, whereby a subroutine "DOPEN" shown in FIG. 18 is activated.

Execution of this subroutine is started at a step 682, and decision is made as to whether or not the printing operation go-on flag is "ON".

If it is "ON", indicating that the printing operation is in progress, the processing proceeds to a step 683. When it is "OFF", jump is made to a step 684.

At the step 683, a printing interruption flag is set "ON".

At the step 684, the heat generation in the therval head is stopped.

At steps 685,686 and 687, the paper transporting motor 10, the ink sheet winding motor 82 and the ink sheet delivery motor 81 are stopped, respectively.

At a step 688, the transporting mechanism is set to the "mode-2".

At a step 689, a cover open indication lamp is turned on. Then, return is made to the step 604 shown in FIG. 13.

According to the procedure described above, the printed paper is discharged through the steps 607 to 613, when the printing interruption flag is "ON", whereby duplicate transfer can be prevented.

Figures 50, 51:
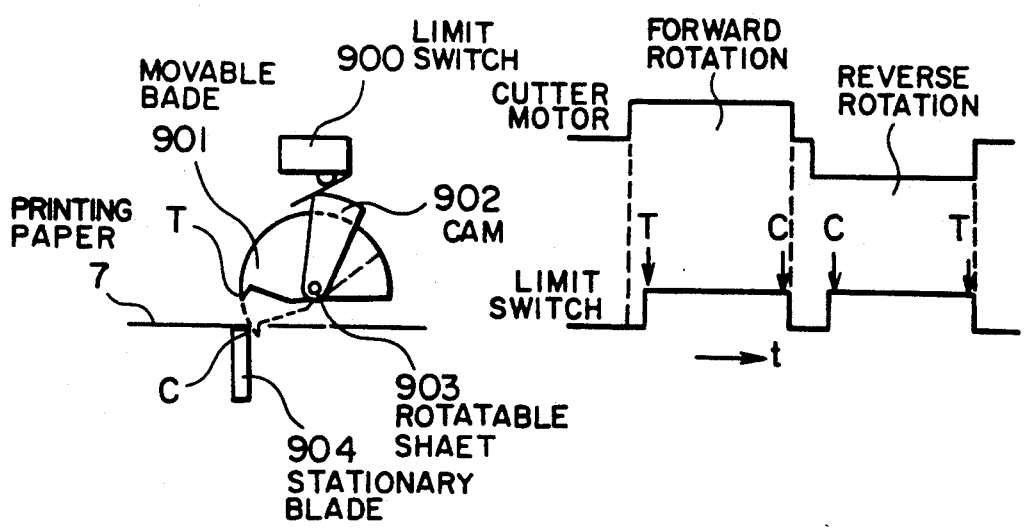
FIGS. 50 and 51 are views for illustrating reciprocative paper cutter operation.

Next, cutter operation will be described by reference to FIG. 50 showing a cutter structure and Fig. showing a flow chart for illustrating the cutter operation sequence.

Figure 53:
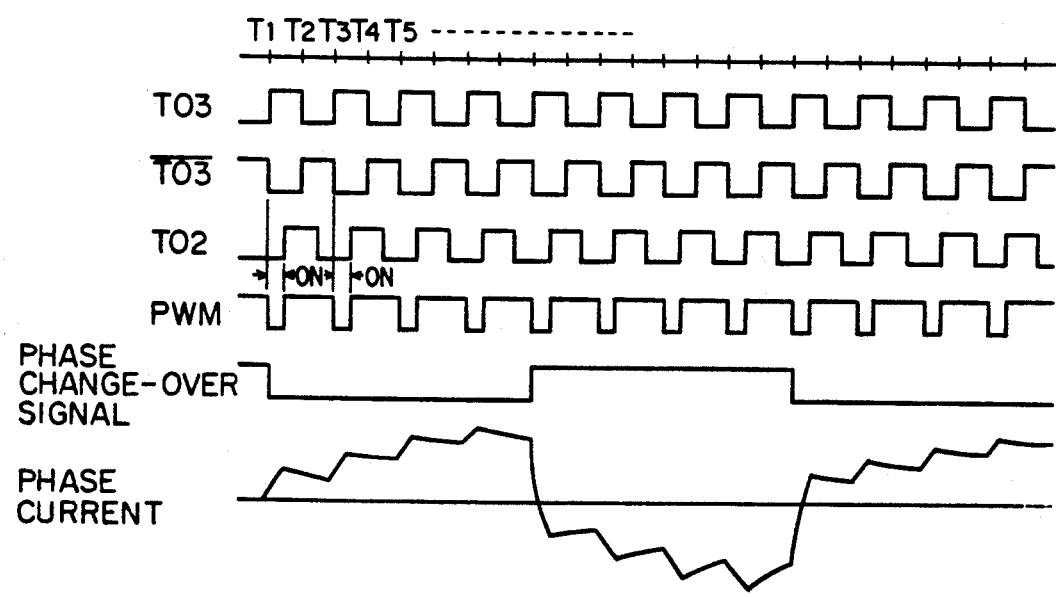
FIG. 53 is a timing chart for illustrating operation of the step motor driver circuit.

Referring to FIG. 50, there is shown a cutter structure designated to cut the printing paper through reciprocative operation. More specifically, the printing paper 7 is cut through cooperation of a movable knife or blade 901 and a stationary blade 904. The movable blade 901 and a cam 902 are fixedly mounted on a rotatable shaft 903. By rotating the shaft 903, the printing paper 7 is cut at a point C through cooperation of the movable and stationary blades 901 and 904. A limit switch 900 (cutter position sensor 367) operates under the action of the cam 902 to detect the angular position of the movable blade 901. More specifically, a stand-by point T and the cutting point C shown in FIG. 53 are detected. The cutter motor is rotated in the forward direction, while the motion of the movable blade is detected by means of the limit switch for thereby stopping the cutter motor when the movable blade has been moved to the point C from the point T.

By the reciprocative motion mentioned above, the printing paper is cut.

At this juncture, it should be mentioned that in case the movable blade is stopped on the way during one-way rotation without cutting the printing paper, there may arise such trouble that the blade is injured when the printing paper 7 is forcibly pulled out. In contrast, according to the above teaching of the present invention, the rotatable blade is positively reset to the point T. Thus, the problem such as injury to the blade can be excluded.

Besides, there can be avoided dangerous operation for manually resetting the movable blade to the position close to the stationary blade.

FIG. 22 illustrates in a flow chart a subroutine "CUTTER" which is ordinarily executed, starting from the step 750. It should however be noted that this subroutine can also be activated in response to an interrupt brought about by a manual cut signal which can be inputted through the key switch in the consecutive printing mode.

At a step 752, the forward rotation of the cutter motor 78 is started.

At a step 753, decision is made as to whether the cutter position sensor output is "ON". If "ON", the processing proceeds to a step 754, while otherwise (OFF), the step 753 is executed again.

At the step 754, decision is made as to whether or not the cutter position sensor output is "OFF". If "OFF", the processing proceeds to a step 755, while otherwise return is made to the step 754.

At the step 755, the cutter motor 78 is stopped.

At a step 756, the cutter motor 78 is rotated in the reverse direction.

At a step 756', it is decided whether or not the cutter position sensor output is "ON". If "ON", the processing proceeds to a step 757. If "OFF", the step 756' is again executed.

At a step 757, decision is made as to whether or not the cutter position sensor output is "OFF". If so, the processing proceeds to a step 758. Otherwise, the step 757 is resumed.

At the step 758, the cutter motor 78 is stopped.

At a step 759, execution of the subroutine is completed, whereon return is made to the main routine.

Figure 23:
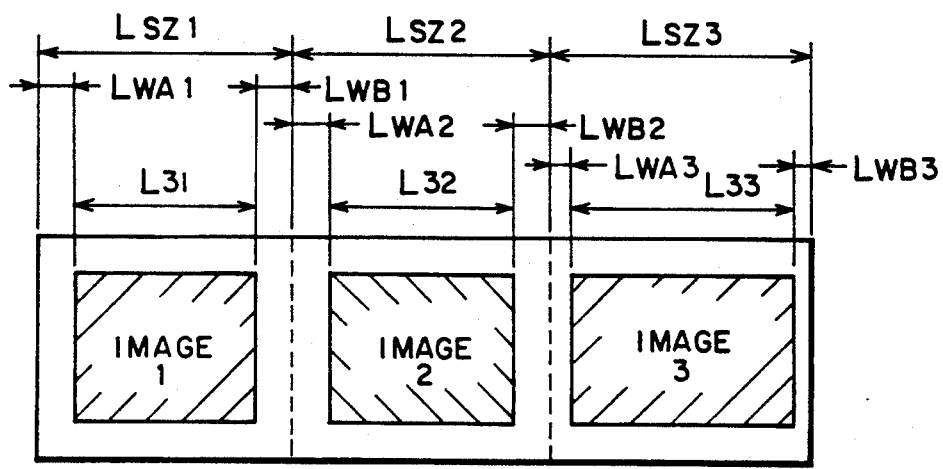
Figure 24:
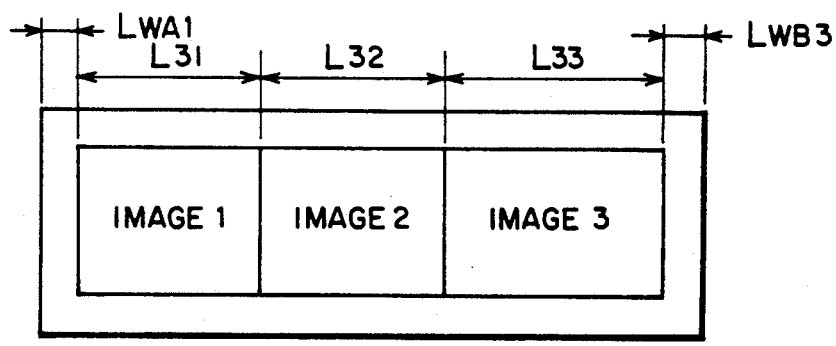
Figure 25:
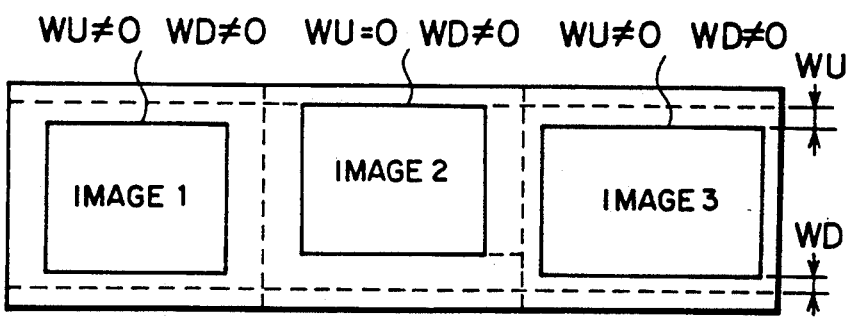

Next, description will be made of the consecutive printing operation. FIGS. 23 to 25 are views for illustrating relations in print positions between images or pictures in the consecutive printing mode.

Operation as involved in this mode is performed in accordance with a flow chart shown in FIG. 21 which is to be inserted in the flow chart shown in FIG. 14.

As is shown in the flow chart of FIG. 21, when the consecutive printing flag is "ON" at a step 740, the operation for cutting the printing paper at the step 115 is not executed. On the other hand, in case the flag mentioned above is "OFF", the step 115 is executed for cutting the printing paper.

At a step 116, the main routine is regained.

Through the procedure mentioned above, it is possible to transfer images onto the printing paper consecutively without cutting the latter upon every printing.

Of course, the printing paper may be cut, as desired, even in the consecutive printing mode with the aid of a manual cut key input signal.

FIG. 23 is a view for illustrating relation of the printing positions in the case where blank portions $L_{WA}$ and $L_{WB}$ exist. In the figure, the image size $L_3$, blanks $L_{WA}$ and $L_{WB}$ and the printing paper size $L_{SZ}$ of images 1, 2 and 3 are represented by suffixation or 1, 2 and 3 to the suffixes, respectively.

Concerning the printing position control in the consecutive printing mode, description will be made below by reference to FIG. 8.

On the basis of the second image (picture) printed in the consecutive printing mode, the printing paper displacement or transportation quantity $L_1$ is determined in accordance with the following expression:

$$L_1 = L_1(n) - L_{CP} \tag{14}$$

where n represents the ordinal number greater than two and indicating the printing order of the second and subsequent images.

By employing $L_1$ determined in accordance with the expression (14) as the transportation quantity, the relations illustrated in FIG. 23 can be obtained.

FIG. 24 shows a succession of images without interposed blanks which are transported with the transportation rate $L_1$ determined in accordance with the following expression:

$$L_1 = L_1(n) - (L_{CP} + L_{WA(n)} + L_{WB(n-1)}) \tag{15}$$

Further, there is illustrated in FIG. 25 an inter-image positional relation in which the image is displayed in the direction linewise of the thermal head shown in FIG. 12. The transportation quantity $L_6$ of the first and subsequent images ma be selected in accordance with:

$$L_6 = L_{6(n)} - L_{CP}$$

or $$L_6 = L_{6(n)} - (L_{CP} + L_{WA(n)} + L_{WB(n-1)})$$

where n represents an integer grater than 1 (one).

Upon cutting, the printing paper is discharged by additional length $L_{CP}$ or $L_{WA(n)}$.

It is apparent from the above that the move of the image in the linewise direction is possible even in the consecutive recording or printing operation mode.

Figure 33:
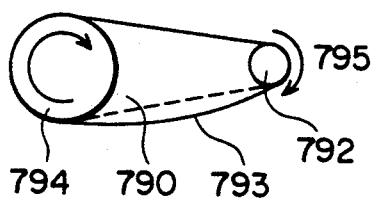
Figure 34:
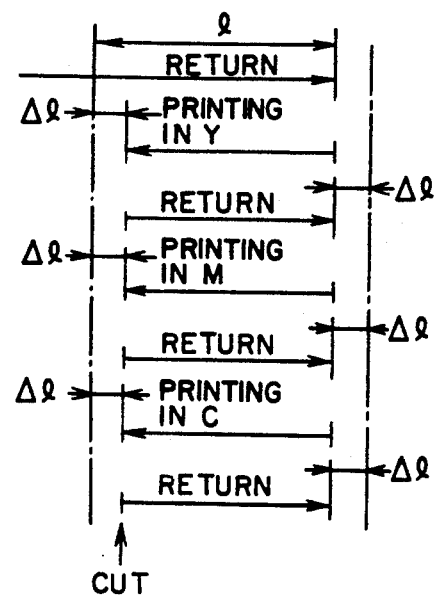

FIGS. 32 to 34 show exemplary structures of power transmitting elements.

The printing mechanism according to the illustrated embodiment of the invention includes a pulley 792 mounted fixedly on the output shaft of the paper transporting motor, a pulley 794 fixedly mounted on the paper transporting roller 24 and a timing belt 793 running between the pulleys 792 and 794 for transmitting motor torque.

When the pulley 792 is rotated in the direction indicated by an arrow 791, slack will occur in the upper portion of the timing belt while tension is applied to the lower portion thereof, as indicated by a solid line in FIG. 32.

Upon rotation in the direction indicated by an arrow 795, the pulley 794 remains stationary until tension is applied to the upper leg portion, resulting in backlash, as is illustrated in FIG. 33. This backlash is represented by $\Delta l$. In the case of the printing where the printing paper is moved reciprocatively, and in particular in the case of the printing sequence which starts from the printing with first color ink, there arises positional deviation between the first colored print and the second colored print.

In this conjunction, it should be noted that according to the teaching of the invention, the odd-numbered rotation cycles including the first, third, fifth and seventh cycles are utilized for the return operation, while the printing is performed during each of the even-numbered cycles including the second, fourth and the sixth cycles, wherein every printing is performed at the same positions of the transmission gear, the transporting roller and the platen, respectively. Accordingly, no positional deviation takes place due to the backlash $\Delta l$.

FIGS. 35 to 38 show a structure of the thermal head equipped with crumple or wrinkle preventing means.

Figure 35:
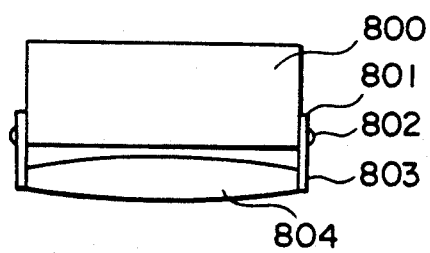
FIGS. 35 to 39 are views showing a structure of a wrinkle smooth-out tension roller.
Figure 36:
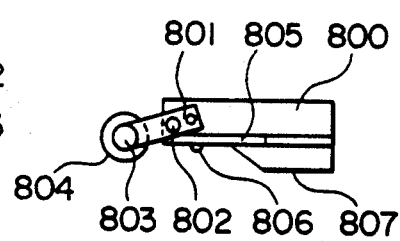

FIGS. 35 and 36 show an exemplary structure of the thermal head equipped with the means for preventing wrinkles from occurring in the ink sheet or film.

The thermal head comprises a heat dissipating plate 800, a base plate 803, resistance elements 806 and a driver IC cover 807.

A wrinkle smooth-out roller 804 is implemented in a drum-like configuration having a diameter increasing gradually from the ends toward the center. The roller 804 is fixedly secured at the ends thereof to a supporting member 801 by means of screws 803. The supporting member 801 in turn is secured to the heat dissipating plate 800 by means of screws 802.

Figure 37:
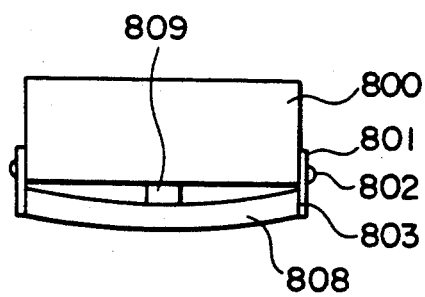
Figure 38:
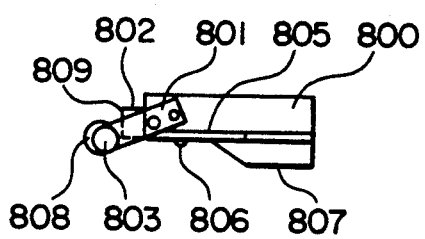

FIGS. 37 and 38 show other structures for preventing wrinkles from occurring in the ink film.

A cylindrical wrinkle smooth-out roller 808 is so deformed that the center portion thereof is bent downwardly by a spacer 809.

The wrinkle smooth-out roller 808 is secured nonrotatably at ends thereof to a supporting member 801 by means of screws.

Figure 39:
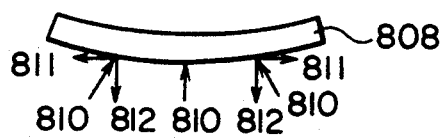
Figure 40:
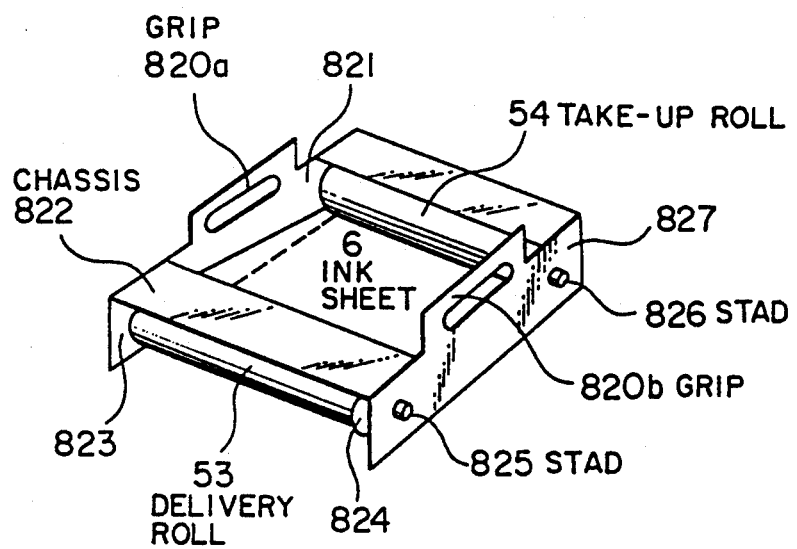

FIG. 39 illustrates the state in which tension is applied to the ink film by the abovementioned wrinkle preventing or smooth-out roller.

A force at which the wrinkle smooth-out roller is pressed onto the ink film produces reaction force components 811 and 812 in the ink film. The force component 811 is effective to pull outwardly the ink film by overcoming the force under which the ink film is pulled toward the center upon printing. Thus, generation of the wrinkles or crumples is positively prevented.

FIGS. 40, 41A to 41D and 42A to 42C show an ink cassette and associated structures. More specifically, FIGS. 40 and 41A to 41D show a structure of the ink cassette, while FIGS. 42A to 42 show a ink sheet roll to be loaded in the ink cassette.

The ink cassette includes a chassis 822 provided with grips 820a and 820b, fittings 821, 823, 824 and 827 onto which the core members of the ink sheet rolls are mounted, and four studs 825, 926 (the other two being omitted from illustration).

The delivery roller 53 for the ink sheet is mounted on the fittings 823 and 824, while the take-up roll 54 is mounted on the fittings 821 and 827.

Ordinarily, the delivery roll 53 and the take-up roll 54 are allowed to rotate only in one direction by ratchet means so that no slack takes place in the ink sheet 6. At the time point when the ink cassette is placed in position within the printing mechanism, the ratchet means is released, whereby both ink rolls can rotate under torque applied by the printing mechanism.

Figures 41A, 41B, 41C, 41D:
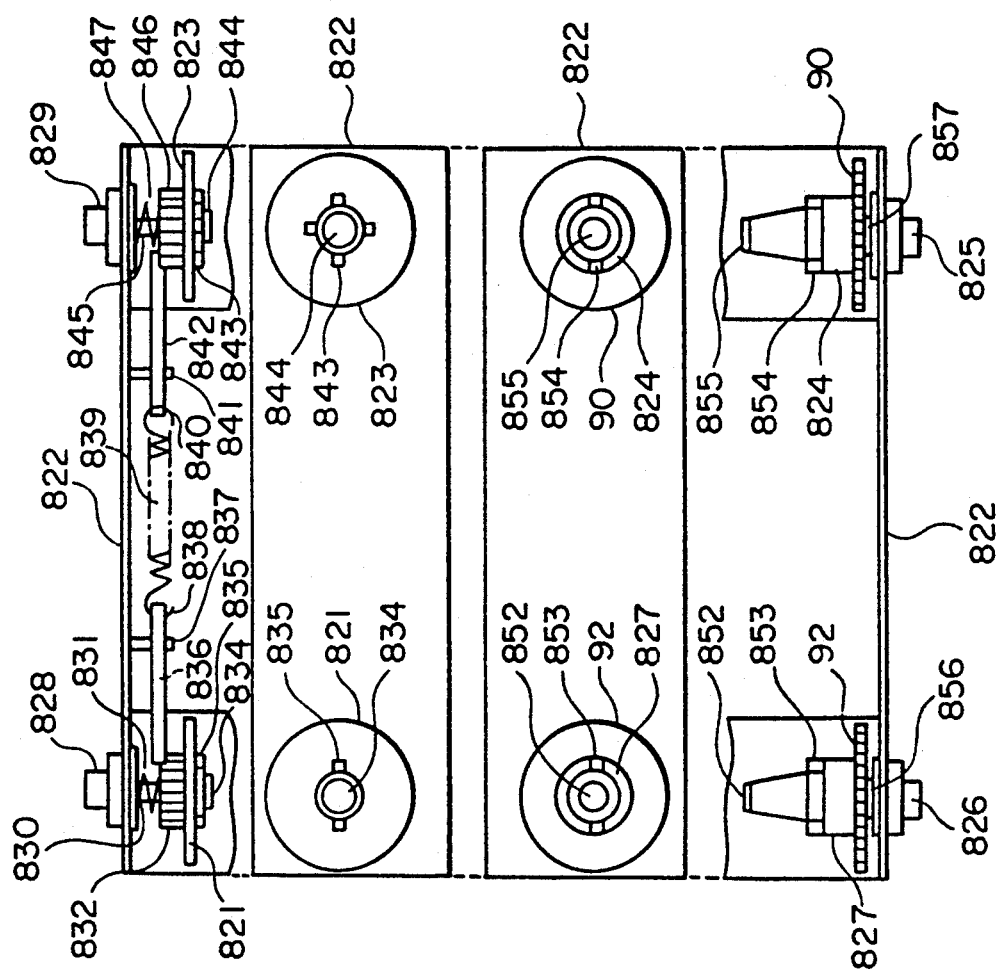

There are shown in FIGS. 41A and 41B details of the fittings 821 and 823, while details of the fittings 827 and 824 are shown at FIGS. 41C and 41D in the same figure.

The fittings 821 and 823 shown at in FIGS. 41A and 41B are of a same structure except for difference in the number of projections. The fitting 821 is constituted by a disc having a pair of projections 835 and a ratchet wheel 832.

The fitting 821 is rotatable on a shaft 830 and provided with a retaining member for preventing the fitting 821 from being inadvertently released from the shaft 830 which in turn is secured to a stud 828. The fitting 828 is applied with a spring force by a spring 831 mounted on the chassis 822. The fitting 821 can be moved along the rotatable shaft 830.

The shaft or stud 828 is inserted in the associated bearings of the printing mechanism, as shown in FIG. 4.

The ratchet means includes a lever 836, a rotatable pin 837, and a spring shoe 838 and is rotatable only in the counterclockwise direction. The spring 839 presses the lever 836 against the ratchet wheel 832.

On the other hand, the fitting 823 is composed of a disc having four projections. Except for this respect, the remaining structural arrangement of the fitting 823 is same as that of the fitting 821 and includes a rotatable shaft 845, a retaining member 844, a stud 829, a spring 847 and a ratchet wheel 846. The fitting 823 is ordinarily allowed to rotate only in the counterclockwise direction.

Next, description will be turned to the fittings 827 and 824 shown in at FIGS. 41C and 41D 43 at respectively.

The fitting 827 is implemented in a cone-like configuration and rotatable around a shaft 856. The fitting 827 is prevented from being released from the rotatable shaft 856 by means of a retaining member 852. Further, the fitting 827 is provided with a pair of projections 853. The fitting 827 includes a gear 92 for receiving torque transmitted from the printing mechanism. The shaft or stud 826 is inserted in the associated bearing of the printing mechanism.

The fitting 824 is of a same structure as the fitting 827 and includes a rotatable shaft 857, a retaining member 855, projections 854 and a gear 90.

The ink sheet (film) roll shown in FIGS. 42A to 42C will now be described.

The delivery roll (ink sheet stock) 53 is wound on a core roll 860, while the take-up roll 54 is wound around a core 872. The winding direction of the delivery roll 53 is reverse to that of the take-up roll 54. The user is supplied with the ink sheet or film in the form of the paired rolls mentioned above.

One of the cores 860 for the delivery 53 is provided with four notches 870a, 870b, 870c and 870d, while the other is provided with two notches 871a and 871b.

On the other hand, one of the cores 872 for the take-up roll 54 is provided with two notches 873a and 873b, while the other is formed with two notches 875a and 875b.

These notches and the associated projections of the ink cassette are mutually engaged for transmitting torque to the rolled ink sheet from the printing mechanism.

For loading of the ink sheet roll in the cassette, the fittings 821 and 823 are pressed toward the chassis, and then the cores 827 and 824 for the ink sheet are mounted, whereon the fittings 821 and 823 are fitted into the cores 827 and 824, respectively.

The mounting of the cassette in the printing mechanism can be achieved simply by holding the cassette by the grips and placing it on the associated bearings of the printing mechanism.

With the structure of the cassette described above, erroneous loading thereof such an erroneous positioning of the ink surface can be positively prevented due to the difference between the fitting structures for the delivery roll and the take-up roll, respectively. Further, since the fitting is slidable, exchange of the ink sheet can be much facilitated. Besides, by virtue of the pressing by the springs, there arises no fear that the ink sheet may drop out from the cassette. Additionally, because the ink sheet is protected against occurrence of slack by the ratchet means, the ink sheet can be protected from deposition of dusts and injury upon exchange of the ink sheet even when the cassette is left in the exposed state. Further, the ink sheet can easily be placed in position within the printing mechanism simply by exchanging the cassettes By preparing the cassettes in which different ink sheets (e.g. of different pigment types) are accommodated, it becomes easily possible to record or print with different inks simply by exchanging the cassettes.

Figures 47, 48, 49:
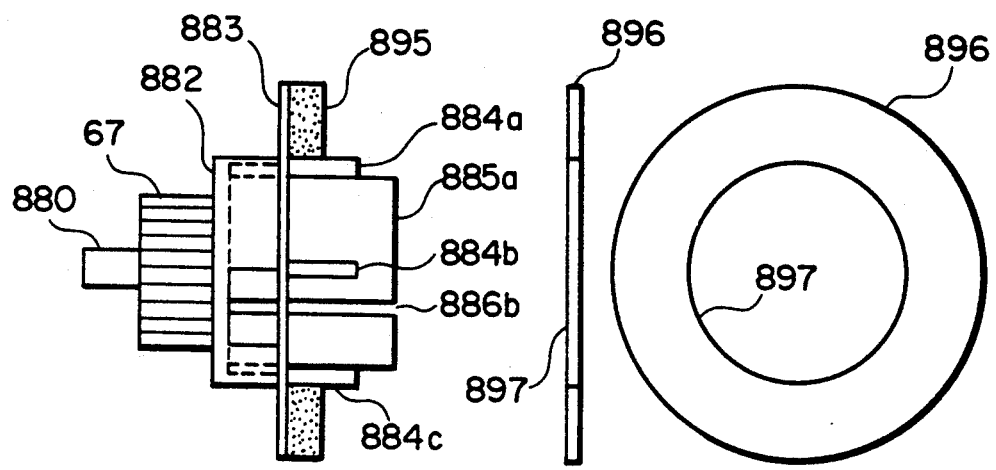

FIGS. 43 to 49 show a structure of the printing paper cassette and the rolled printing paper sheet or strip. More specifically, FIGS. 43, 44, 45 and 47 show a structure of the printing paper cassette, while FIG. 46 shows a rolled printing paper strip. Further, FIGS. 48 and 49 show a structure of a printing paper roll end surface guide spacer.

Referring to FIGS. 43 and 44, description will be made of the printing paper cassette. The printing paper cassette is loaded with a printing paper roll and mounted on the associated bearings shown in FIG. 3. The printing paper cassette includes roll shafts 880 inserted into the abovementioned bearings, a gear wheel 67, a frame 882, an end surface guide 883, projections 884a, 884b, 884c and 884d, insertion guides 885a, 885b, 885c and 885d, and insertion guide notches 886a, 886b, 886c and 886d.

The end surface guide 883 and the insertion guides 885 are fixedly secured to the frame 882. The projections 884 are secured to the end surface guide 883 and the insertion guides 885, respectively. The insertion guide 888 is of a hollow cylinder divided into four sections by notches 886 so as to be deformable toward the center axis of the cylinder.

Referring to FIG. 45, the end surface guide 888 is movable in the axial direction. The spring 887 applies a pressure onto the end surface guide 888. The projection 889 is provided with an offset portion for preventing the end surface guide 888 from dropping out.

Referring to FIG. 47, the end surface guide is provided with a soft material layer such as of sponge, rubber, urethane or the like.

Referring to FIG. 46, the printing paper strip 7 is wound around the core member 891, wherein the start end of the printing paper strip is secured to the core member by an adhesive tape.

Each end of the core member 891 is formed with four notches 890a to 890d for receiving the projections formed in the printing paper cassette. The core may be of such a length that the ends thereof are retracted from the end surfaces of the printing paper roll 7.

FIGS. 48 and 49 show an end surface spacer 896 which is constituted by a disc whose center portion is cut out, as indicated at 897.

By virtue of the structure described above in which the guides for insertion of the printing paper cassette is formed flexibly, the mounting of the printing paper roll can be much facilitated. Due to the notches formed in the core member and the projections formed in the cassette, the printing paper roll can be mounted snugly and rotated smoothly without being accompanied with any slip. The exchange of the printing paper can be facilitated by simply inserting the cassette accommodating therein the printing paper roll into the supporting bearings provided in the printing mechanism. Further, the cassette end hence the printing paper roll can be mounted accurately. The gears allow torque generated by the printing mechanism to be utilized for delivering and taking up the printing paper.

Due to the structure illustrated in FIGS. 45 and 47 in which the end surface guides and the end surfaces of the printing paper roll are brought into contact, the taking-up and the delivery of the printing paper strip are necessarily performed along the guides in such manner that the printing paper strip is prevented from meandering.

By realizing the core such that the end portions are retracted from the end surfaces of the printing paper roll, the contact between the latter and the guides are improved, which in turn contributes to preventing the paper strip from meandering behavior.

The end surface spacer shown in FIGS. 48 and 49 fills the space or gap between the end surface guide provided in the cassette and the end surface of the printing paper roll and thus serves for the similar advantageous effect mentioned above. In particular, the spacer can present advantageous effect upon change in the paper width such as encounted in exchange of paper size from A4 to letter size, etc.

Figure 52:
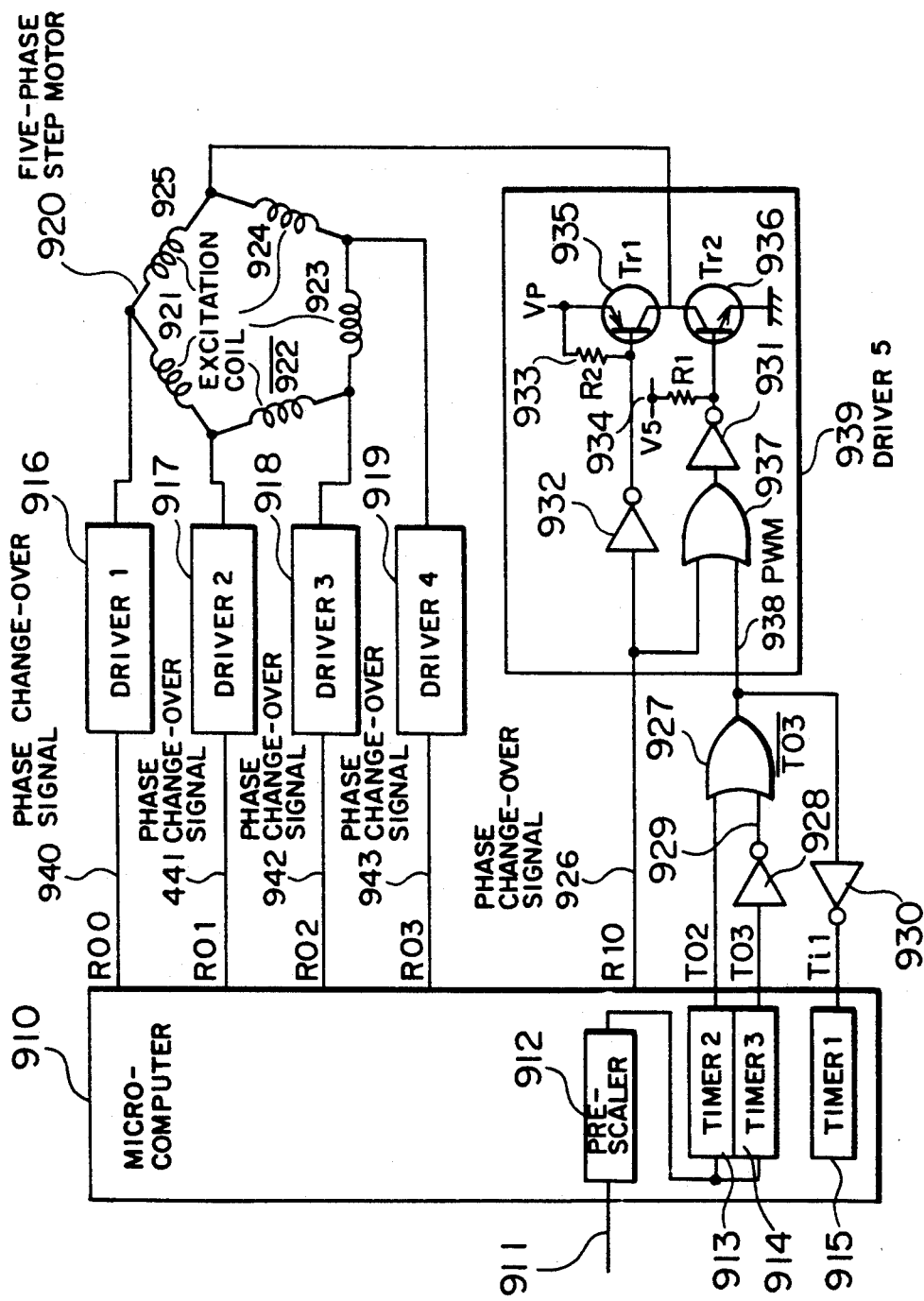
FIG. 52 is a schematic circuit diagram showing configuration of a step motor drive circuit.

Next, concrete embodiment of the step motor drive 86 circuit will be described. FIG. 52 shows a step motor drive circuit incorporated in the printing mechanism control circuit shown in FIG. 5, and FIG. 53 is a timing chart for illustrating operation of the step motor control circuit.

A microcomputer 910 shown in FIG. 52 is constituted by a one-chip microcomputer incorporating therein the CPU, ROM, RAM, output and input ports and the timer shown in FIG. 5.

A pre-scaler 912 serves to count down the clock signal 911, wherein the output of the pre-scaler is supplied to the timers 1 and 2.

The output ports are designated by $R_{00}$, $R_{01}$, $R_{02}$, $R_{03}$ and $R_{10}$. The driver 1 to 5 are each of a same circuit configuration.

The timers 2 and 3 count the clock pulses 911 counted down by the pre-scaler to thereby generate rectangular waveform signals $T_{03}$ and $T_{02}$ predetermined in accordance with program. The signal $T_{03}$ is inverted to $\overline{T}_{03}$ by an inverter 928. The $\overline{T}_{03}$ signal denoted by 929 and the $T_{02}$ signal are logically ORed by an OR circuit 927, whereby a PWM (pulse width modulation) signal 938 is generated.

The ON-duration of the PWM signal is generated by delaying phase difference upon starting of the count operation of the timers 2 and 3 by software. The PWM signal 938 is logically ORed with a phase change-over signal 926 by an OR circuit 937, the output of which is applied to the input of an open-collector output inverter 931. The collector current of a transistor 936 undergoes ON/OFF control in dependence on a base current determined by a voltage $V_5$ and resistance. Thus, the transistor 936 is turned on when the phase change-over signal 926 is "0" with the PWM signal 938 also being "0", whereby a current can flow through the excitation coil of the step motor 920. In that case, the transistor 935 is turned off during a period in which the phase change-over signal 926 is "0" because of the open-collector output inverter 932. The transistor 935 is conducting during a period in which the phase change-over signal 926 is "1" while the transistor 936 is nonconducting.

By way of example, when the phase change-over signal 943 is "1" with the signal 926 being "0", an excitation current can flow through the excitation coil 926. A current waveform at this time is illustrated in FIG. 53. When the phase change-over signal 926 is "1" with the signal 943 being "0", the excitation current flows through the excitation coil 924 in a direction opposite to that mentioned above.

In this way, by changing over sequentially the directions of the currents caused to flow through the excitation coils as well as the coils to be exited, the step motor is rotated.

The timing for changing over five sets of the excitation coils can be determined by inverting the PWM signal 938 by the inverter 930 and inputting the output pulses of the inverter 930 to the timer 1 for counting the pulse up to a predetermined number prescribed by the program. Upon occurrence of overflow in the timer 1 and interrupt to the microcomputer, the phase change-over signals are exchanged to allow the step motor to rotate.

With the step motor drive circuit described above in which the microcomputer is employed in association with a pair of timers for delaying in accordance with program the phase at which the counting operation is started, to thereby generate the PWM signal, magnitude of the phase currents and hence torque as generated can be controlled in accordance with the rotational speed. Further, since the PWM signal is counted by the timer controllable by the microcomputer for generating an interrupt at every predetermined count value for changing over the phase currents, the rotating speed can be controlled by program.

In the foregoing description of the exemplary embodiment, it has been assumed that the present invention is applied to a thermal transfer type color recorder or printer. It should however be understood that the teachings of the invention can equally be applied to mono-color printers and heat-sensitive printers.

Another embodiment of the present invention will be described by reference to FIG. 54.

Figure 54:
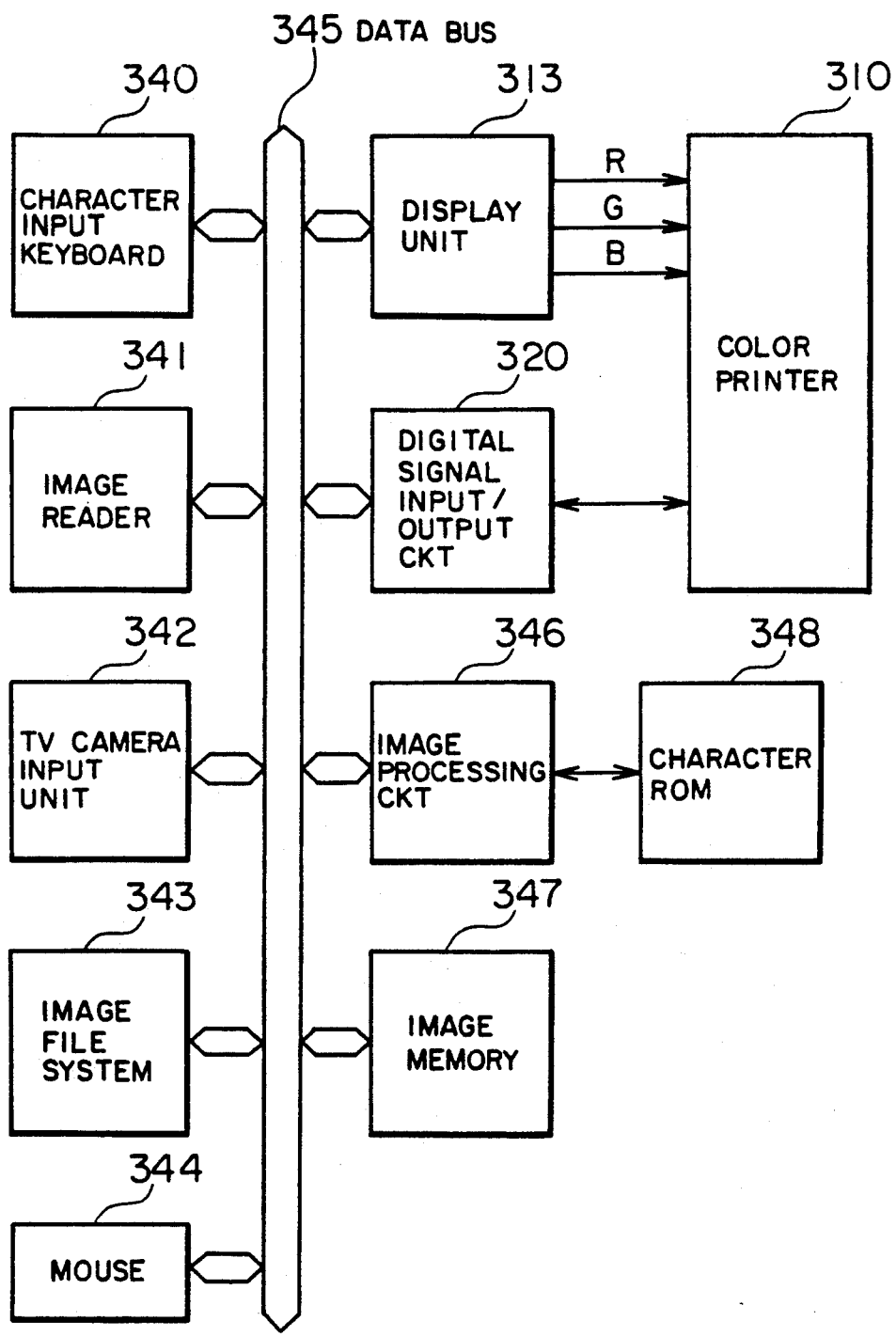
FIG. 54 is a schematic block diagram showing a general arrangement of an interaction type image editing system to which an embodiment of the invention can be applied.

FIG. 54 shows a general arrangement of an interactive type image edition system which comprises an interactive type image editing unit including a character input keyboard 340, an image reader 341, a television (TV) camera input unit 342, an image data file system 343, a mouse 344, a display unit 313, a digital signal input/output circuit 320, an image processing circuit 346, a character ROM 348 and an image memory 347, and a color printer 310. The character input keyboard 340 serves to input characters and symbols for generating texts or graphics. The image reader 341 is constituted by a scanner for reading printed images or pictures and text to be inputted to the image memory 347. The TV camera input unit 342 serves to input images or pictures (graphics) and characters picked up by a TV camera to the image memory 347. The image data file system 343 is constituted by a storage such as a magnetic disc system, magnetic tape system, CDROM, CDRAM, floppy disc system or the like and serves for storing the image data inputted through the character input keyboard 340, the image reader 341 and the TV camera input unit 342 as well as the image data resulting from the edition performed by the image processing circuit 346 and for writing or reading the image sources generated already to or from the apparatus. The mouse 344 is an interactive type command device used for designating an image displayed on the display unit 313 with the aid of a symbol and supplying processing commands to the computer or the image procession circuit 346 in the case of the system under consideration. The display unit 313 serves for displaying the content of the memory 347 and image data obtained from the image processing circuit as well as those images inputted through the character input keyboard 340, the image reader 341, the TV camera input device and from the image data file system. The R-, G- and B-analogue video signals are outputted to the color printer 310. The digital signal input/output circuit 320 serves to output the content of the image memory 347 to the color printery 310. The image processing circuit 346 serves to convert or transform Japanese katakanas (square form of kana), hiraganas (cursive kana characters), romaji (Roman style kana characters) and alphabet inputted through the character input keyboard 340 into Chinese characters or vice versa for creating texts. Further, the image processing circuit serves for creation of images or pictures (graphics) with the aid of the mouse, the layout of images, combination or deletion of plural images, insertion, enlargement, contraction and the like edition, the results of which are stored in the image memory 347 or in the image data file system 343. The character ROM 348 serves to store the characters for the purpose of outputting bit-map images of characters in response to the character codes inputted through the character input board 340. The image memory 347 is constituted by a RAM or the like memory.

With the system described above, the inputted images can be edited, wherein the images obtained from the edition can be outputted through the color printer.

In particular, for the image in which full-color pictures and characters in black coexist, it is preferred that the full-color picture are first printed by designating the printing paper size, the image size and the recording or printing position (location), whereon the characters are printed by using black ink, since then the printing time required can be reduced with the ink film being saved as well.

The system described above can advantageously be 91 applied to word processors of interactive edition type as well as to printing of post cards, selection of clothes and/or glasses appropriate to purchasers, edition of architectural layouts and others. The images thus obtained can of course be delivered to the users.

By way of example, there may be mentioned as the applications such synthesization system in which face features and body lines of a person are inputted with video camera to be combined with the images of glasses and/or clothes stored previously, a system for combining a projected building site and a building, a post card generating system for combining color picture with texts or sentences.

A still further embodiment of the present invention will be described by reference to FIG. 55.

Figure 55:
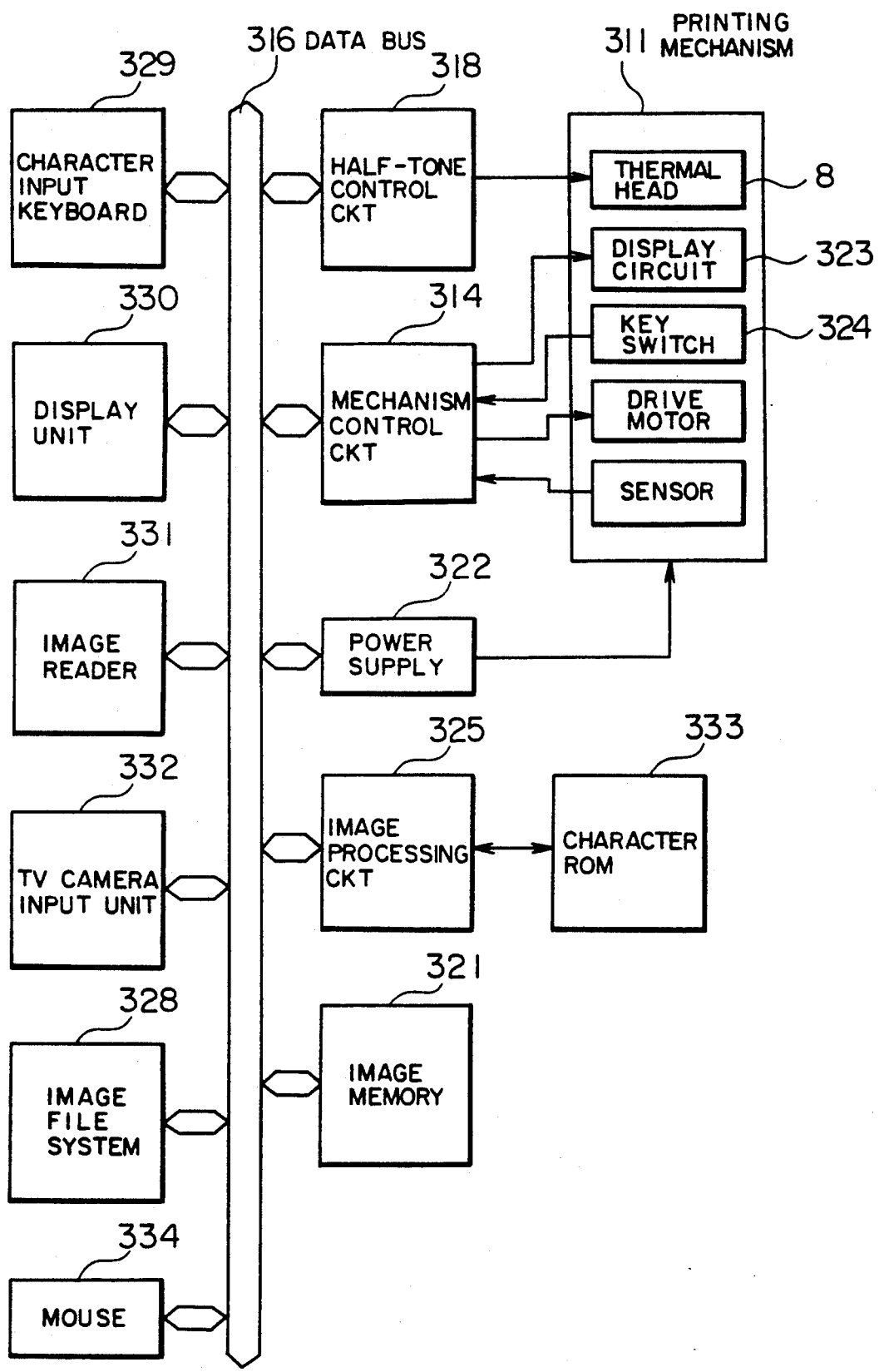
FIG. 55 is a schematic block diagram showing another example of the interaction type image editing system to which the invention can be applied.

FIG. 55 shows a system in which the interaction type editing unit of the system shown in FIG. 54 is combined with the color printer shown in FIG. 1.

The character input keyboard 329, the display unit 330, the image reader 331, the TV camera input unit 332, the image file system 328, the mouse 334, the image processing circuit 329, the character ROM 333 and the image memory shown in FIG. 55 correspond to those shown in FIG. 54 in respect to the functions and operations.

In the system shown in FIG. 55, the data transmission to the printer can be realized by using the data bus 316 because the printer is combined with the interactive editor in one unit, whereby the print output can be obtained at high speed. Besides, the system can be implemented in an integral structure of a reduced size.

As will not be appreciated from the foregoing description, there can be achieved significant improvement in manipulatability of the printing system since that is required is only the inputting of information about the printing paper size, the image size to be recorded or printed and the printing position. In other words, additional user's manipulation for printing an image at a predetermined position such as addition or insertion of dummy data in image data is rendered unnecessary. Thus, the time taken for data processing and data transfer can be saved significantly, whereby high-speed printing can be accomplished to great advantage.

Besides, the transportation speed can be increased at the blank areas, in the secondary scanning direction whereby the time taken for the recording or printing can be shortened to another advantage.

We claim:
1. An image printing system, comprising:
image signal inputting means for inputting an image signal; and
a printing mechanism which includes:
a control circuit responsive to inputting of an image signal for outputting a head control signal for controlling printing density based on said image signal and outputting a motor drive signal for controlling transportation of an ink sheet and a printing sheet,
a thermal head responsive to said head control signal for adjusting heat generating states of heat generating elements,
drive motor means for generating a driving power for transporting said ink sheet and said printing sheet in response to said motor drive signal, and
driving mechanism for transporting said ink sheet and said printing sheet by utilizing said driving power generated by said drive motor; and
said printing system further comprising command means for commanding a size of a sheet used for printing, position of an image to be printed and a size of said image;
wherein said control circuit incorporates a function for determining a transportation quantity for transporting said printing sheet based on said printing sheet size, said image printing position and said image size and determining arithmetically said motor drive signal corresponding to said transportation quantity, a function for discriminatively deciding a printing area where said image is to be printed and a non-printing area where said image is not to be printed based on said printing sheet size, said image printing position and said image size, and a function for determining a printing start timing based on a result of said discriminative decision and said drive motor signal and outputting said head control signal based on said image signal.

2. An image printing system according to claim 1, wherein said control circuit outputs said motor drive signal such that a printing sheet transporting speed becomes higher during the printing sheet transportation corresponding to said non-printing area than during the printing sheet transportation corresponding to said printing area.

3. An image printing system according to claim 1, wherein said driving mechanism includes first and second pairs of rollers disposed, respectively, upstream and downstream of said thermal head as viewed in a direction in which said printing sheet is transported, said rollers nipping said printing sheet therebetween for transporting said printing sheet, a sensor disposed at a position downstream of said second pair of rollers for detecting a position of said printing sheet; and
said control circuit generating said motor drive signal such that said printing sheet is transported by said first pair of rollers to an upstream side during printing with reference to a leading end of said printing sheet detected by said sensor.

* * * * *